US007165152B2

(12) United States Patent
Blumenau et al.

(10) Patent No.: US 7,165,152 B2
(45) Date of Patent: Jan. 16, 2007

(54) METHOD AND APPARATUS FOR MANAGING ACCESS TO STORAGE DEVICES IN A STORAGE SYSTEM WITH ACCESS CONTROL

(75) Inventors: Steven M. Blumenau, Holliston, MA (US); John T. Fitzgerald, Mansfield, MA (US); John F. Madden, Jr., Holden, MA (US)

(73) Assignee: EMC Corporation, Hopkinton, MA (US)

( * ) Notice: Subject to any disclaimer, the term of this patent is extended or adjusted under 35 U.S.C. 154(b) by 466 days.

(21) Appl. No.: 09/751,684

(22) Filed: Dec. 29, 2000

(65) Prior Publication Data

US 2001/0020254 A1 Sep. 6, 2001

Related U.S. Application Data

(63) Continuation-in-part of application No. 09/343,969, filed on Jun. 30, 1999, now Pat. No. 6,839,747, which is a continuation-in-part of application No. 09/107,618, filed on Jun. 30, 1998.

(51) Int. Cl.
*G06F 12/00* (2006.01)
(52) U.S. Cl. ............... 711/152; 711/151; 711/153; 711/154; 711/147
(58) Field of Classification Search .......... 711/152, 711/151, 153, 154, 147
See application file for complete search history.

(56) References Cited

U.S. PATENT DOCUMENTS

| 4,280,176 A | | 7/1981 | Tan |
| 4,672,572 A | | 6/1987 | Alsberg |
| 5,163,147 A | * | 11/1992 | Orita ............ 395/600 |
| 5,235,642 A | | 8/1993 | Wobber et al. |
| 5,271,007 A | | 12/1993 | Kurahashi et al. |

(Continued)

FOREIGN PATENT DOCUMENTS

EP 0 580 350 A1 1/1994

(Continued)

OTHER PUBLICATIONS

Lampson, B.W., "Protection (computer system access)", Operating Systems Review, Jan. 1974, USA, vol. 8, No. 1, pp. 18-24, XP000980389, ISSN: 0163-5980.

(Continued)

*Primary Examiner*—Kimberly McLean-Mayo
(74) *Attorney, Agent, or Firm*—Wolf, Greenfield & Sacks, P.C.

(57) ABSTRACT

A storage system is provided that includes a plurality of storage devices and a data structure, accessible to the storage system, that includes a plurality of records corresponding to a plurality of network devices that are coupled to the storage system. Each record includes configuration data that identifies each of the plurality of storage devices to which data access by a respective one of the plurality of network devices is authorized. Each record may further include visibility data that identifies whether certain types of non-data access, such as requests for general information relating to a respective storage device, by a respective one of the plurality of network devices is permitted, even though data access to the respective storage device by the respective one of the plurality of network devices is not authorized.

52 Claims, 27 Drawing Sheets

U.S. PATENT DOCUMENTS

| | | | |
|---|---|---|---|
| 5,276,735 A | 1/1994 | Boebert et al. | |
| 5,321,695 A | 6/1994 | Faulk, Jr. | |
| 5,455,953 A | 10/1995 | Russell | |
| 5,469,576 A | 11/1995 | Dauerer et al. | |
| 5,742,759 A | 4/1998 | Nessett et al. | |
| 5,771,291 A | 6/1998 | Newton et al. | |
| 5,771,354 A | 6/1998 | Crawford | |
| 5,784,464 A | 7/1998 | Akiyama et al. | |
| 5,860,137 A | 1/1999 | Raz et al. | |
| 5,864,843 A | 1/1999 | Carino, Jr. et al. | |
| 5,889,952 A | 3/1999 | Hunnicutt et al. | |
| 5,930,786 A | 7/1999 | Carino, Jr. et al. | |
| 5,991,876 A | 11/1999 | Johnson et al. | |
| 5,999,930 A | 12/1999 | Wolff | |
| 6,044,155 A | 3/2000 | Thomlinson et al. | |
| 6,061,726 A | 5/2000 | Cook et al. | |
| 6,105,027 A | 8/2000 | Schneider et al. | |
| 6,141,701 A | 10/2000 | Whitney | |
| 6,295,575 B1 * | 9/2001 | Blumenaua | 711/5 |
| 6,311,255 B1 * | 10/2001 | Sadana | 711/152 |
| 6,343,324 B1 * | 1/2002 | Hubis | 709/229 |
| 6,484,173 B1 * | 11/2002 | O'Hare | 707/9 |
| 6,496,940 B1 * | 12/2002 | Horst | 714/4 |
| 2003/0050962 A1 * | 3/2003 | Monsen | 709/203 |

FOREIGN PATENT DOCUMENTS

WO     WO 95/13583     5/1995

OTHER PUBLICATIONS

Sutton, A.J., et al., Processors sharing and partitioning of main storage in the MP system:, IBM Technical Disclosure Bulletin, Oct. 1979, USA, vol. 22, No. 5, pp. 2009-2010, XP000955350, ISSN: 0018-8689.

* cited by examiner

| | | |
|---|---|---|
| 1505 |  | Storage System |
| 1510 |  | Storage Port |
| 1515 |  | Host Processor |
| 1520 |  | Administrator Host Processor |
| 1525 |  | Host Bus Adapter |
| 1530 |  | Storage Volume |
| 1535 |  | Assigned Storage Volume |
| 1540 |  | Shared, Assigned Storage Volume |
| 1545 |  | Configuration Database Storage Volume |
| 1550 |  | Mirrored Storage Volume |
| 1555 |  | Concatenated Storage Volume |
Fig. 15

| Volumes | Capacity | Symmetrix | Symm Ports | Owners |
|---|---|---|---|---|
| 0 | 0.0 | 9000003077 | Fa3a, Fa15a | sargent:FcaPort0 |
| 1 | 0.0 | 9000003077 | Fa3a | sargent:FcaPort0 |
| 2 | 0.0 | 9000003077 | a3a | sargent:FcaPort0 |
| 3 | 0.0 | 9000003077 | Fa3a, Fa16b | sargent:FcaPort0 |
| 4 | 0.0 | 9000003077 | Fa3a | sargent:FcaPort0 |
| 5 | 0.0 | 0000003077 | Fa3a | None |
| 6 | 0.0 | 0000003077 | Fa3a | None |
| 7 | 0.0 | 0000003077 | Fa3a | vermeer:fca@2,0... |
| 8 | 0.0 | 9000003077 | Fa15a | sargent:FcaPort0 |
| 9 | 0.0 | 9000003077 | Fa15a | sargent:FcaPort0 |
| a | 0.0 | 0000003077 | Fa15a | None |
| b | 0.0 | 0000003077 | Fa15a | None |
| c | 0.0 | 0000003077 | Fa15a | None |
| d | 0.0 | 0000003077 | Fa15a | None |
| e | 0.0 | 0000003077 | Fa15a | None |
| f | 0.0 | 0000003077 | Fa15a | None |
| 18 | 0.0 | 0000003078 | Fa15b | None |
| 19 | 0.0 | 0000003078 | Fa15b | None |
| 1a | 0.0 | 0000003078 | Fa15b | None |
| 1b | 0.0 | 0000003078 | Fa15b | None |
| 1c | 0.0 | 0000003078 | Fa15b | None |
| 1d | 0.0 | 0000003078 | Fa15b | None |
| 1e | 0.0 | 0000003078 | Fa14b, Fa15b | None |
| 1f | 0.0 | 0000003078 | Fa14b, Fa15b | None |
| 20 | 0.0 | 0000003078 | Fa14b, Fa15b | None |

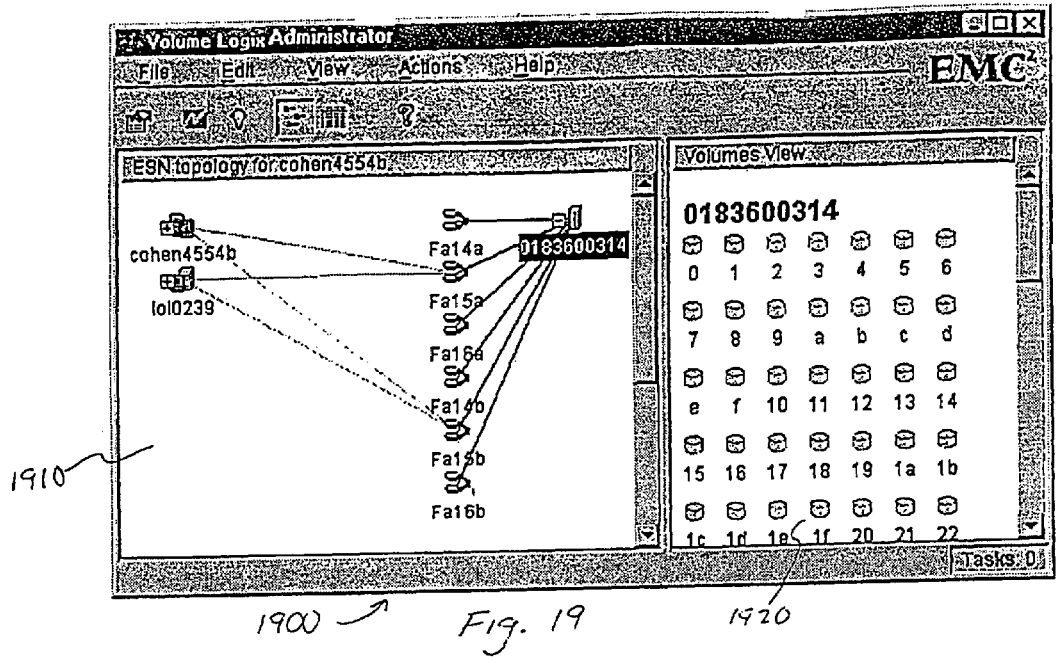
Fig. 19
Fig. 20
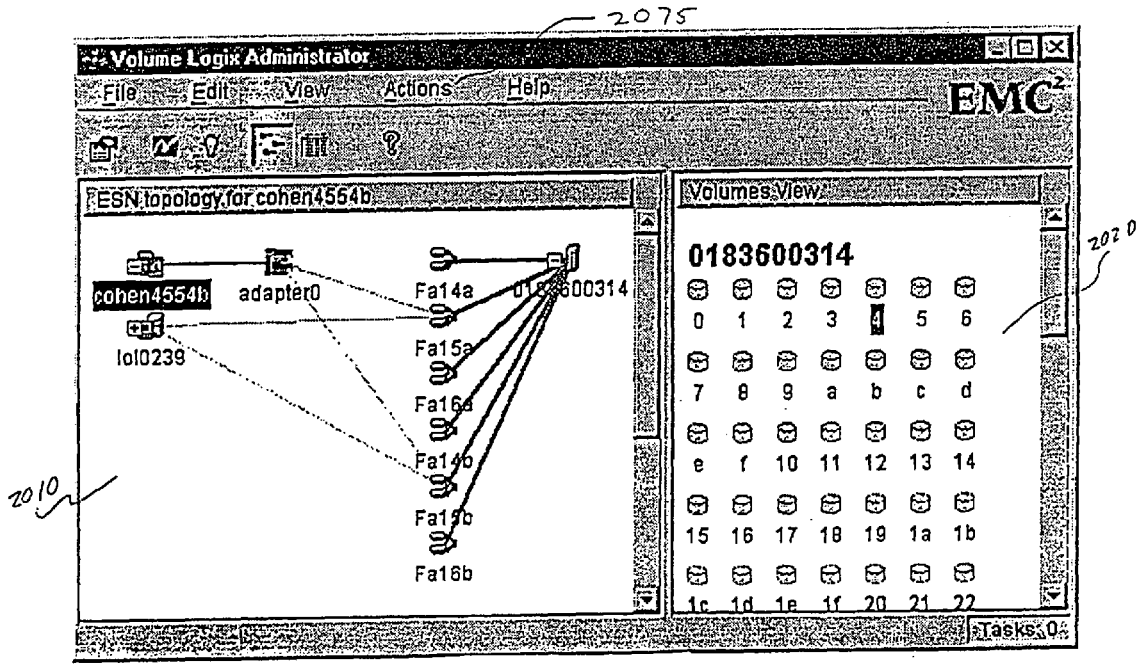

| HBA WWN | VVI | FLAG | LUN BITMAP | — 2476a |
| --- | --- | --- | --- | --- |
| HBA WWN | VVI | FLAG | LUN BITMAP | — 2476b |
| HBA WWN | VVI | FLAG | LUN BITMAP | — 2476c |
| HBA WWN | VVI | FLAG | LUN BITMAP | — 2476d |
| HBA WWN | VVI | FLAG | LUN BITMAP | — 2476e |
| HBA WWN | VVI | FLAG | LUN BITMAP | — 2476f |
| | | | | |
| | | | | |
| | | | | |
| | | | | |
| | | | | |
| HBA WWN | VVI | FLAG | LUN BITMAP | — 2476n |

METHOD AND APPARATUS FOR MANAGING ACCESS TO STORAGE DEVICES IN A STORAGE SYSTEM WITH ACCESS CONTROL

This application is a continuation-in-part of application Ser. No. 09/343,969, filed Jun. 30, 1999 now U.S. Pat. No. 6,839,747, entitled USER INTERFACE FOR MANAGING STORAGE IN A STORAGE SYSTEM COUPLED TO A NETWORK, and now pending, which is a continuation-in-part of application Ser. No. 09/107,618, filed Jun. 30, 1998, entitled METHOD AND APPARATUS FOR PROVIDING DATA MANAGEMENT FOR A STORAGE SYSTEM COUPLED TO A NETWORK, and now pending.

FIELD OF THE INVENTION

This invention relates generally to the field of information storage systems and more particularly to a method and apparatus for managing access to storage in a storage system.

DESCRIPTION OF THE RELATED ART

Computer systems generally include one or more host processors and a storage system for storing data accessed by the host processor. The storage system may include one or more storage devices (e.g., disk drives) to service the storage needs of the host processor. Disk drives may include one or more disks of a recording media, such as a magnetic recording medium or an optical recording medium.

In a typical computer system configuration, a bus provides an interconnect between the host processor and the storage system. The bus operates according to a protocol, such as the Small Component System Interconnect (SCSI) protocol, which dictates a format of packets transferred between the host processor and the storage system. As data is needed by the host processor, requests and responses are forwarded to and from the storage system over the bus.

With the growth of networked computer systems, multiple hosts have been coupled over a network to a shared data storage system. Fibre Channel is an example of a network that can be used to form such a configuration. Fibre Channel is a network standard that allows multiple initiators to communicate with multiple targets over the network, where the initiator and target may be any device coupled to the network. Using a network, multiple hosts are able to share access to a single storage system. One problem with coupling multiple hosts to a shared storage system is the management of data access at the storage system. Because multiple hosts have access to a common storage system, each host may physically be able to access information that may be proprietary to the other host processors.

Various techniques have been implemented to manage access to data at the storage system. For example, certain portions or zones of memory at the storage system may be dedicated to one or more of the hosts. Each host is 'trusted' to access only those portions of memory for which it has privileges. However, such an approach is vulnerable to the individual actions of each of the hosts. As a result, such a data management method may not be sufficient to protect data from unprivileged accesses.

SUMMARY OF THE INVENTION

One illustrative embodiment of the invention is directed to a method for managing access to a shared resource by a plurality of devices that are coupled to the shared resource via a network. The method includes acts of: (a) in response to a non-media access request by a first of the plurality of devices to a logical device at the shared resource for which the first device has no data access privileges, determining whether the first device is authorized to have non-media access to the logical device; and (b) authorizing the non-media access request when it is determined in the act (a) that the first device is authorized to have non-media access to the logical device.

Another illustrative embodiment of the invention is directed to a method for managing access to a storage system by a plurality of devices that are coupled to the storage system via a network. The storage system includes a plurality of logical volumes of data, and the method includes acts of: (a) maintaining, in a data structure that is accessible to a filter that controls access to each of the plurality of logical volumes, configuration information identifying each logical volume of the plurality of logical volumes to which data access by a first device of the plurality of devices is authorized; (b) in response to a non-media access request by the first device to a first logical volume for which the first device has no data access privileges, determining whether the first device is authorized to have non-media access to the first logical volume; and (c) authorizing the non-media access request when it is determined in the act (b) that the first device is authorized to have non-media access to the first logical volume.

A further illustrative embodiment of the invention is directed to an apparatus for use in a computer system that includes a plurality of devices, a shared resource, and a network that couples the plurality of devices to the shared resource. The apparatus includes an input to be coupled to the network, and at least one filter, coupled to the input, that is responsive to a non-media access request by a first of the plurality of devices to a logical device at the shared resource for which the first device has no data access privileges, to determine whether the first device is authorized to have non-media access to the logical device, and to authorize the non-media access request when it is determined that the first device is authorized to have non-media access to the logical device.

Another illustrative embodiment of the invention is directed to a computer readable medium. The computer readable medium includes a data structure relating to access management by a plurality of network devices to data stored on a plurality of logical devices of a shared resource. The data structure includes a plurality of records each corresponding to one of the plurality of network devices. A first record of the plurality of records corresponds to a first of the plurality of network devices and includes configuration information identifying each logical device of the plurality of logical devices to which data access by the first network device is authorized. The first record further includes visibility information identifying whether the first network device is authorized to have non-media access to a first logical device of the plurality of logical devices when the configuration information corresponding to the first network device identifies that no data access to the first logical device from the first network device is authorized.

A further illustrative embodiment of the invention is directed to an apparatus for use in a computer system that includes a plurality of devices, a storage system, and a network that couples the plurality of devices to the storage system. The apparatus includes an input to be coupled to the network, a data structure that stores configuration information identifying each logical volume of data of a plurality of logical volumes of data stored on the storage system to which data access by a first device of the plurality of devices is authorized, and at least one filter, coupled to the input, that is responsive to a non-media access request by a first of the plurality of devices to a first logical volume of data of the plurality of logical volumes of data for which the first device has no data access privileges, to determine whether the first device is authorized to have non-media access to the first logical volume of data, and to authorize the non-media access request when it is determined that the first device is authorized to have non-media access to the first logical volume of data.

According to a further illustrative embodiment of the invention, a storage system is provided. The storage system includes a plurality of storage devices that store a plurality of logical volumes of data, a data structure to store configuration information identifying whether a first network device of a plurality of network devices that are coupled to the storage system is authorized to access data on a first logical volume of the plurality of logical volumes, and a filter, responsive to the configuration information stored in the data structure, to selectively forward non-media access requests from the first network device to the first logical volume when the configuration information identifies that no data access to the first logical volume from the first network device is authorized.

BRIEF DESCRIPTION OF THE DRAWINGS

FIG. 15 illustrates one method of graphically representing network devices and portions of data stored on a storage system that can be provided by a graphical user interface;

FIG. 16 illustrates one method of graphically representing how data is stored on a storage system that can be provided by a graphical user interface;

FIG. 19 illustrates a management window showing a second step in the configuration process of FIG. 18, for configuring access to specific ports on a storage system, using a graphical user interface;

FIG. 20 illustrates a management window showing a third step in the configuration process of FIG. 18, for configuring access to a specific port on a storage system from a specific port on a host system, using a graphical user interface;

FIG. 24 is a block diagram of one embodiment of a configuration data structure that may be used to store filtering information, including volume visibility information, for use by the storage system of FIG. 23;

DESCRIPTION OF DETAILED EMBODIMENTS

Figure 1A:
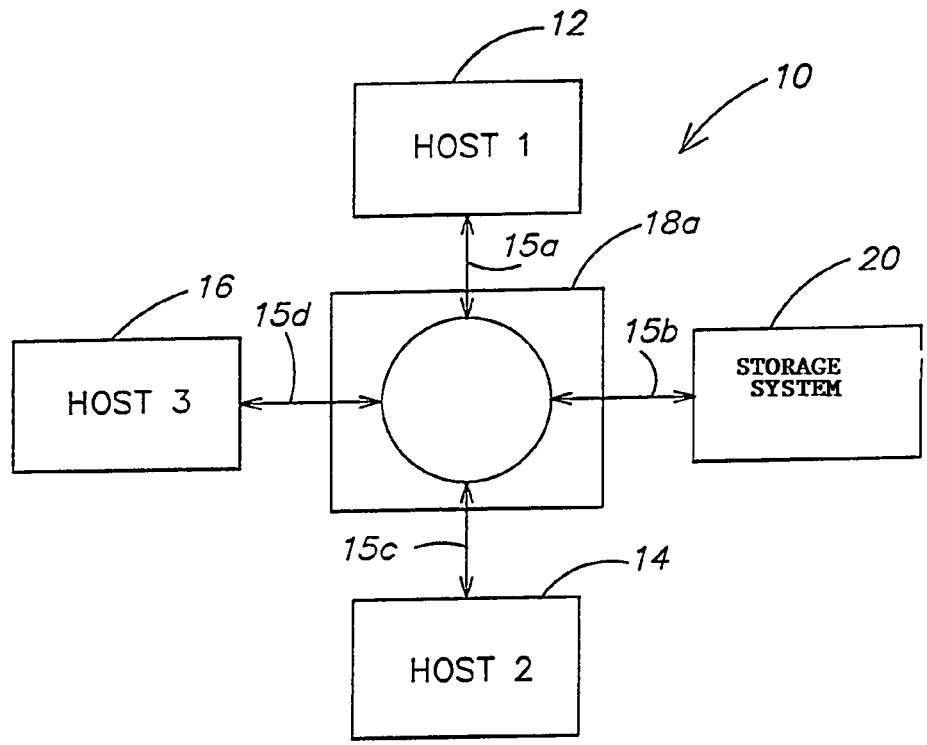
FIGS. 1A, 1B and 1C illustrate exemplary network configurations in which the data management aspect of the present invention can be employed.

The present invention is directed to a data management method and apparatus for managing accesses by multiple devices (e.g., host processors, file servers and the like) to data at a shared resource (e.g., a shared storage system). According to one embodiment, the shared resource selectively services requests from the devices for portions of data at the shared resource in response to configuration data associated with each of the portions of data at the resource.

In one embodiment, data at the shared resource is apportioned into volumes. Configuration data identifies which volumes of data are available for access by each of the devices coupled to the resource (e.g., over a network). The shared resource includes a filter that selectively forwards a request for servicing depending upon the identity of the device issuing the request and the configuration data associated with the volume to which access is sought. The filter forwards only those requests for volumes that the device has privileges to access. Requests to volumes for which the device does not have privileges are not serviced.

Filtering requests at the resource allows the control of the data management to be centralized in one location, rather than distributed throughout the network. Centralizing the data management control at the storage system removes the need to trust the hosts seeking access to the storage system to only access certain portions of data.

In one embodiment of the invention, in addition to filtering requests to support data management at the resource, security protection may be added to further secure the data at the resource. Because filtering is performed in response to the identity of the device initiating the request, data security may be compromised if a device falsely represents its identity to gain access to the resource. In addition, data transfers between the device and the resource may be corrupted by other devices coupled (e.g., over a network) to the resource. In one embodiment, an authentication method and apparatus is provided to verify that the device that is represented as the device issuing the request is truly the device that issued the request. The authentication method may therefore be implemented to overcome security problems associated with a device misrepresenting its identity to obtain data at the resource. In another embodiment, a validation method and apparatus is provided to ensure that information, transferred between the device and the shared resource is not corrupted (either inadvertently or intentionally) during transit.

A data management system for managing data at a resource may use any or all of these filtering, authentication and validation techniques. One exemplary system wherein the data management method and apparatus of the present invention may be employed is in a networked computer system, wherein the devices are host processors or file servers coupled to the network, and the shared resource is a storage system (e.g., a disk device storage system). It should be appreciated that the use of a network, host processor or shared disk device is not a limitation of the present invention, and that such a system configuration is described below solely for purposes of illustration.

In one embodiment, one or more hosts may be coupled to one or more storage systems using a network, with requests and responses being forwarded to and from the storage systems over the network according to the protocol of the network. In addition, each host and storage system may include one or more ports for interfacing the host or storage system to a corresponding one or more networks. As described above, in one embodiment, each storage system in the network includes logic for filtering received requests to manage data accesses to the storage system.

Figure 1B:
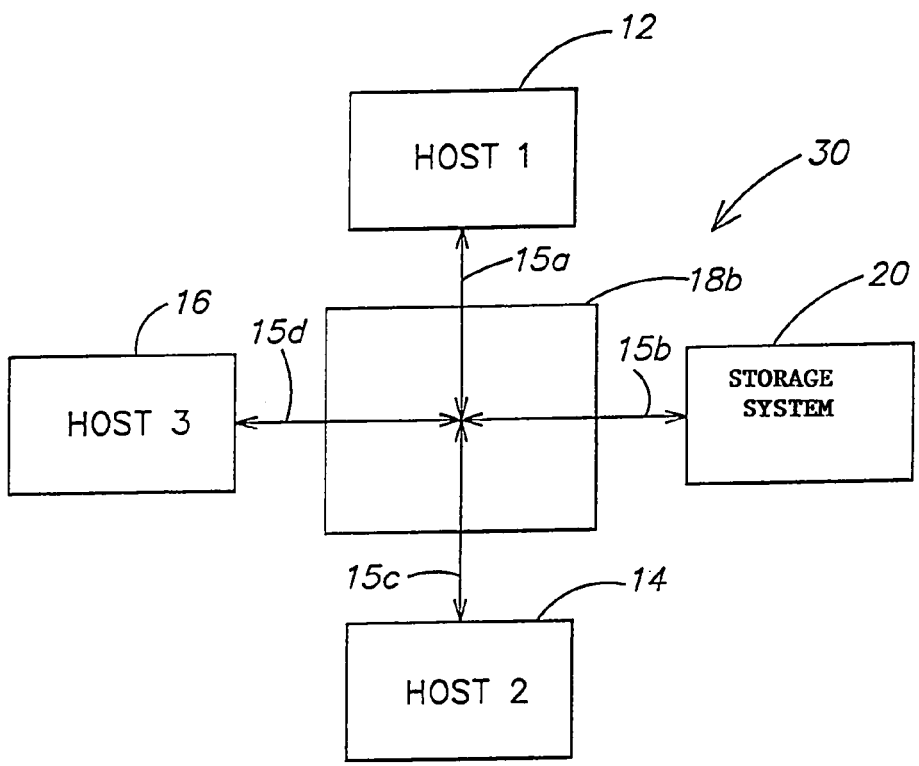
Figure 1C:
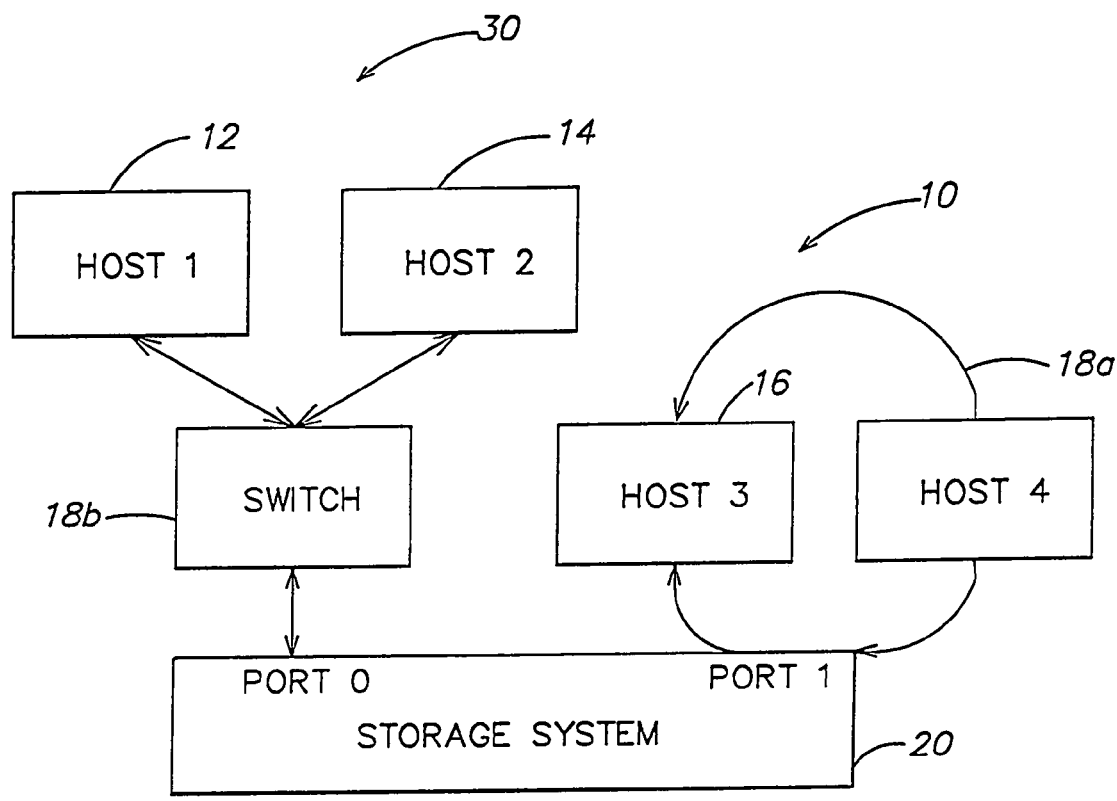

One exemplary network in which the present invention may be employed is a Fibre Channel network, although the present invention is not limited to the use of the Fibre Channel network or any other particular network configuration. Three example Fibre Channel network configurations are illustrated in FIGS. 1A, 1B, and 1C. FIG. 1A illustrates a network 10 arranged in a loop configuration, where all devices in the network are coupled together in a single loop. In FIG. 1A, three host processors 12, 14 and 16 are shown coupled to a storage system 20 by a hub 18a. Internally, the hub is arranged in a loop configuration. Communication between the devices, over the busses 15a–15d, is performed by passing data packets from one device to the next in the loop. FIG. 1B illustrates a network 30 arranged in a fabric configuration, where all the devices are coupled together by a switch 18b. Communication between pairs of the devices 12, 14, 16 and 20 in the network 30 is controlled by the switch 18b. The data management method of the present invention may be employed in networks arranged in the loop or fabric configurations illustrated in FIGS. 1A and 1B, or alternatively in other network or resource sharing configurations. For example, the data management aspect may be employed in the network illustrated in FIG. 1C. In FIG. 1C, a host/storage system configuration is shown where the storage system includes two ports, each of which interfaces the storage system to a different network. In FIG. 1C, a first port (Port 0) is coupled to a fabric network 30 and a second port (Port 1) is coupled to a loop network 10.

As mentioned above, the data management aspect of the present invention configures volumes of data at the storage system 20 according to the identity of the host devices coupled to the storage system. The configuration data that is used to manage the allocation of volumes to different hosts may be provided, for example, by a system administrator of the network. The system administrator tracks the host devices that are coupled to the network and the available volumes at the storage system. As a new host device enters the network, the system administrator allocates storage system volumes to the host. The number of volumes allocated to the host may be based on a requested number of volumes, or alternatively may be based on historical data requirements of the host. The system administrator may be implemented in software, executing on one of the devices or storage systems in the network, and may include a graphical user interface to enable users to monitor the availability and assignment of volumes to different hosts in the network. The present invention is not limited to any particular implementation of the system administrator.

Generally, as each device enters the network it queries the network to identify the other devices coupled to the network. Each device that responds to the query returns one or more identifiers for the device. For example, the identifier may include the world wide name (WWN) assigned to the device by the manufacturer of the adapter board using a naming convention. The identifier may also include a source identifier (ID). Both are unique identifiers for the device, however the source identifier is generally a shorter identifier than the WWN. The source identifier may identify the device (e.g., a host processor) and the port of the device that is coupled to the network. Thus, if multiple ports of the particular device are coupled to the network, an identifier may be returned for each port. When the query operation is complete, each of the devices has knowledge of the other devices coupled in the network. Once each device has knowledge of the other devices in the network, this information can be used to exchange data between devices.

Requests and responses to and from the storage system 20 are forwarded over the networks 10 and 30 according to the network protocol. The Fibre Channel interconnect is capable of carrying multiple interface command sets. Accordingly, the devices that are coupled together using the Fibre Channel network may communicate using any of a number of higher level protocols including Internet Protocol (IP), Small Component System Interconnect (SCSI) protocol, or any of a number of other protocols, provided that the interfacing devices have knowledge of the type of protocol that is being used on the particular Fibre Channel interconnect. Certain types of devices have historically been designed to communicate using certain protocols. For example, host processor devices have historically communicated with storage systems using the SCSI protocol. Thus, devices coupled using the Fibre Channel network may communicate with each other using the same protocols that have historically been used. As a result, existing interfaces of the devices require little redesign to couple to the Fibre Channel network.

Tunneling techniques typically are used to convert packets of any type of protocol into packets that may be propagated on the Fibre Channel network. Using tunneling, one packet, formatted according to a first protocol, is enveloped in a second packet formatted according to the Fibre Channel network protocol. Thus, a SCSI packet may be enveloped in a Fibre Channel packet by a host processor or storage system for transmission on a Fibre Channel network. One example of a packet formatted according to a SCSI protocol and enveloped in a Fibre Channel packet is illustrated in FIG. 2.

Figure 2:
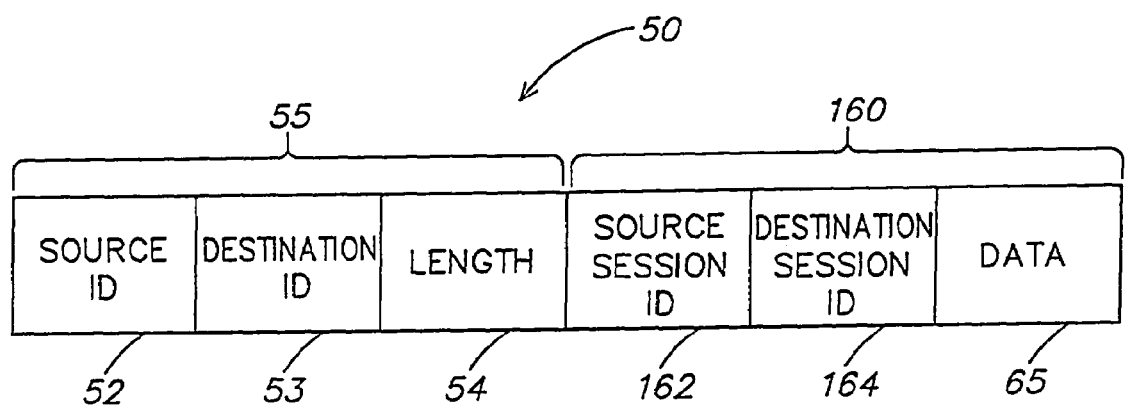
FIG. 2 illustrates one embodiment of a packet that can be distributed between devices coupled in the networks of FIGS. 1A, 1B or 1C.

In FIG. 2, a Fibre Channel packet 50 includes a header portion 55 and a payload portion 160. The header portion 55 includes a source ID field 52, a destination ID field 53 and a length field 54. The source ID field 52 identifies a device in the network that initiated the transmission of the packet 50. The destination ID field 53 identifies a target device for receiving the packet in the network. The length field 54 identifies a number of bytes in the packet. In addition, other fields defined in the Fibre Channel specification also may be included in the header, although these fields are omitted herein for clarity purposes. The source ID field 52 and destination ID field 53 are used in the exemplary system of FIG. 1C to identify particular host processors and the storage system. When a host issues a request packet to the storage system, the source ID identifies the host and the destination ID identifies the storage system. In accordance with one embodiment of the invention, the storage system uses the source ID field 52 of the packet to index into configuration data identifying which of the volumes of data the respective host has privilege to access.

As mentioned above, the source ID field for a host accessing the storage system 20 can be used to identify the host that issued the request to index into configuration data for the host at the storage system. The configuration data identifies the portions of the storage system that are accessible by the host. Thus, the configuration data can be used by filter logic at the storage system to selectively service the host's request. Exemplary components of a host and storage system that may be used to implement the method an apparatus for filtering requests based on a host identifier will now be described with regard to FIGS. 3–5.

As described above, in one embodiment of the invention, the storage system determines whether a received request should be serviced based on the configuration data. A copy of the configuration data may be stored in a memory at the storage system. Periodically, the configuration data may be updated by the system administrator as hosts enter and exit the network. The storage system also includes logic for communicating over the network and filtering logic, coupled to the memory that stores the configuration data, for determining whether a request received from the network should be serviced. The above-described data management system may be implemented in a variety of ways and the present invention is not limited to any particular implementation. However, for purposes of clarity, one embodiment of a host processor and storage system capable of providing this data management functionality is illustrated in FIG. 3.

Figure 3:
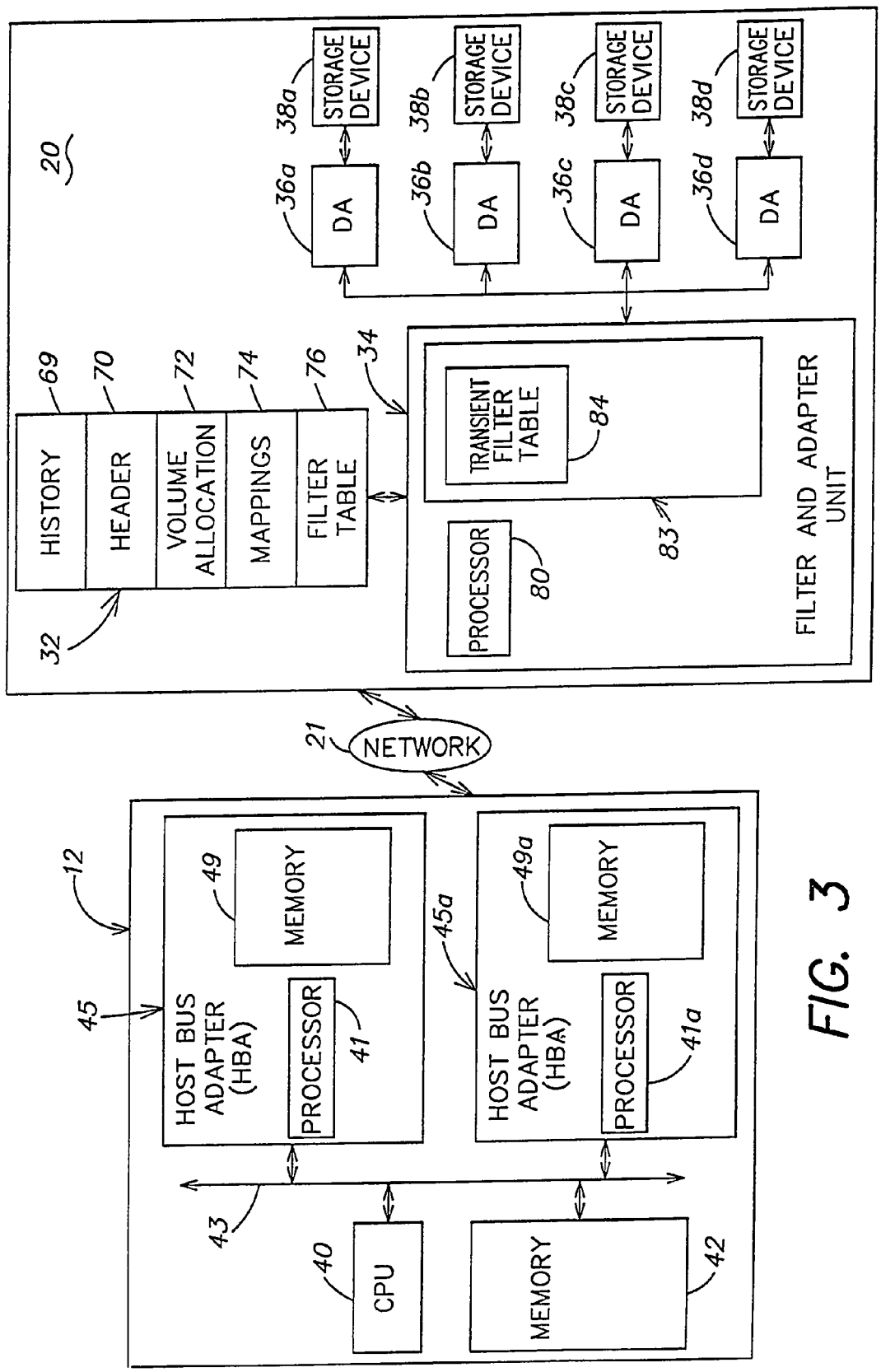
FIG. 3 is a block diagram illustrating exemplary components of a host processor and storage system which may be coupled in the networks of FIGS. 1A, 1B or 1C, the storage system including an adapter having elements for filtering requests issued by the host processor.
Figure 4:
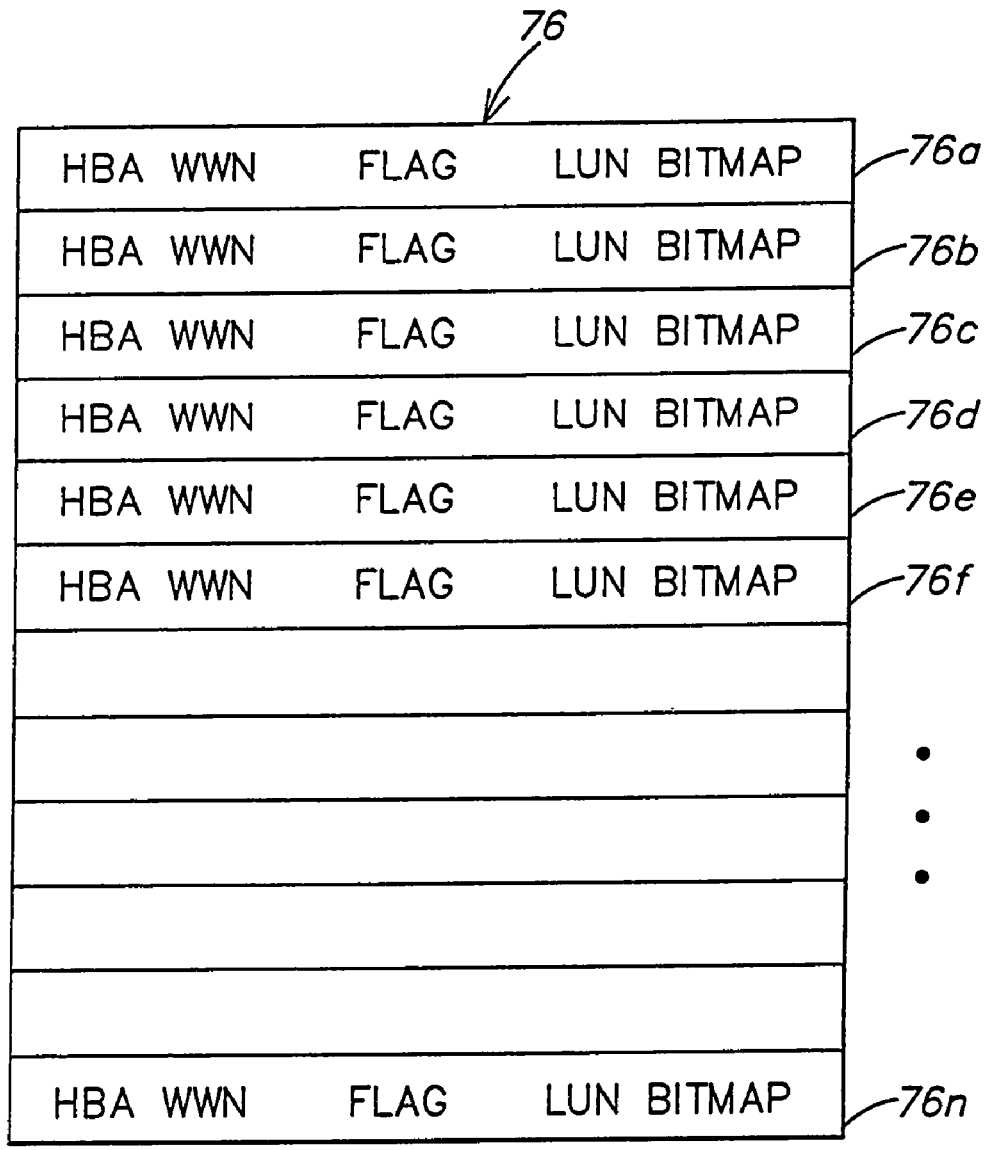
FIG. 4 is a block diagram of one embodiment of a configuration data structure that may be used to store filtering information for use by the storage system of FIG. 3.

FIG. 3 illustrates a host processor 12 coupled to a storage system 20 using a network 21. The network 21 may be, for example, a Fibre Channel network arranged in any of the configurations illustrated in FIGS. 1A–1C. The host processor 12 may be a multi-processing unit, including one or more central processing units such as CPU 40 coupled by a local bus 43 to a memory 42. One or more host bus adapters (HBAs) 45 and 45a are coupled between the bus 43 and the network 21.

Each host bus adapter (HBA) 45 and 45a operates to connect the host processor 12 to the network. The HBAs 45 and 45a translate data received from the CPU 40 into the format dictated by the protocol of the network. In addition, the HBAs 45 and 45a translate data received from the network in packet format into data in a format usable by the CPU 40.

The host bus adapter may be implemented using a combination of hardware resident on the HBA and driver software stored in the HBA or in the memory 42. Alternatively, the host bus adapter may be implemented either entirely in hardware or software. In one embodiment, the HBA 45 includes a processor 41 coupled to a memory 49. The processor 41 controls the flow and format of data into and out of the HBA 45. The memory 49 is used to provide temporary storage of data as it is transferred to and from the network. The HBA generates packets for transmission over the network 21, with each packet including a source ID field identifying the particular HBA. Because multiple HBAs may be included at each host, multiple source IDs may be associated with the same host. It should be appreciated that the present invention is not limited to the particular implementations of host bus adapters shown in FIG. 3, as other implementations may alternatively be used.

The storage system 20 includes storage devices 38a–38d which may include one or more disk devices. Access to the storage devices 38a–38d is controlled through the use of disk adapters 36a–36d which may be implemented using a programmed processor or custom hardware design. In the embodiment illustrated in FIG. 3, a disk adapter is provided for each storage device 38a–38d, although alternatively a disk adapter may be coupled to more than one storage device. In addition, one or more of the disk adapters 36a–36d may include secondary connections to the storage devices 38a–38d of another disk adapter 36a–36d to permit recovery from failure of one disk adapter by shifting its functions to the second disk adapter.

The storage devices 38a–38d are apportioned into volume sets. One or more of the volume sets may be made available to one or more of the HBAs 45, 45a or the host processor 12. In one embodiment, references to the volumes in the storage devices 38a–38d by the HBAs are performed using logical unit numbers (LUNs). There need not be a one-to-one correspondence between the logical unit numbers provided by the host processor 12 and the physical addresses of the disk devices.

A configuration database 32 (FIG. 3) stores information regarding which ones of the HBAs have access to which ones of the volumes. As discussed above, in one embodiment information in the configuration database is received from the system administrator and is periodically updated as the configuration of the network changes.

One example of the types of data that may be stored in the configuration database 32 includes a history table 69. The history table 69 is apportioned into blocks, with one block for each of the ports of the storage system. Each block in the history table 69 includes a list of those hosts that have queried the port as they entered the network. The identification information for each host that is stored in the history table 69 may include the WWN of the host and the source ID of the host. This identification information may be used when the host logs into the storage system 20 to match an identifier of the host with configuration data for the host. The identification information that is stored in the history table 69 may also include additional information, such as an alias of the host, as described further below with respect to FIGS. 13 and 14.

The configuration database 32 may also include a header portion 70 for mapping the HBAs to the available ports at the storage system 20. A volume allocation portion 72 may be provided for allocating logical volumes of data at the storage system 20 to different HBAs. A mapping portion 74 is provided for mapping LUNs to physical addresses of the disks. In addition, a filter table 76 is provided for controlling which HBAs have access to which of the LUNs. The filter table 76 is generated using the volume allocation and mapping information and includes a record for each HBA coupled to any of the ports of the storage system. An example implementation of the filter table 76 is provided in FIG. 4. Each record 76a–76n includes the WWN associated with the HBA, a flag indicating whether the volumes allocated in this entry are shared, and a LUN map identifying which of the logical volumes the HBA may access. In one embodiment, the LUN map is in the form of a bitmask with one bit allocated to each LUN in the storage system. In one embodiment, a bit in the bitmask is set to indicate that the associated HBA indicated by the WWN has access to the corresponding LUN, although alternatively the bit may be cleared to indicate access. In addition, alternative embodiments wherein the available LUNs are indicated differently may also be used.

The storage system 20 (FIG. 3) also includes a filter and adapter unit 34. The filter and adapter unit 34 translates packets received from the network into data blocks and control for forwarding to the disk adapters 36a–36d. In addition, the filter and adapter unit 34 performs a filtering function to ensure that only those HBAs with privileges are able to access volumes. Thus, rather than trusting that the HBAs will only access those volumes which they have been assigned, the filter and adapter unit 34 controls accesses to the disks by filtering out non-privileged requests.

In one embodiment, the filter and adapter unit 34 includes a processor 80 coupled to a memory 83. The processor is used to control the transmission and translation of data between the storage system 20 and the network 21. The memory 83 is used to store a transient filter table 84. The transient filter table 84 is apportioned into a number of tables, one for each port of the storage system. Each time that an HBA initiates a connection with the storage system 20 over one of its ports, filtering information is copied from the filter table 76 in the configuration database 32 to the appropriate entry in the transient filter table 84. The filtering information may include the source ID of the HBA logged into the port, a flag indicating whether the volumes associated with this entry are shared, and a LUN map for the HBA logged into the port, where the LUN map is copied from the filter table 76 in the configuration database.

In one embodiment, the configuration data in the transient filter table 84 is accessed for each request. The address of the request is provided in Bus/Target/LUN format, where the Bus portion indicates the Fibre Channel network address of the storage system 20, the Target portion indicates the storage system port address, and the LUN represents the volume address of the request. The address is compared with the entry in the transient filter table 84 which includes the LUN map associated with the HBA. If the bit in the LUN map associated with the addressed LUN indicates that the HBA has access to the LUN, the request is forwarded to the disk adapters 36a–36d for servicing. If not, the request is ignored.

The size of the transient filter table 84 is related to the number of ports provided at the storage system, the number of HBAs supported at each port and the number of LUNs in the storage system. An example configuration of the storage system 20 may include sixteen ports for accessing 4096 LUNs, with each port capable of supporting accesses by thirty two different HBAs. Thus, when the transient filter table 84 is large, if it was stored in a single large memory the access time for each I/O request may be long.

Figure 5:
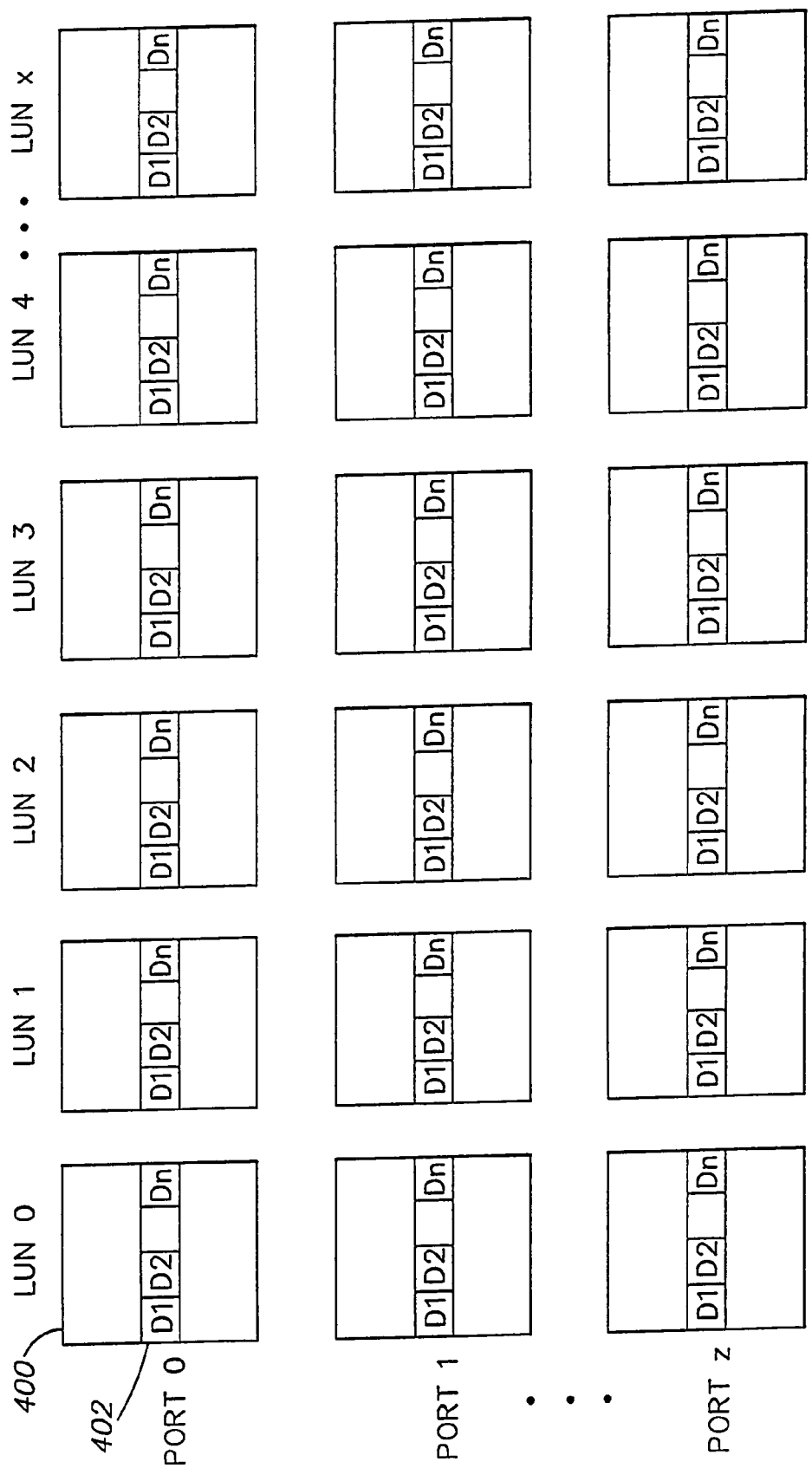
FIG. 5 is a block diagram of one embodiment of filtering data that may be used to filter requests at the storage system of FIG. 3.

In one embodiment, to increase the response time performance of the storage system 20, the transient filter table 84 is arranged to allow for quick retrieval of the access information for each HBA. Referring now to FIG. 5, one illustrative configuration of the transient filter table is shown. The transient filter table 84 is shown to include an array of records, such as record 400. One column of records is provided for each LUN in the storage system (e.g., storage system 20 in FIG. 3) numbered in FIG. 5 as LUN0 to LUNx, where x+1 is the number of LUNs in the storage system. One row of records is provided for each port at the storage system. Each record includes a bitmap 402. The bitmap includes a number of bits corresponding to the maximum number of devices (HBAs) that can access each port. In FIG. 5, these bits are indicated as D1, D2 . . . Dn, where n is the maximum number of devices that may be coupled to any port.

During operation, as an I/O request is received at the storage system 20, the address of the I/O request is compared with the data in the transient filter table 84. The address includes an identifier of the HBA which initiated the request, and an address to the storage system portion that the host wants to access. This address includes, generally, a Bus/Target/LUN combination of fields. The bus field is the base address of the storage system 20 on the network, the target is the source ID of the port of the storage system to which the request is directed, while the LUN indicates the logical unit addressed by the request. The target information (row) and LUN information (column) are used to index into the transient filter table to obtain one of the records. The source ID for the requesting device (e.g., HBA 45 in FIG. 3) is then used to select one of the bits in the bitmap 402 of the record 400 selected by the Bus/Target/LUN address to identify whether or not the bit is set in the mapping. If the bit is set in the mapping, then the request is forwarded to the disks for servicing. If not, the request is dropped.

The transient filter table 84 may be stored in memory, as illustrated in FIG. 3, or may alternatively be implemented in hardware. While the configuration of the transient database described above provides one method of accessing HBA and LUN mapping information, alternative configurations may also be used. The present invention is not limited to this implementation. Rather, any configuration database arrangement that allows mapping data to be obtained from the database using a source identifier and a resource address may be used.

Accordingly, a data management system that reserves volumes of data for host processors based on host identifiers has been described. In one embodiment, the data management system is augmented to add security protection by authenticating each request to verify that it was truly sent by the host indicated by the host identifier received at the storage system 20. Authentication of the connections to the storage system 20 secures the data volumes allocated to each of the host processors by verifying that the host requesting a data volume is truly the host indicated in the source ID of the request packet. Simply relying on the source identifier of the host processor may not be a sufficient measure of protection. In some insecure environments, a processor may issue a false source identifier in an attempt to access privileged data of another host. Authentication thus verifies that the host processor is who it claims to be, and therefore should be allowed access to the data.

In one embodiment, to support the authentication of host requests, the storage system issues a number of unique, expected identifiers to each HBA of each host device prior to the initiation of transactions by the host device. The storage system maintains a copy of the expected identifiers. When the HBA associated with the host device initiates a series of transactions, it forwards the expected identifiers that were received from the storage system back to the storage system. The storage system compares each received identifier against the expected identifier. Because the storage system only forwarded the identifiers to the particular HBA associated with the host, if the correct identifier is received, the storage system can verify that, in fact, the request was issued from the indicated host. In one embodiment, the level of security protection is further enhanced by using a random number for each identifier. In another embodiment, an encryption key, known only to the host and the storage system, is used to encrypt the identifier before it is sent to the storage system. The storage system may then decrypt the identifier using the encryption key. Encrypting the identifier prevents other devices that are coupled to the network from obtaining the identifier and gaining access to privileged data. Thus, a two-tiered level of authentication is provided, since each transaction has a unique identifier, known only to the issuing host, and the identifier is encrypted using a unique access key known only to the HBA at that host.

In one embodiment, the identifier information is transferred between the devices on the network (e.g., the host and the storage system 20) using selected fields of the packet. Referring again to the example packet of FIG. 2, illustrated in the payload portion 160 of the packet 50 are some of the fields that are used to communicate according to the SCSI protocol. These fields include a source session ID 162, a destination session ID 164 and a data field 65. According to the SCSI protocol, the source session ID and destination session ID are used to track an order of transactions between an initiating device and a target. The SCSI protocol allows a number of transactions to be simultaneously outstanding between an initiating device and a target device. For example, a host initiator may issue a number of I/O requests to different volumes in a target storage system. Depending upon the accessibility of each of the volumes, the order in which the responses to the requests are returned to the host may differ from the order of the issued requests. The session IDs are used to align requests with responses at the host. The session IDs provided for each transaction may be arbitrary numbers as long as they are unique across a given time period. Because the session ID may be any arbitrary number, in one embodiment the session ID fields are used to transfer unique identifier information for each transaction.

Figure 6:
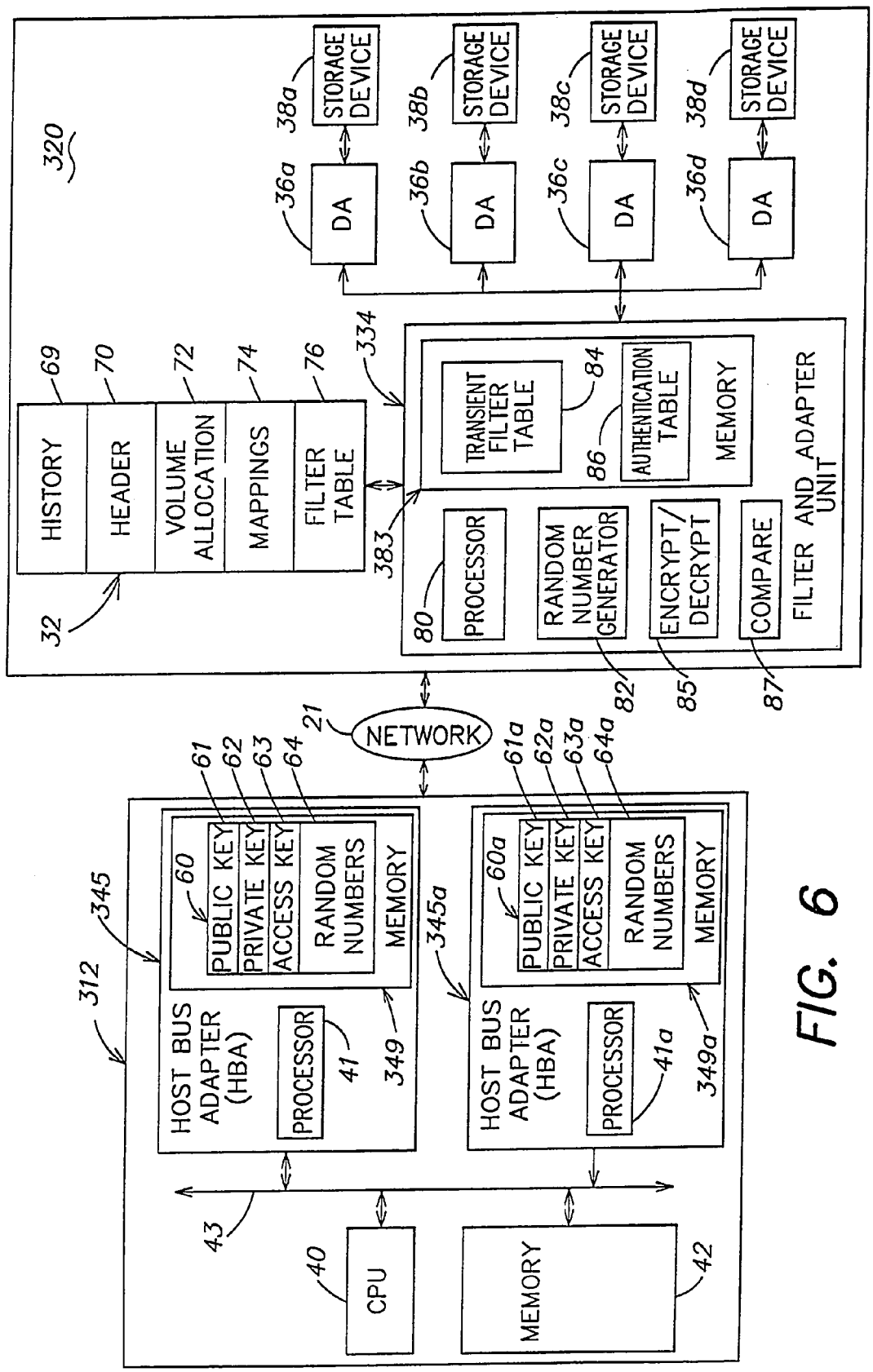
FIG. 6 is a block diagram illustrating exemplary components of a host processor and storage system that may be coupled in the network of FIGS. 1A, 1B or 1C, the storage system including logic for authenticating transactions by the host.

The above-described authentication method may be implemented in a variety of ways and the present invention is not limited to any particular implementation. However, for purposes of illustration, an embodiment of a host processor 312 and storage system 320 including components for providing the above-described authentication functionality is shown in FIG. 6. In FIG. 6, the host bus adapter 345 stores in its memory 349 a data structure 60. The data structure 60 includes, for each storage system 320 coupled to the HBA, a public key 61, a private key 62, an access key 63, and a list 64 of one or more random numbers. Each of the keys is a field of bits which may be used to encrypt and decrypt data using techniques known to those of skill in the art. Encryption and decryption are performed by applying the bit values of the keys to bit values of data using logical operations associated with a selected encryption algorithm. The access key is a key that is dedicated to encrypting and decrypting authentication data transferred between the HBA and the associated storage system. In one embodiment, an initial value for the access key 64 is obtained using the public and private keys 62 and 63, respectively, as will be described in more detail below.

To support authentication, the storage system 320 includes a filter and adapter unit 334 that may include each of the features described with regard to FIG. 3, as well as a number of other components to support authentication. The filter and adapter unit 334 includes a random number generator 82 which is used to provide random numbers used in the authentication process for each of the HBAs coupled to the storage system. Coupled to the random number generator 82 is an encrypter/decrypter 85 and a comparator 87. The transient filter table 84, authentication table 86, random number generator 82, encrypter/decrypter 85 and comparator 87 are used in conjunction to authenticate connections to the storage system 20 using a method that will be described in more detail below.

Figure 7:
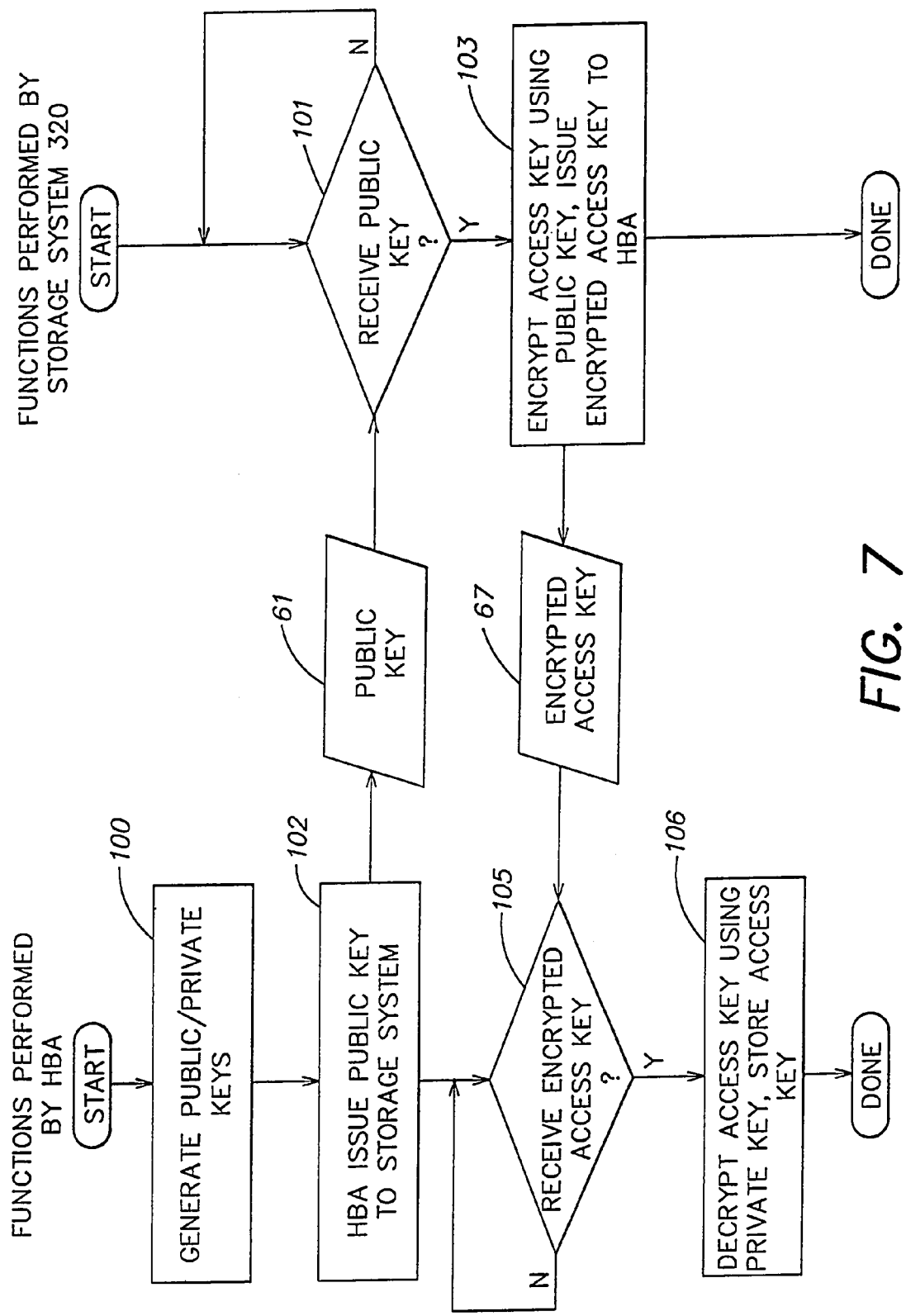
FIG. 7 is a flow diagram illustrating one method of distributing encryption keys between a host processor and storage system of FIG. 6, so that the encryption keys can be used to authenticate the identity of the host processor.

As described above, the authentication method involves the transfer of identifiers between the host 312 and the storage system 320 over the network 21. In one embodiment, the identifiers are encrypted using an access key stored at the host 312 and at the storage system 320, although this is not a requirement of the invention. FIG. 7 illustrates one method of distributing an access key to the host 312 and the storage system 320.

Access keys may be provided in a number of ways, including allocating access keys to the storage system and host processors in advance of their entry to the network. Alternatively, an access key may be obtained after the host processor has entered the network in a manner described with regard to the data flow diagram of FIG. 7. In FIG. 7, operations performed by the HBA 345 (FIG. 6) are illustrated on the left hand side of the figure, operations performed by the storage system 320 are illustrated on the right hand side of the figure, and data flows are illustrated between the two sides. At step 100, the HBA 345 (FIG. 6) generates a public and private key pair. This can be done, for example, using known encryption software executing on the CPU 40. The public and private key pair is dedicated to the HBA and is not accessible by any other device coupled to the network 21 (FIG. 6). Data which is encrypted by the public key 61 can only be decrypted using the private key 62, while data that is encrypted by the private key 62 can only be decrypted using the public key 61.

At step 102, the HBA 345 forwards the public key 61 over to the storage system 320. In step 101, the storage system 320 loops, waiting for the key. When the storage system 320 receives the public key at step 101, it proceeds to step 103. In step 103, using the public key 61, the storage system 320 encrypts an access key for the HBA 345, forwards this encrypted access key 67 back to the HBA 345 over the network 21 (FIG. 6) and terminates. Because the HBA 345 is the only device in the network that has the private key 62 that must be used to decrypt any message encrypted with the public key, other devices that are monitoring the transactions on the network will not be able to decipher the encrypted access key 67 forwarded by the storage system 320. When it is determined at step 105 that the HBA 345 has received the encrypted access key 67, the process running on the HBA 345 proceeds to step 106, wherein the HBA 345 decodes the encrypted access key using the private key 62. In addition, at step 106, the HBA 345 stores the access key in data structure 60 with the public key 61 and private key 62 for later communications with the storage system 320.

Once the host processor has received the access key, it may begin the process of issuing I/O requests to the storage system 320. The processes by which a host processor issues an I/O request, and by which an I/O request is serviced by the storage system 320 in accordance with one embodiment of the invention will now be described with regard to the flow diagrams of FIGS. 8a–b and FIG. 9.

Figure 8A:
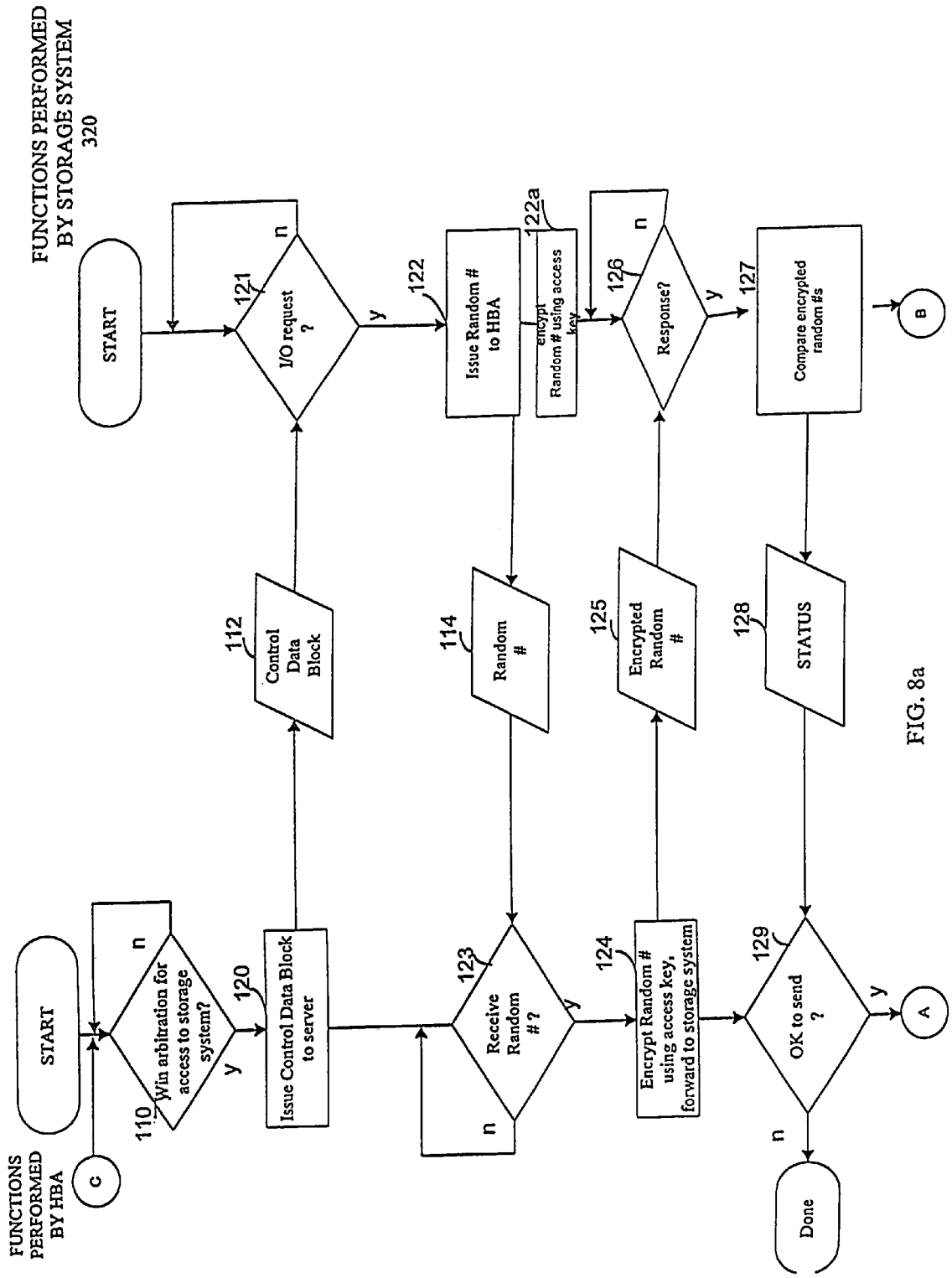
FIG. 8a is a flow diagram illustrating one method of authenticating the identity of a host processor when establishing a connection between the host processor and storage system of FIG. 6.

In FIG. 8a, a flow diagram is provided for illustrating one embodiment of a method that may be performed to establish a connection between the HBA 345 and the storage system 320. In FIG. 8a, operations performed by the HBA 345 are indicated on the right hand side of the figure, operations performed by the storage system 320 are indicated on the left hand side of the figure, and data flows are shown in between. At step 110, the HBA 345 arbitrates for access to the storage system 320. At step 120, when the HBA 345 has won arbitration, it issues a control data block 112 to the storage system 320. The control data block 112 includes the source ID of the HBA 345 and indicates that the HBA requests to be serviced by the storage system 320. When it is determined at step 121 at the storage system 320 that there is an outstanding request from the HBA, the method proceeds to step 122 wherein in response to the host's request, the storage system 320 forwards a unique identifier 114 to the HBA 345. In one embodiment, the identifier is a random number provided in the destination session ID 164 of the payload portion 160 of the packet 50 as illustrated in FIG. 2. At step 122a, after the storage system has forwarded the random number to the HBA, the storage system 320 encrypts the random number 114 using the access key and stores the encrypted random number for later comparison.

When it is determined at step 123 that the HBA has received the random number from the storage system 320, at step 124 the HBA encrypts the random number 114 using the access key 63 (obtained using the process of FIG. 7), and returns the random number to the storage system 320 as an encrypted number 125. When it is determined at step 126 that the storage system 320 has received a response, at step 127 the storage system 320 compares the received random number 125 against the previously encrypted and locally stored version of the random number generated at step 122. The compare status 128 is forwarded to the HBA. If there is not a match, this indicates to the storage system that the host does not have the correct access key, and/or that the host does not know the correct random number and the connection between the host processor and the storage system is not authenticated. The HBA is not permitted to access data at the storage system 320, and the transaction is complete. If there is a match, then the host has the correct access key, and the correct random number and connection between the HBA and the storage system is authenticated.

Once the connection between the HBA and the storage system has been authenticated, the HBA may send an I/O request to the storage system 320 for servicing. In one embodiment of the invention, every I/O transaction is authenticated using a different identifier (e.g. random number). Because the SCSI protocol allows for multiple I/O requests from an HBA to be outstanding at any given time, the HBA keeps track of the outstanding I/O requests using a technique referred to as command tag queuing. Each I/O request is assigned a unique tag, using the source session ID field 62 (FIG. 2). When a response is returned from the storage system, the tag is included in the session ID field of the response so that the response data may be aligned with the request using the tag.

The maximum number of I/O requests that an HBA may have outstanding at any instant in time is determined according to the command tag queuing protocol. Because each I/O request is assigned a unique identifier, each HBA should always include a sufficient number of identifiers to ensure that an identifier can be provided for each outstanding request. Therefore, according to one embodiment, as each device logs into the storage system a list of unique identifiers is forwarded to the device. The number of identifiers in the list corresponds to the maximum number of I/O requests capable of being outstanding at the device, although the present invention is not limited to this number. As each device issues a request to the storage system, one of the identifiers is used from the list. Each time that the storage system responds to a request, it returns a new identifier which is stored at the bottom of the list. Identifiers are selected in first in first out order from the list. As a result, a constant number of identifiers is maintained at the device to satisfy command tag queuing protocols.

One embodiment of a method of providing the identifiers to the host is described below. Because a unique identifier or random number will be associated with each I/O request, at the start of an I/O sequence, the HBA requests a number of random numbers equal to the maximum number of permissible outstanding I/O requests. The list of random numbers is stored as list 64 in data structure 60 (FIG. 6) of the HBA 345 and is additionally stored in the authentication table 86 of the filter and adapter unit 334 (FIG. 6) of the storage system 320.

Figure 8B:
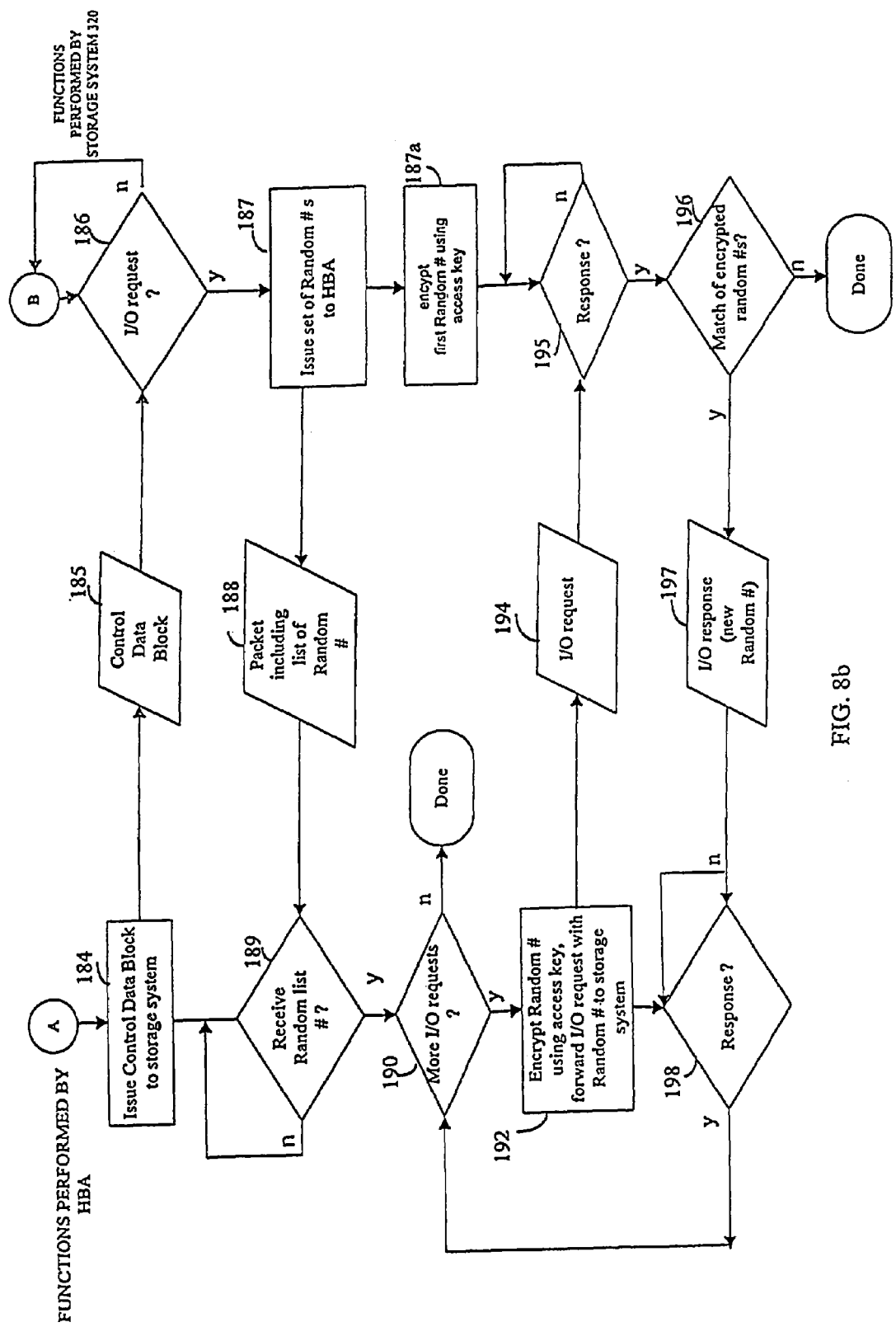
FIG. 8b is a flow diagram illustrating one method of authenticating the identity of a host processor for each of a series of communications between the host processor and storage system of FIG. 6.
Figure 9:
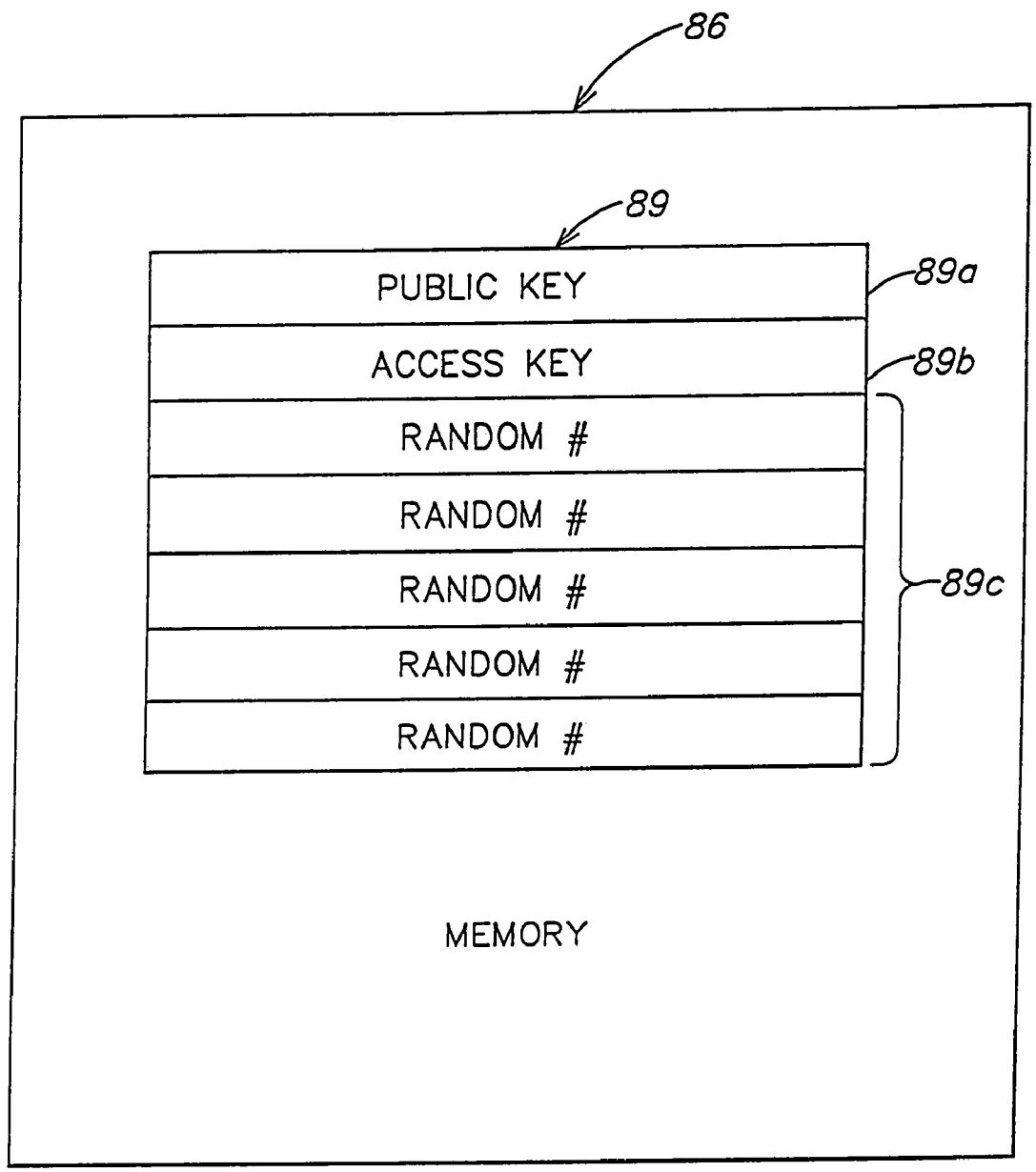
FIG. 9 is a diagram illustrating exemplary components that may be included in an authentication table of the storage system of FIG. 6 and that may be used to authenticate the identity of host processors.

Referring now briefly to FIG. 9, an example of elements that may be stored in the authentication table 86 (FIG. 6) is shown. For each of the HBAs that is coupled to the storage system 320, a data structure 89 is provided. The data structure may include a public key 89a, which is a copy of the public key 61 that was provided by the HBA to obtain the initial access key 63. In addition, the data structure 89 may include an access key 89b, which is a copy of the access key 63 stored at HBA 345. In one embodiment, each of the data structures further includes a list of random numbers. The random number in each entry of the data structure 89c corresponds to a random number that will be used to authenticate an associated transaction. How the random number is used to authenticate a transaction is described in more detail with regard to FIG. 8b.

In FIG. 8b, at step 184, the HBA issues a control data block 185 to the storage system 320. The control data block 185 includes control for notifying the storage system 320 that the HBA is going to initiate an I/O transaction, and that the connection has been authenticated. When it is determined at step 186 that a request has been received, the storage system 320 decodes the request and at step 187 forwards a packet 188 including a list of random numbers to the HBA 345. At step 187a, the storage system 320 also encrypts the first random number using the access key and stores the encrypted number locally for later comparison with the encrypted number received in a request from the HBA.

When it is determined at step 189 that the HBA has received the packet 188, at step 190 the HBA 345 checks to determine whether there is an outstanding I/O request. If so, at step 192, the HBA 345 encrypts the first random number using the access key, stored in field 63 of the data structure 60. The HBA 345 then inserts the encrypted random number in the source session ID field of the I/O request packet, and forwards the I/O request packet 194 to the storage system 320.

When it is determined at step 195 at the storage system 320 that an I/O request packet has been received, at step 196 the storage system 320 compares the encrypted random number received in the source session ID field of the I/O request packet 194 against the encrypted random number generated at step 187. Alternatively, the storage system 20 may simply decrypt the received random number and compare it against the expected random number. If there is a match, the storage system 320 services the I/O request, and forwards a response packet 197 back to the HBA 345. The response packet includes any data requested by the HBA, and a new random number which will be used once the numbers in the list 188 are exhausted. In one embodiment, the new random number is provided in the destination session ID field, while the previous, encrypted random number is returned in the source ID field for tracking purposes, although the use of specific fields is not a limitation of the present invention.

When it has been determined at step 198 that a response has been received from the storage system 320, the HBA retrieves the non-encrypted random number from the session ID fields of the packet 197 and stores the random number in the data structure 60, The process then proceeds to step 190, where the HBA initiates the next I/O request, using the next random number from the random number list 64 encrypted using the access key.

Thus, a method is provided wherein unique identifiers are used to authenticate a host at a storage system. Although the method has been described using random numbers, it should be understood that this is not a requirement of the invention, and that any sequence of numbers that does not include a readily discernable pattern may alternatively be used. As discussed above, more than one HBA may be simultaneously connected to the storage system 320. Thus, as identifiers are distributed to coupled HBAs, their sequence will similarly be distributed among the variety of HBAs that are coupled to the storage system 320, thereby making the number distribution appear even more random and accordingly more secure. In addition, although encryption techniques have been described, it is not a requirement of the invention that identifiers be encrypted prior to transfer. Alternatively, an authentication technique may be used which does not include identifiers for each request but encrypts the entire request using the access key. It is also envisioned that a different access key may be provided for each transaction. The present invention may incorporate any combination of these authentication techniques and is therefore not limited to the specific embodiments discussed above.

The above techniques may be used to verify that a connection between an initiator and a target is authorized. In another embodiment, techniques are also used to ensure that the data that is received at the target is the data that was sent by the initiator. Accordingly, further security may be obtained by applying validation methods to ensure that commands and data are not corrupted during a transfer from the initiator to the target. The validation method may be provided to preclude other devices that are coupled to the network from interfering with transactions between the initiator and the target.

According to another aspect of the invention, a method for validating a data transfer between a source and a target over the network includes the step of maintaining, at both the target and the initiator, a digital signature of the transfer. The digital signature is in the form of a checksum. Each byte of data that is transferred between a target and an initiator is combined with the previous bytes of the transfer using a hashing function to form the checksum. The hashing function may be, for example, an exclusive OR function, or some derivative thereof. The data included in the signature may include only that data forwarded by the initiator to the target, only that data forwarded from the target to the initiator, or a combination thereof.

Figure 10:
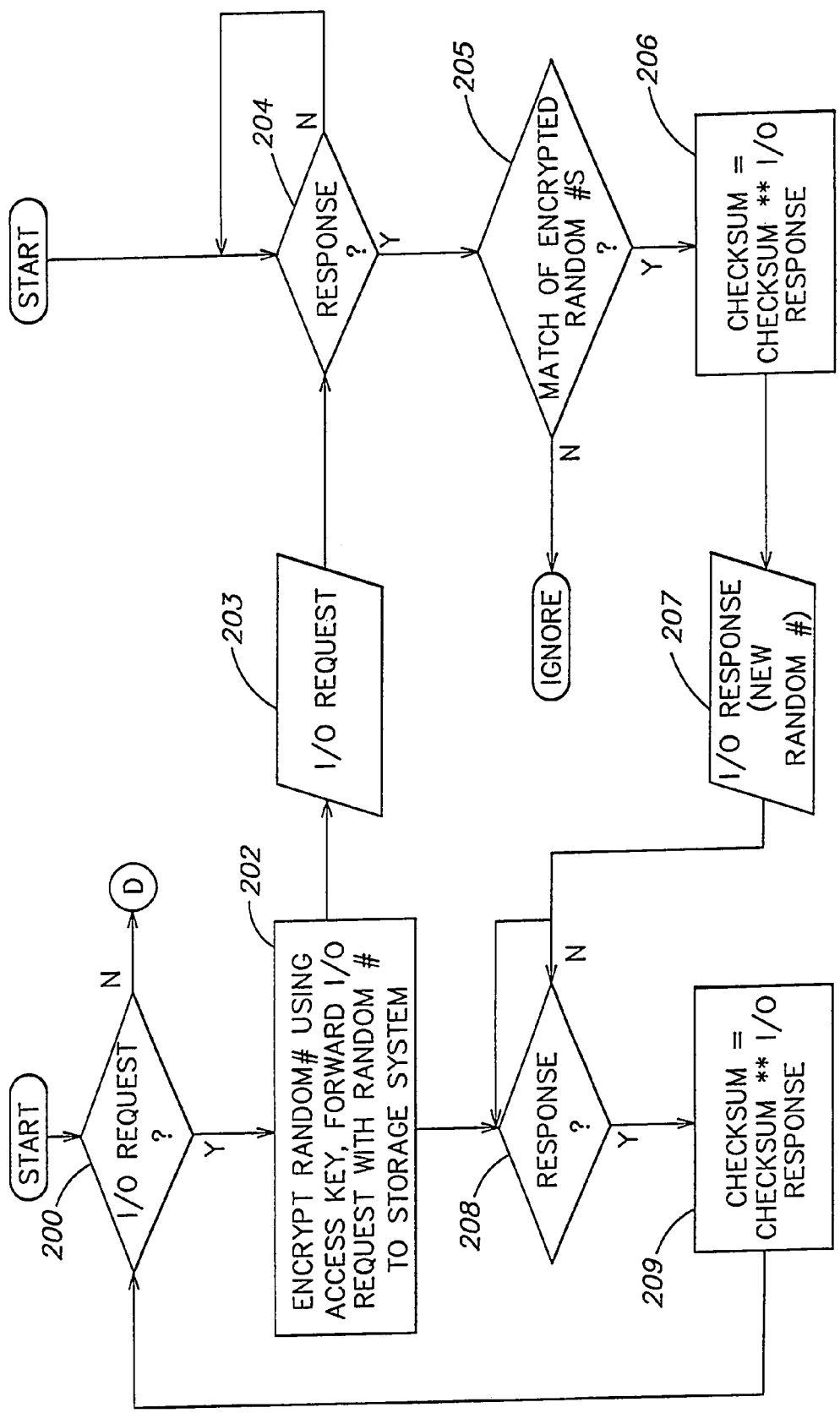
FIG. 10 is a flow diagram illustrating one method of performing a checksum of data transferred between an initiator and target in the networks of FIGS. 1A, 1B and 1C for validating data transfers.
Figure 11:
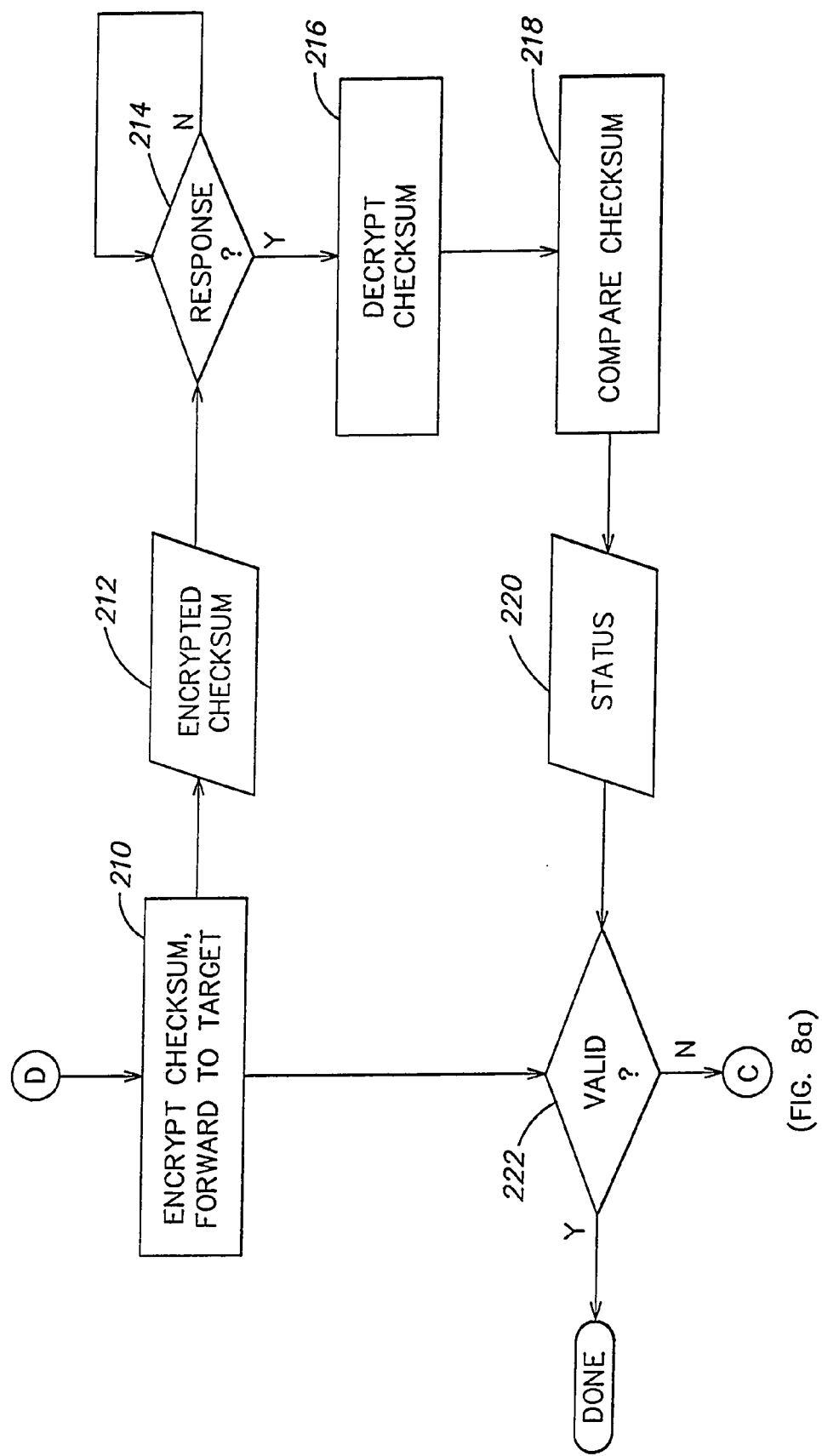
FIG. 11 is a flow diagram illustrating one method of validating a data transfer between an initiator and target using the checksum of FIG. 10.

Referring now to FIG. 10, a flow diagram of one embodiment of a method for validating a data transfer between an initiator and a target is shown. The flow diagram is similar to that described with regard to FIG. 8b, but includes steps for validating the data transfer. At step 200, it is determined at the initiator whether or not there are any I/O requests. If so, at step 202, the initiator encrypts the random number associated with the transaction and forwards the I/O request, with the encrypted random number in the source session ID, to the target. When it is determined at step 204 that the target received the request, at step 205 the target compares the received encrypted number against a stored encrypted expected random to determine a match. If there is no match, the target does not respond. If there is a match, at step 206 the target forwards a new encrypted random number and response data to the target. Also, at step 206, the target hashes the response data into the existing checksum to provide a new checksum to build the digital signature of the data transfer. The response 207 is received at the initiator in step 208. At step 209, the initiator also hashes the response data into the existing checksum to provide a new checksum to build the digital signature of the data transfer. The process of issuing I/O requests and generating checksums continues for the number of requests in the initiator/target connection. When it is determined at step 200 that there are no more requests, the process proceeds to the validation phase in step 210, illustrated in FIG. 11.

At step 210, the initiator encrypts the checksum using the access key, and forwards the encrypted checksum 212 to the target. The target receives the encrypted checksum, at step 214. At step 216, the target decrypts the checksum and at step 218 the target compares the decrypted checksum with the checksum generated by the target. The target sends a status packet 220 to the initiator indicating whether or not the checksums matched. If it is determined at step 222 at the transaction was valid (i.e., no data was corrupted), then the connection between the initiator and the target is completed. If the status 220 indicates that the transaction was not valid and that data was corrupted, then the initiator re-establishes the connection with the target and repeats the data transaction.

Thus, a data management method and apparatus has been described that provides three levels of data management. Filtering is provided to ensure that each host only accesses volumes of data for which it has privileges. Security may be incorporated using authentication methods to verify that each request was truly issued by the host indicated in the identifier of the request. Finally, validation may be provided to ensure that data is not corrupted during transit. A system using the data management method and apparatus of the present invention may incorporate one or more of these levels of data management independently, and thus the present invention is not limited to a system including all the recited data management techniques described above. Such a data management system provides increased control over data accesses by users at a host processor by limiting the data capable of being accessed by the host processor. Thus, while users at a host processor may be capable of accessing all of the data allocated to the host processor (depending upon the privileges associated with the user), no user, not even a system administrator with the highest privilege at the host processor, is capable of accessing data that is not allocated to the host by the storage system, regardless of the privileges of the user on the host.

Although the above discussion relates to an exemplary system wherein a host gains access to data at a storage system, the above described methods may be applied to any system wherein a resource is shared by multiple devices. Such systems include, but are not limited to any type of storage system including disk devices, tape devices, file servers and the like.

According to a further aspect of the present invention, a user interface for a system administrator is now described. The user interface communicates with a configuration database (e.g., configuration database 32 in FIG. 3) of a storage system to enable a user or another application program to view and manage the availability and assignment of data storage volumes to different hosts in a storage network. As used herein, the term "storage network" is used to describe any type of network in which at least one host (e.g., host processor 12 in FIG. 3) is coupled to at least one storage system (e.g., storage system 20 in FIG. 3) using a network connection that permits additional network devices (such as hosts, HBAs, storage systems, switches or hubs, etc) to be interconnected therewith. Advantageously, the user interface permits network devices to be viewed and managed using identifiers that are more meaningful to a user than a WWN.

In one embodiment of the present invention, a graphical user interface (GUI) is provided with which a user can graphically view the availability and assignment of data storage volumes to different hosts in a storage network. The GUI also allows a user to graphically view the topology of the network (i.e., how network devices such as hosts, HBAs, storage systems, storage system adapters, etc., are interconnected in the network), and to graphically modify the topology of the network and/or the availability and assignment of storage volumes to different hosts in the network. Advantageously, the GUI permits network devices and the availability and assignment of storage volumes on a storage system to be viewed, managed, and modified using an alias for each host/HBA pair that is more meaningful to a user than a WWN.

In another embodiment of the present invention, a command line interface (CLI) is provided that can be used to query the availability and assignment of data storage volumes to different hosts in the network. The command line interface allows a user or another application program to generate reports illustrating the topology of a storage network (i.e., how network devices such as hosts, HBAs, storage systems, storage system adapters, etc. are interconnected in the network), and to modify the topology of the network and/or the availability and assignment of storage volumes to different hosts in the network. Advantageously, the CLI permits network devices and the availability and assignment of storage volumes on a storage system to be viewed, managed, and modified using the WWN of the device, or a more meaningful identifier that can be assigned by a user or by the storage system.

Embodiments of a user interface may advantageously be implemented in software that executes on a central processing unit of a host, such as CPU 40 of host processor 12 (FIG. 3). During execution on the CPU of a host processor, the user interface is typically stored in the memory (e.g., memory 42) of the host processor, although the interface software may be stored on any computer readable medium, such as diskette, tape, CD-ROM, etc., that is accessible by the host processor. In one embodiment of the present invention, a Java-based graphical user interface is provided. In another embodiment, a C-programming language based command line interface (CLI) is provided. However, it should be appreciated that the present invention is not limited to any particular software implementation, as any of a variety of implementations may be used.

Embodiments of a user interface according to the present invention may advantageously be implemented on a single host, or on a number of hosts distributed throughout a storage network. Moreover, embodiments of the user interface may be used to view and manage the availability and assignment of storage volumes on a single storage system or on multiple storage systems. Because the user interface may be used to modify the connection and allocation of storage volumes to different host/HBA pairs, the user interface may include password protection so that only authorized personnel can access the interface. Alternatively, for security reasons, the ability to modify the connection and allocation of storage volumes to different hosts on the storage network may be limited to a particular host. As used herein, the term "administrator host" is used to refer to any host on which the user interface is implemented and from which the availability and assignment of data storage volumes to different hosts can be modified. In one embodiment, portions of the user interface may be installed on other hosts so that they may be able to view the storage topology of the network, without having the ability to modify connections and allocation of storage thereto.

Each of the above-described embodiments of a user interface access a configuration database (e.g., configuration database 32, in FIG. 3) that is stored and maintained on a storage system to manage access within a storage network. According to a further aspect of the present invention, the configuration database 32 may include additional identification information, in addition to the WWN and/or source ID of the host/HBA, to facilitate the management of access in the storage network. In one embodiment, the configuration database may include an alias for each host, HBA, and filter and adapter unit known to the storage system, as well as an alias for the storage system itself. Thus, when managing access to storage volumes in the storage system, a user need not know in advance which WWN is associated with a particular network device to manage that device.

Figure 12:
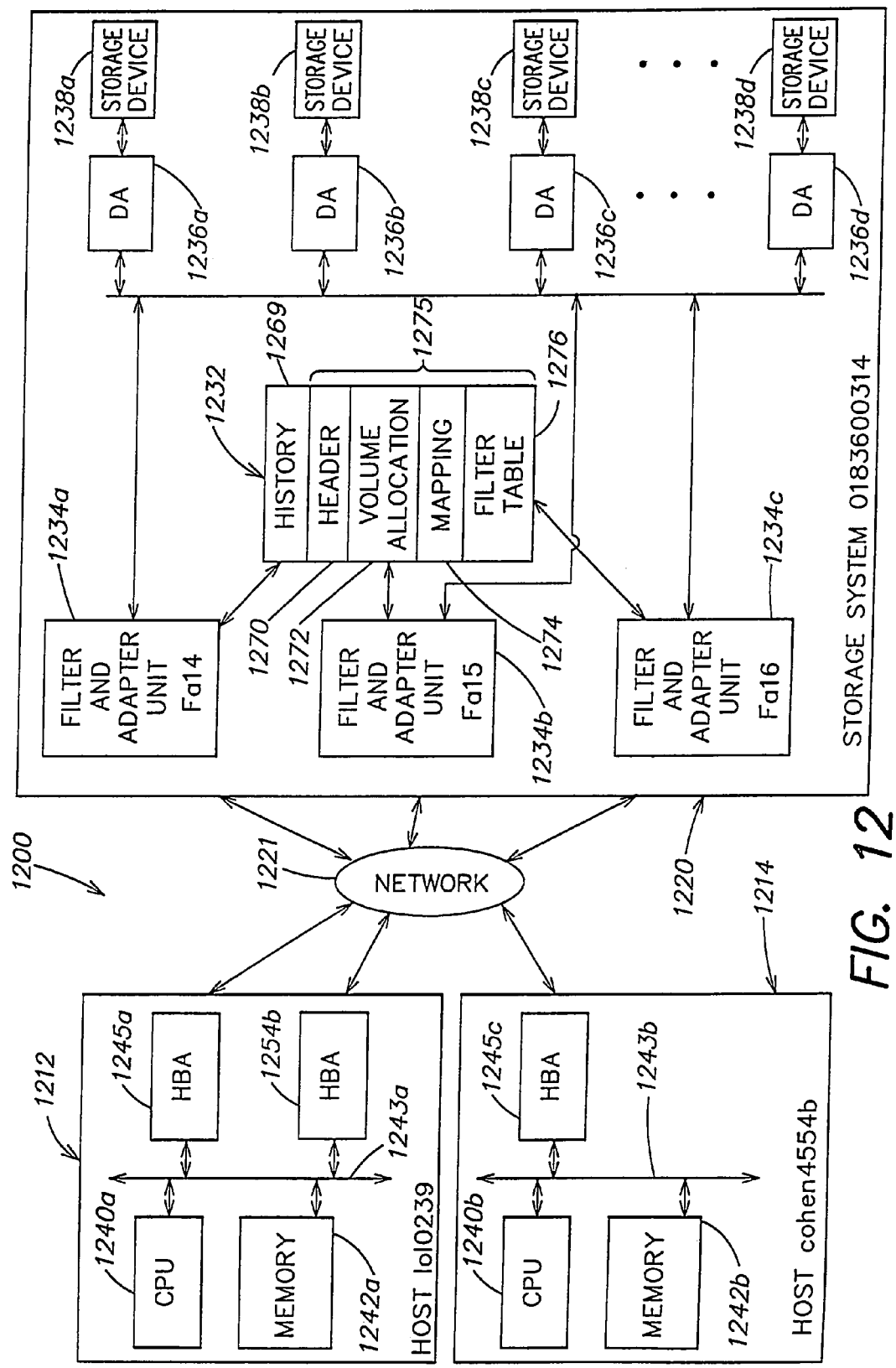
FIG. 12 is a block diagram of a storage network that includes a storage system with which various aspects of the present invention may be employed.

FIG. 12 illustrates an exemplary storage network 1200 that will be used to describe various aspects of the present invention. It should be appreciated that the network topology illustrated in FIG. 12 is exemplary only, as embodiments of the present invention can be used with network topologies that are different (e.g., more complex, or less complex) than that shown in FIG. 12.

As shown in FIG. 12, a number of host processors 1212, 1214 are coupled to a storage system 1220 using a network 1221. Host processor 1212 has been assigned Internet Protocol (IP) node name "lol0239". As known to those skilled in the art, an IP node name is an alphanumeric identifier for a network device that corresponds to a unique IP address that the network device uses to communicate with other network devices on an IP network. Host processor 1212 includes two HBAs, HBA 1245a and HBA 1245b. Host processor 1214 has been assigned IP node name "cohen4554b" and includes a single HBA, HBA 1245c. For the purposes of illustration, host processor cohen4554b is designated as the control station or administrator host, from which connection and access to storage is controlled.

Storage system 1220 is similar to the storage system 20 described above with respect to FIG. 3. However, in contrast to the storage system 20 of FIG. 3, storage system 1220 includes a plurality of filter and adapter units 1234a, 1234b, and 1234c, such as would typically be used in a larger network where many different hosts share the use of a central storage system 1220. One such storage system that is representative of storage system 1220 is the Symmetrix line of disk arrays available from EMC Corporation of Hopkinton, Mass. The Symmetrix line of disk arrays is described in numerous publications from EMC Corporation, including the Symmetrix Model 55XX product manual, P-N200-810-550, rev. F, February, 1996.

As shown in FIG. 12, each filter and adapter unit 1234a, 1234b, and 1234c has its own connection to the network 1221. Each filter and adapter unit may include a number of ports, with each port supporting one or more connections to a host processor/HBA. For example, each filter and adapter unit may include two ports, with each port being capable of supporting up to 32 different connections to a host processor/HBA. Each of the filter and adapter units communicates with the configuration database 1232 that is maintained by the storage system 1220, and may include a processor and a memory, such as processor 80 and memory 83 described with respect to FIG. 3. Multiple filter and adapter units, such as shown in FIG. 12, may be used to connect to different types of networks (e.g., a loop network or a fabric network) for fault tolerance reasons, to increase bandwidth, or for a variety of other reasons.

According to a further aspect of the present invention, configuration database 1232 may include other information pertaining to network devices in the storage network in addition to that described above with respect to configuration database 32 in FIG. 3. This additional information can include, for example, the IP node name of each host that is logged into the storage system 1220, the IP node name of each host that has been assigned storage volumes in the storage system, or both. According to one embodiment of the present invention, additional information pertaining to devices in the storage network is stored in two different portions of the configuration database 1232; i.e., the history table 1269 and the configuration portion 1275 of the configuration database 1232, including header portion 1270, volume allocation portion 1272, mapping portion 1274, and filter table 1276. The additional information that is stored in the history table 1269 is maintained on a temporary basis for each host/HBA pair that is logged into a port of the storage system. In contrast, the additional information that is stored in the configuration portion 1275 is maintained on a permanent basis for each host/HBA pair for which access to storage volumes has been defined. It should be appreciated that the additional information pertaining to devices in the storage network need not be stored in different portions of the configuration database 1232, as the present invention is not so limited.

The additional information that is maintained in the history table 1269 can include, for each host/HBA pair that is logged into a port on the storage system 1220: the IP address of the host, the IP node name of the host, a time stamp indicative of the time at which the host/HBA pair logged into the port of the storage system, the type of file system used by the host, and an alias for the host/HBA pair that is logged into the particular port. Moreover, the additional information that is maintained in the history table 1269 can vary depending upon the type of network device (e.g., a host/HBA pair, a switch or hub, etc). In one embodiment of the present invention, a unique alias can be automatically provided by the storage system for each host/HBA pair when the host/HBA pair logs into a port of the storage system. The unique alias includes the IP node name of the host and the name of the adapter that logged into the port. This alias, called an ASCII World Wide Name (AWWN) herein, provides a short-hand identifier for each host/HBA that is logged into a port of the storage system, and is more meaningful to a user than a WWN. This is because the AWWN is logically related to identifiers (the IP node name of the host and the name of the adapter) that are used for other purposes, such as sending electronic mail, initializing devices in a startup file, etc. Advantageously, as described further below, the AWWN that is maintained in the history table 1269 can be used to view and manage network devices on a storage network and to control the availability and access to storage volumes on the storage system using embodiments of the user interface. Thus, a user can view and manage network devices using an alias that is logically more descriptive than a WWN. Moreover, a user can assign a different alias to each host/HBA pair, should this be desired.

The additional information that is stored in the configuration portion 1275 of the configuration database 1232 (as compared to database 32 in FIG. 3.) can be the same or similar to the additional information provided in the history table 1269, such as the IP node name of a host, the IP address of the host, and an alias of each host/HBA pair for which access to storage volumes has been previously defined. In contrast to the information stored in the history table 1269, the information stored in the configuration portion 1275 of the configuration database 1232 is maintained for each host/HBA pair for which access to storage volumes has been defined. According to one embodiment of the present invention, when a host/HBA pair, or other type of network device, logs into a port on the storage system, the configuration portion 1275 of the configuration database 1232 is scanned to determine if an alias for this host/HBA pair (or other type of network device) has been previously defined. When it is determined that an alias for a particular host/HBA pair (or other type of network device) has been previously defined in the configuration portion 1275, that alias is automatically written into the history table 1269 along with its WWN and source ID.

According to a further embodiment of the present invention, the information that is stored in the configuration database 1232 may be stored in different areas of the storage system 1220. In one exemplary implementation, the information stored in header portion 1270, volume allocation portion 1272, and mapping portion 1274 of the configuration database 1232 is stored in one or more of the storage devices 1238*a*–1238 of the storage system 1220, while the information stored in the history table 1269 and filter table portion 1276 is stored in a different type of memory device. For example, the information stored in the history table 1269 can be stored in a centrally accessible RAM or cache memory (not shown) of the storage system 1220, while the information stored in the filter table 1276 can be stored in a transient filter table in a memory of a filter and adapter unit (e.g., transient filter table 84 in memory 83 of filter and adapter unit 34 in FIG. 3). The above described use of separate storage areas for different portions of the configuration database 1232 optimizes the use of memory resources in the storage system 1220. Specifically, rather than storing the entire configuration database 1232 in a faster access (but expensive) RAM or cache, or in a slower access (but relatively inexpensive) storage device, those portions of the configuration database 1232 that are more frequently accessed and/or temporary (e.g., history portion 1269) can be stored in RAM or cache, while those portions of the configuration database 1232 that are less frequently accessed and/or persistent (e.g., volume allocation portion 1270) can be stored on disk or other type of storage device. Although the above described apportionment of the configuration database 1232 can be used to achieve a more optimal utilization of memory resources, it should be appreciated that the present invention is not limited to a particular manner in which the configuration database 1232 is apportioned, or to a particular type of memory device in which portions of the configuration database 1232 are stored, as other implementations may alternatively be used.

According to another embodiment of the present invention, a utility is provided for providing additional identification information pertaining to hosts and host/HBA pairs that are logged into a storage system. The utility may be used to provide an alias for a host/HBA pair in the history table 1269 when one has not been previously defined in the configuration portion 1275 of the configuration database 1232. The alias can then be used to view and manage that host/HBA pair and to configure storage volume assignments therefor. The utility may be implemented in software that executes on the CPU of a host processor to include this additional information in the history table 1269 of the configuration database. A flow diagram illustrating one implementation of the steps that may be performed by this utility is now described with respect to FIG. 13.

At step 1310, the utility queries the host processor to determine information such as the IP node name of the host and the IP address of the host. Other information may also be obtained, such as the manufacturer of the host processor, the type of operating system (e.g., Unix, Windows NT, Sun SOLARIS) being used on the host, etc. After obtaining information relating to the host, the utility proceeds to step 1320. At step 1320, the utility queries the storage network to identify those storage systems connected to the storage network that include a configuration database that facilitates shared access to storage resources, such as configuration database 1232 (FIG. 12). In a fabric storage network topology, this may be performed by accessing a nameserver on the fabric and examining the WWNs of devices that are connected thereto. For example, because each WWN includes a portion that is unique to each device manufacturer, the utility can examine the list of WWNs to identify those storage systems that are made by a particular manufacturer that include a configuration database 1232. In a loop storage network topology, similar information may be obtained by querying each device in the loop and examining the WWNs of each device in a similar manner. Upon identifying those WWNs that identify storage systems that include a configuration database 1232, the utility performs steps 1330 through 1380 for each such storage system.

At step 1330, the utility logs into a port on a storage system having a configuration database 1232 and proceeds to step 1340. At step 1340, the utility examines the history table 1269 in the configuration database 1232 to determine if an alias already exists for the particular host/HBA pair that the utility has caused to log into the storage system. When it is determined that the history table 1269 already includes an alias for this particular host/HBA pair, the utility proceeds to step 1380, described further below. Alternatively, when it is determined that the history table 1269 does not include an alias for this particular host/HBA pair, the utility proceeds to step 1350.

At step 1350, the utility examines the configuration portion 1275 of the configuration database 1232 to determine if an alias has been defined therein for this particular host/HBA pair. When it is determined that an alias has already been defined for this particular host/HBA pair in the configuration portion 1275 of the configuration database 1232, the utility proceeds to step 1360, wherein the alias defined in the configuration portion 1275 is written into the history table 1269. Alternatively, when it is determined that an alias has not been defined in the configuration portion 1275 of the configuration database 1232 for this particular host/HBA pair, the utility proceeds to step 1370.

At step 1370, the utility creates an alias for the host/HBA pair that is currently logged in to the storage system and writes it into the history table 1269. In one embodiment of the present invention, the alias includes the IP host name of the host and the name of the adapter that logged into the port. This alias, called an ASCII World Wide Name (AWWN), provides a short-hand identifier for the host/HBA pair that has more meaning to a user than a WWN. According to one aspect of the present invention, the portion of the AWWN representing the adapter name varies dependent upon the type of host (e.g., Windows NT, Sun SOLARIS, HP-UX, etc.) that logged into the port. For example, on a Windows NT host, the adapter portion of the AWWN is expressed in the form "adapterN", where "N" is the logical number of the HBA adapter on the host. On a Sun SOLARIS host system, the adapter portion of the AWWN is expressed in the form "sbus, fca@adapter", where "sbus" is the number of the bus on which the HBA resides, and "adapter" is the logical number of the adapter on the host.

After any of steps 1340, 1360, or 1370, the utility proceeds to step 1380. At step 1380 the utility returns to the host processor the information that is now stored in the history table 1269 of the configuration database 1232. This information will include the AWWN of the host/HBA pair, as well as any AWWNs of other host/HBA pairs that are present in the history table 1269 (e.g., AWWNs that have been previously assigned through the use of the utility on a different host processor, etc.) The utility also provides the host processor with the WWN of the host/HBA pair that logged into the storage system, a port identifier of the port on which the host/HBA pair logged into the storage system, and the device name or path (in terms of the host system) by which the storage system was reached. After providing this information, the utility then terminates. It should be appreciated that in a storage network that includes more than one storage system having a configuration database 1232, the utility will provide this information for each storage system that it is permitted to log into.

As should be appreciated from the foregoing description, the above utility is capable of identifying each host/HBA pair that is presently logged into the storage system in terms of its WWN. In addition, where a host/HBA pair that is logged into the storage system has been given an alias or AWWN, the AWWN of each host/HBA pair is also provided. As described further below, this information provided by the utility can then be used by the host on which the utility was executed to view and manage network devices on a storage network and to control the availability and access to storage volumes on the storage system with a user interface. Advantageously, by executing the utility on the same host that executes the user interface, a user can view and manage network devices with the user interface using the AWWN, rather than the more arcane and cumbersome WWN. In addition, by executing the utility on a host processor, the utility can be used to identify the WWN of the HBA that the utility used to access the storage system. It should be appreciated that this ability to identify the WWN of an HBA that is connected to a network is of great use. Although the WWN of an HBA is typically indicated on the HBA itself, it may be difficult to view this information once the HBA is installed in a host processor. Moreover, although the WWN of an HBA may be identified in documentation that accompanied the HBA, such documentation is frequently lost or misplaced. Advantageously, the above-described utility allows the WWN of a network device (e.g. a host/HBA pair) to be determined by requesting another network device (e.g., storage system 1220) to identify the WWN of the network device with which it is communicating.

According to another embodiment of the present invention, a user interface is now described, that, when executed on a processor (e.g., the CPU of a host processor), enables a user to view and manage devices in a storage network. One exemplary implementation of a user interface that may advantageously be used with a storage system 1220 such as shown in FIG. 12, is described in a publication entitled, EMC Volume Logix Product Guide, Version 2.0, p/n 300-999-024, available from EMC Corporation, and incorporated by reference herein. The Volume Logix product Guide describes an implementation of a system administrator, called "Volume Logix", that includes a software based user interface that can be used on a wide variety of different host computer platforms, including personal computers, workstations, and mainframe computers running a wide variety of operating systems, such as Windows, Windows 95 or Windows NT, Unix, Unix-variants, etc.

According to one embodiment of the present invention, the user interface executes on a host processor and allows a user or another application program to query a storage system and define access control for storage volumes on that storage system for network devices on a storage network to which the storage system is attached. Using the user interface, one can identify various devices (storage systems, storage system port adapters, hosts, HBAs, etc.) in the storage network and understand the relationship of these devices to one another in the storage network. For example, one can view which host processors can communicate with a storage system, the path or physical connection by which they communicate, which storage volumes of data are accessible to a particular host processor or are shared among a number of host processors, etc. In addition, the user interface can be used to modify the configuration of devices in the network, as well as manage access to storage volumes. This may be done in two different ways. In one embodiment, a graphical user interface (GUI) based software application is provided that allows one to view and modify relationships among network devices graphically. In another embodiment, a command line interface (CLI) is provided that permits one to perform similar functions as the GUI. Using either one of these interfaces, one can display listings of devices, modify relationships of devices (e.g., assign, revoke, modify privileges on storage volumes for hosts that are connected to the network), etc. Furthermore, with each of these interface, one can also modify properties that are associated with network devices. For example, one may modify the host name or the AWWN that is associated with a particular device.

Figure 13:
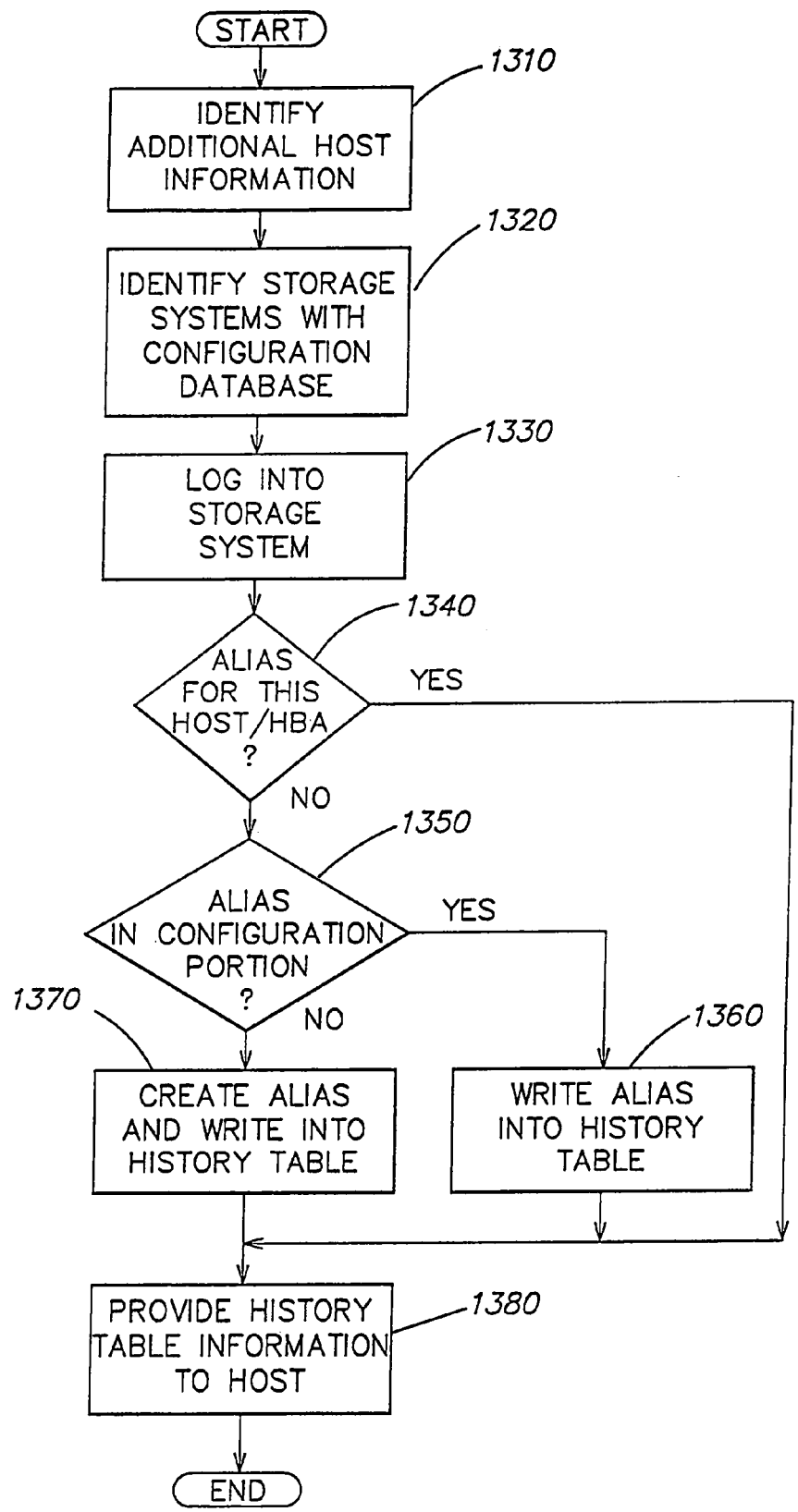
FIG. 13 is a flow diagram illustrating one method of assigning an identifier to network devices in a storage network.

The Volume Logix Product Guide also describes one exemplary implementation of a utility, called VCMFIND, that is similar in functionality to the utility described with respect to FIG. 13. In accordance with one aspect of the present invention, the VCMFIND utility can be used to identify, by WWN, each host/HBA pair that is logged into a storage system, to assign an alias or AWWN by which a host/HBA pair may be viewed and managed, and to provide a copy of the contents of the history table showing all other host/HBA pairs logged into a storage system to a host processor. This information returned to the host processor by the VCMFIND utility can be used in conjunction with embodiments of the user interface to permit the management of network devices through the use of the more meaningful alias or AWWN, rather than by use of the WWN.

Figure 14:
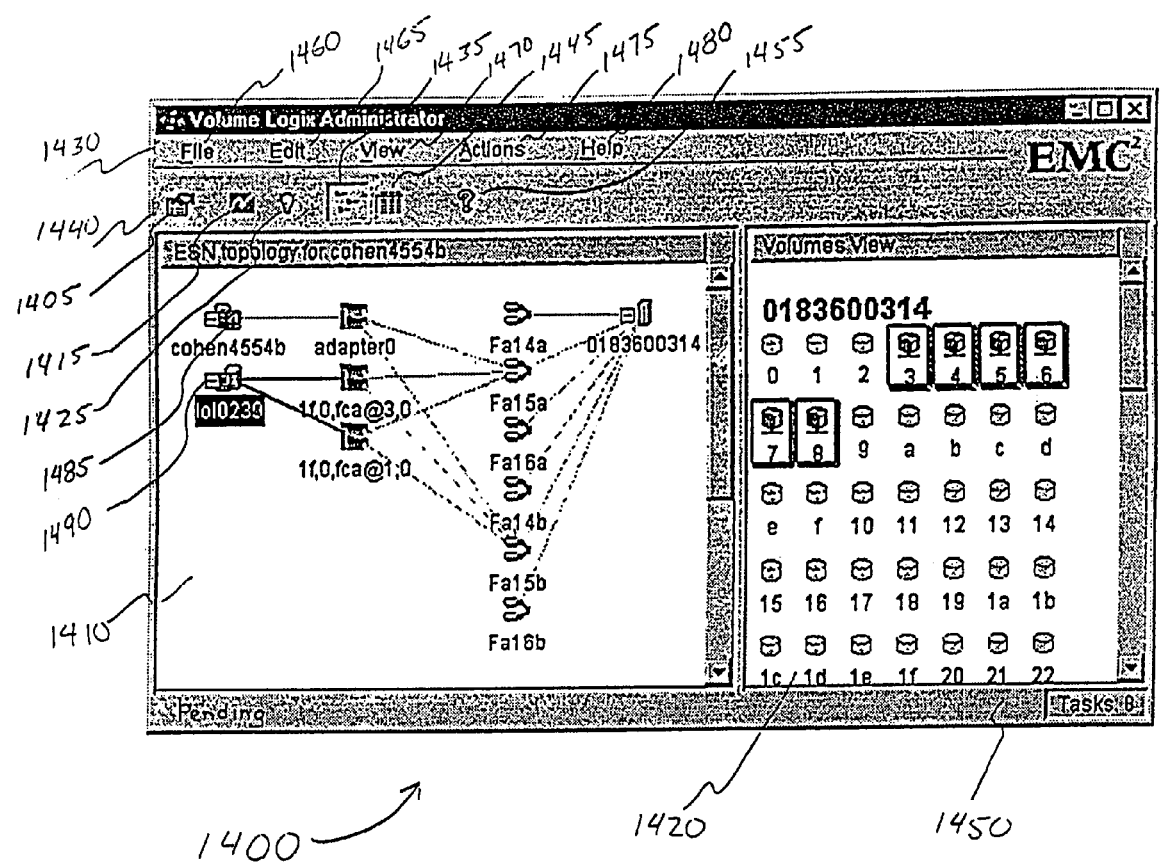
FIG. 14 illustrates a management window for managing network devices and access to data stored on a storage system that can be provided by a graphical user interface.

FIG. 14 illustrates one exemplary implementation of a top-level display screen that can be provided by a graphical user interface (GUI) according to one embodiment of the present invention. When executed on a host processor, the GUI provides a management window 1400 to enable a user to view, configure, or modify the manner in which devices are connected to one another, and to view, configure, or modify the allocation and access to storage volumes on a storage system. The GUI may be executed on a host processor after a utility, such as that described above with respect to FIG. 13, was executed on each host processor (e.g., host processor cohen455b and host processor lol0239, in FIG. 12) for which management was desired. As noted above, the execution of the utility of FIG. 13 permits devices to be managed by an alias that is more meaningful than a WWN.

The top level GUI management window 1400 can include a number of components, such as a storage network topology pane 1410, a storage system volumes view pane 1420, a menu bar 1430, a tool bar 1440, and a status bar 1450. It should be appreciated that the present invention is not limited to the particular arrangement of components shown in FIG. 14, as the GUI management window 1400 can be organized in many different ways. The storage network topology plane 1410 can be used for viewing network devices and the topology of the storage network at varying levels of granularity. The volumes view pane 1420 can be used to identify volumes of data stored on a particular storage system, to identify types of storage volumes stored on a particular storage system, whether those storage volumes are accessible by more that one host processor, etc. The menu bar 1430 provides a set of pull down menus, 1460–1480, that allow a user to manage and control devices connected to the storage network, including controlling which host processors can access storage volumes on the storage system. The tool bar 1440 provides a quick access to some of the more frequently used options provided by the menu bar 1430. The status bar 1450 provides informational messages relating to current actions selected from the menu bar and the tool bar, such as whether tasks are pending, whether a task has been completed, etc.

The GUI management window 1400 displays devices, such as host processors, storage systems, host bus adapters, storage system adapters, etc., in a storage area network, with each device being represented by an easily recognizable icon. The GUI management window 1400 also displays different types of storage volumes within a storage system by an easily recognizable icon. One exemplary illustration of how different types of storage area network devices and different types of storage volumes may be represented is shown in FIG. 15. It should be appreciated that the present invention is not limited to any particular form of icon, as others may alternatively be used.

Storage system icon 1505 represents a storage system that is available on the storage network. The storage system icon 1505 may be displayed in either a collapsed form or an expanded form, as described in more detail further below. Storage port icon 1510 represents an adapter port (e.g., filter and adapter unit 1234a–c in FIG. 12) on a storage system. Where the storage port represented by the storage port icon 1505 is adapted for use in a Fibre Channel environment, the storage port icon 1505 may be designated an FA (Fiber channel Adapter) port (See FIG. 14). It should be appreciated that other types of storage port adapters, other than a Fibre Channel adapter, may be represented, using different icons, or the same icon, but with a different textual label adjacent thereto.

Host processor icon 1515 represents a host processor that is available on the storage area network. The host processor icon 1515 may also be displayed in either a collapsed form or an expanded form, as described in more detail further below. Administrator host icon 1520 represents an administrator host processor or control station that is available on the storage area network and from which network devices and the allocation of storage devices in a storage system can be controlled or configured. The administrator host permits the allocation of volumes and the modification of how devices are connected in the storage network to be managed from a central control station or host processor. Like host processor icon 1515, the administrator host icon 1520 may be displayed in either a collapsed form or an expanded form. Host Bus Adapter (HBA) icon 1525 represents an HBA by which a host processor is connected to the storage area network. The HBA icon 1525 is displayed when the host processor icon 1515 or the administrator host icon 1520 is displayed in an expanded form.

Storage volume icon 1530 represents a storage volume in a storage system. More specifically, storage icon 1530 indicates that the represented volume is a standard fixed block addressing (FBA) volume that has not been allocated to a particular host processor/HBA pair (i.e., a storage volume for which no assignment has been defined in the configuration database 1232 (FIG. 12)). Assigned storage volume icon 1535 represents a storage volume in a storage system that has been assigned to a particular host processor/HBA pair in the configuration database (i.e., configuration database 1232, in FIG. 12) of the storage system. Shared, assigned, storage volume icon 1540 represents a storage volume in a storage system that has been assigned to more than one host processor/HBA pair in the configuration database 1232 of the storage system. Configuration database storage volume icon 1545 represents that the particular storage volume stores the configuration database (called a Volume Configuration Management database, or VCM in one implementation). Mirrored storage volume icon 1550 represents that the particular storage volume functions as a mirror to another storage volume (called a Business Continuity Volume, or BCV in one implementation). Concatenated storage volume icon 1555 represents that the particular volume is one of a concatenated group of adjacent storage volumes that appear as one target volume (called a Meta Volume in one implementation). Other icons may be provided for other storage system resources. As should be appreciated by those skilled in the art, the use of different icons to represent various types of network devices and various types of storage volumes allows a detailed description of a storage network to be effectively communicated to a user.

Referring back to FIG. 14, the storage network topology pane 1410 provides a graphical representation of how network devices are arranged in a storage area network. This graphical representation uniquely identifies each network device in the storage area network and shows the path by which the network devices are interconnected. As described further below, this graphical representation of network devices can be displayed at varying levels of detail, selectable by a user.

As shown in FIG. 14, the storage network topology pane 1410 shows paths between different host processor/HBA pairs and storage system/port pairs in the storage network that may be configured or modified using the graphical user interface. Dashed grey lines are used to represent paths that connect various devices in the storage network. Black solid lines are used to represent a path between network devices in which one of the network devices has been selected, for example, by using a mouse. In the example of FIG. 14, host processor lol0239 has been selected in an expanded form, and thus, the path between this host processor, and its two HBAs ("1f, 0,fca@3,0," and "1f,0,fca@1,0") are shown in solid line form. As noted above with respect to FIG. 13, the particular alias that is used to represent the HBA can indicate the type of host processor to which the adapter is attached. Other ways of representing the above information may alternatively be used, as the present invention is not limited to a particular manner of representation. Moreover, it should be appreciated that other network devices, such as switches and hubs, that are not under the control of the graphical user interface, may also be depicted in the view presented by the storage network topology pane 1410.

Host processor/HBA pairs are shown on the left hand side of the storage network topology pane 1410, with storage systems shown on the right. For example, in FIG. 14, two host processors cohen4554b and lol0239 are shown in the left hand side of the storage network topology pane 1410, with a storage system 01836000314 shown on the right. Each type of device (network device or a device within storage system) is represented by an icon that identifies the type of network device or the type of storage volume, as described above with respect to FIG. 15. Furthermore, each icon includes some associated text that uniquely identifies the particular device that the icon represents within the storage area network. The text that is associated with each host processor icon and HBA icon is based on the alias information of the history table 1269 (FIG. 12).

As may be seen from FIG. 14, the host processor icons of host processor cohen4554b and host processor lol0239 are similar, but different. Specifically, the host processor icon of host processor cohen4554b includes an "A" 1485 indicating that the host processor cohen4554b has been designated as the "administrator host" or control station on which the GUI is executed, and from which network devices and the allocation of storage devices can be centrally controlled or configured.

Figure 17:
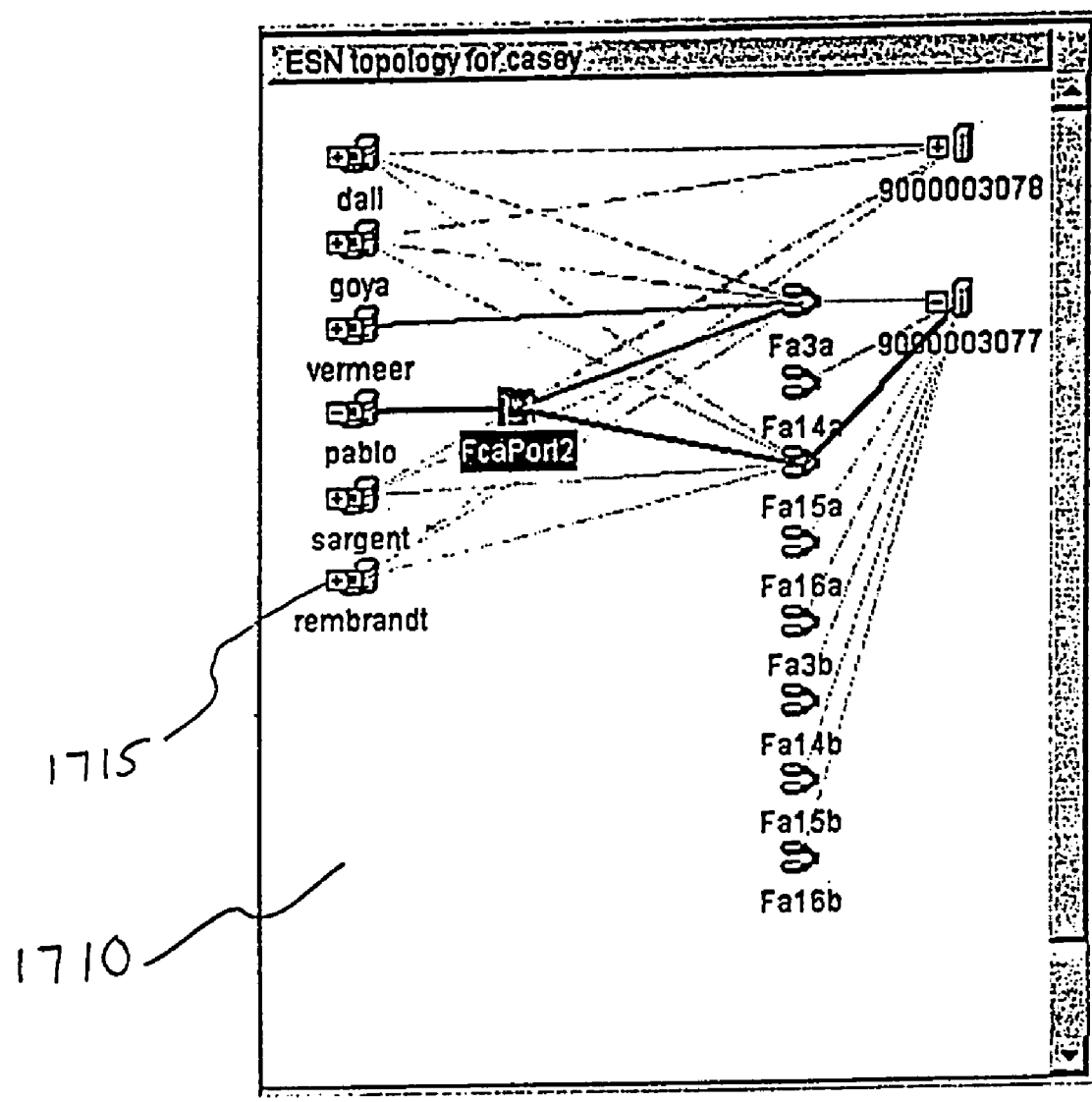
FIG. 17 illustrates one method of graphically representing varying levels of detail of how network devices are interconnected in a storage network that can be provided by a graphical user interface.

As noted above, the icons for host processors and for storage systems can be displayed in either a collapsed form or an expanded form that is selectable by the user. A collapsed host icon hides the HBAs attached thereto, whereas an expanded host icon shows each of the HBAs that are attached to the host processor. Each of the host processor icons depicted in FIG. 14 is displayed in its expanded form, showing its attachment to a particular HBA on a respective host processor. When depicted in an expanded form, the host processor icon includes a minus sign 1490 indicating that the collapsed form of the host processor icon may be selected by clicking on this region (termed a "hot spot") of the icon. Alternatively, the collapsed form may be selected by using a button associated with the tool bar 1440, or by accessing a menu within the menu bar 1430. When a host processor icon is collapsed, path connections between the host processor and other devices in the storage network are drawn directly from the host processor to the storage system or storage system port, depending on whether the storage system is shown in its collapsed or expanded form. When depicted in a collapsed form, the host processor icon includes a plus sign (1715 in FIG. 17) indicating that the expanded form of the host processor icon may alternatively be selected. An example of a host processor displayed in a collapsed form is shown in FIG. 17, described further below.

As noted above, storage systems are shown on the right hand side of the storage network topology pane 1410. Storage system icons can also be shown in either a collapsed form or an expanded form. A collapsed storage system hides the ports residing on it, while an expanded storage system shows each port residing on the storage system. When a storage system is collapsed, path connections are drawn directly from the storage system to the host or HBA. When the storage system is expanded, path connections are drawn from the storage system to the port and then to the host for HBA. In FIG. 14, storage system 0183600314 is shown in an expanded form. In a manner analogous to the host processor icon, a collapsed storage system icon can include a plus sign indicating that the expanded form of the storage system icon may alternatively be displayed upon selection, and an expanded storage system icon can include a minus sign indicating the collapsed form of the storage system icon may alternatively be displayed upon selection.

Each host bus adapter icon (e.g., adapter0) represents a particular HBA on which a host processor communicates to the storage network. Each HBA is identified using an icon and the adapter portion of the ASCII readable WWN (AWWN) that is stored in the history table 1269 of the configuration database 1232 (FIG. 12). As noted above, the AWWN can be assigned using a utility such as that described with respect to FIG. 13, or can be assigned automatically when a host/HBA pair logs into the storage system and the AWWN has been previously defined in the configuration portion 1275 of the configuration database 1232. Moreover, a user can change the AWWN that is assigned to a particular host/HBA pair in the configuration portion 1275 of the configuration database 1232 using the GUI. The naming convention used to identify host processors and HBAs shown in FIG. 14 was provided by using the utility of FIG. 13, prior to invoking the GUI. Thus, the name of the HBA assigned to a particular HBA can vary, based on the type of operating system used by the host processor to which it is attached. As shown in FIG. 14, host processor cohen4554b communicates with the network using HBA adapter0, whereas host processor lol0239 communicates with the network using two different HBAs, "1f,0,fca@3,0," and "1f,0,fca@1,0."

As noted above, in one implementation, dashed grey lines are used to represent paths that connect various devices in the storage network topology view pane 1410, and black solid lines indicate a selected connection (i.e. a connection between a selected device and another device). In the example of FIG. 14, host processor lol0239 has been selected in an expanded form, and thus, the path between this host processor, and its two HBAs are shown in solid line form.

As may be appreciated from the above description, the storage network topology view pane 1410 allows a user to view the network topology at different levels of granularity. For example, one can view connections from a host processor to a storage system, from a host processor/HBA pair to the storage system, from a host processor to a particular port on the storage system, or from a host processor/HBA pair to a particular port on the storage system. This ability to display different levels of granularity permits one to effectively manage access control in a top to bottom manner, from a host down to its HBA ports and from a storage system down to its ports and storage volumes. Moreover, it permits a user to view the overall topology of a storage network, and then, selectively focus down to a particular set of devices within the network. It should be appreciated that the ability to graphically view a storage topology is particularly useful in larger storage area networks, where the network may include many more network devices than that shown in FIG. 14.

The storage system volumes view pane 1420 graphically illustrates volumes of storage residing on a particular storage system. In one embodiment, the storage volumes view pane 1420 is filled when a network device, such as a host processor, an HBA, a host processor/HBA pair, or a storage system is selected in the storage network topology pane 1410. The storage volume view pane 1420 shows storage volumes that are available to or reside on the selected network device. The storage system volumes view pane 1420 also graphically depicts other types of information, such as the type of storage volume, whether access rights in a storage volume have been assigned to a particular host processor/HBA pair, whether access rights in a storage volume have been assigned to multiple host processor/HBA pairs, etc. This information is obtained by the GUI accessing the configuration portion 1275 of the configuration database 1232 (FIG. 12).

Two different types of views are available within the storage system volumes view pane 1420, i.e., an icon view, or a more detailed view. The icon view displays an icon for each storage volume associated with the selected object. For example, in FIG. 14, an icon is displayed for each of storage volumes 0–22 residing on the selected storage system, storage system 0183600314. Additional storage volumes, if present, may be viewed by expanding the window within which the volumes are shown, or by scrolling downward in a conventional manner. Where multiple storage systems are selected, storage volumes may be sorted by storage system number and then by storage volume, or in any other suitable way.

As shown in the storage volumes view pane 1420 of FIG. 14, storage volumes that have been assigned to a selected host processor/HBA pair and storage system/storage port pair are surrounded by a solid line border. For example, storage volumes 3–8 are surrounded by a solid line border to indicate that they have been assigned to a particular host processor/HBA pair and storage system/storage port pair that was selected by the user. Where one or more volumes were previously assigned to a particular host processor/HBA pair and storage system/storage port pair, but the assignment has been broken, this may be indicated by a dashed line surrounding the affected volumes. A broken assignment may occur, for example, where an HBA has logged out from the network. Of course, it should be appreciated that other ways of representing the above identified information to a user may alternatively be used, such as using one color to indicate a selected assignment, and another color to indicate a broken assignment.

Each storage volume icon in the storage volumes view pane 1420 may be shown in one of a number of states. For example, a gray storage volume icon (e.g., storage volume 1530 in FIG. 15) may be used to indicate that the storage volume is available, and that no access rights have been granted for this particular volume. In FIG. 14, storage volumes 0–2 and 9–22 are displayed in an available state. Alternatively, a storage volume may include highlighted black and white stripes (e.g., assigned storage volume 1535 in FIG. 15) to indicate that the storage volume is owned in a single-path configuration. That is, exactly one host/HBA pair has been assigned access rights to this particular volume. A storage volume can be depicted with a blackened connector bar (e.g., shared assigned storage volume 1540 in FIG. 15) to indicate that the storage volume is a multi-path shared storage volume. That is, two or more hosts/HBA pairs have been assigned access rights to this particular storage volume. In FIG. 14, the icons used to represent storage volumes 3–8 indicate that these volumes have been assigned access rights from multiple host processor/HBA pairs.

As noted above, a user may select an icon view or a more detailed view of storage volumes. For example, FIG. 16 illustrates a storage volumes view pane 1620 displayed in a detailed manner. As in the storage volumes view pane 1420 of FIG. 14, the representation of each storage volume on the storage system may differ depending on whether access rights have been assigned to that volume, or upon whether a particular storage volume is assigned to a single host processor/HBA pair, or to multiple host processor/HBA pairs. However, the more detailed view of storage volumes can also identify the capacity of each storage volume, an identifier (e.g., name or serial number) of the storage system on which the storage volumes resides, an identifier of which ports on the storage system can access a particular volume, and the owner of that particular volume (i.e., what host processor/HBA pair(s) have access rights to a particular storage volume). It should be appreciated that the present invention is not limited to the information shown in FIG. 16, as different or additional information may alternatively be displayed.

As noted above, clicking on a device (e.g., pointing to a particular network device and selecting a particular button on a mouse or other pointing device) highlights path connections associated with that device in the storage network topology view pane 1410, and fills the storage volumes view pane 1420 with all volumes owned and possibly accessible to or residing on that device. This ability to graphically view a storage area network at varying degrees of detail permits a user to effectively manage access control in a storage network in a hierarchical manner, from a host processor down to its ports.

As shown in FIG. 14, the menu bar 1430 is positioned across the top of the management window 1400 in a conventional manner. In one implementation, the menu bar 1430 includes five pull down menus, 1460–1480, each providing the user with a number of options from which to select to perform various tasks. For example, the File pull down menu 1460 can include a run tasks option to execute queued operation such as adding or deleting access of a host/HBA pair to one or more storage volumes. The File pull down menu 1460 can also include a properties option to display or modify properties (e.g., the name of a host or HBA, the name of a storage system or port, etc) of a selected network device, storage system or storage volume, and a report option that generates a report for a selected network device or storage volume. The report option may be used to generate information detailing the configuration of the storage network or the configuration of a particular device or volume, and this information can be either displayed or written to a file.

The Edit menu 1465 can provide a user with the ability to modify or delete a queued operation, or to change a login password to the graphical user interface. The View menu 1470 may include an Icon/Details option that permits a user to toggle between icon-based and more detailed view of storage volumes, and a refresh display option that refreshes the work space to reflect storage volume assignments that are currently defined in the configuration portion 1275 of the configuration database 1232, but have not been updated in the display screen 1400. The Actions menu 1475 may include various options categorized by the type of device (e.g., a storage system, a storage volume within a storage system, etc.) upon which they act. For example, the Actions menu 1475 can include a bus option that permits a user to define, clear, or swap access rights on a storage system bus, a volume option that adds, removes, or otherwise modifies access privileges to a storage volume, and a storage system option that can be used to perform operations on the configuration database, or to refresh the work space display. The menu bar 1430 may also include a pull down Help menu 1480 that permits a user to display help file, display information about the particular software version of the configuration database code, or graphical user interface software, to set the path to an HTML based browser that is used to view help topics, etc. Other information may be provided using the Help menu 1480, as the present invention is not limited to the particular topics for which additional information is provided, the organization of such information, or the particular manner in which it can be accessed.

The GUI management window 1400 may also include a tool bar 1440 that permits a user to quickly access some of the more frequently used features from the menu bar 1430. For example, the tool bar may include a properties icon 1405 to display a properties dialog box for currently selected items, a refresh display icon 1415 that reloads volume access assignments from the configuration portion 1275 of the configuration database 1232, and a run tasks icon 1425 that commits all pending volume assignments for all storage systems, or for a selected storage system. The tool bar 1440 may also include an iconic view icon 1435 that toggles between showing an iconic representation of storage volumes, or showing storage volumes in a more detailed fashion as described above. Similarly, a details icon 1445 may be provided that shows storage volume information in a more detailed tabular format, as in FIG. 16. The tool bar 1440 may also include a help icon 1455 that displays help files available to the user. It should be appreciated that other ways of providing a quick access to more frequently used features may also be provided, as the present invention is not limited to the particular implementation shown in FIG. 14. For example, a sequence of keyboard commands (e.g., "control F") may be used instead, or in addition to a tool bar.

The status bar 1450 is positioned across the bottom of the window 1400 and provides informational messages relating to current actions selected from the menu bar 1430 and the tool bar 1440. For example, the left hand side of the status bar 1450 can indicate whether tasks are pending or completed, with the right hand side indicating the number of current tasks in the task list. Other ways of providing this information may alternatively be used, as the present invention is not limited to the particular implementation of the status bar 1450 shown in FIG. 14.

FIG. 17 illustrates a storage network topology pane 1710 for a storage network that includes a number of different host processors as well as a number of storage systems. Each of the host processors except the host processor "pablo" is shown in a collapsed form. Host processor pablo is shown in an expanded form, illustrating the path connection between the host processor pablo, the HBA port FcaPort2, and the storage system 9000003077. Storage system 900003078 is illustrated in a collapsed form, whereas storage system 9000003077 is illustrated in an expanded form, revealing each of the storage system port adapters accessible from the network.

Figure 18:
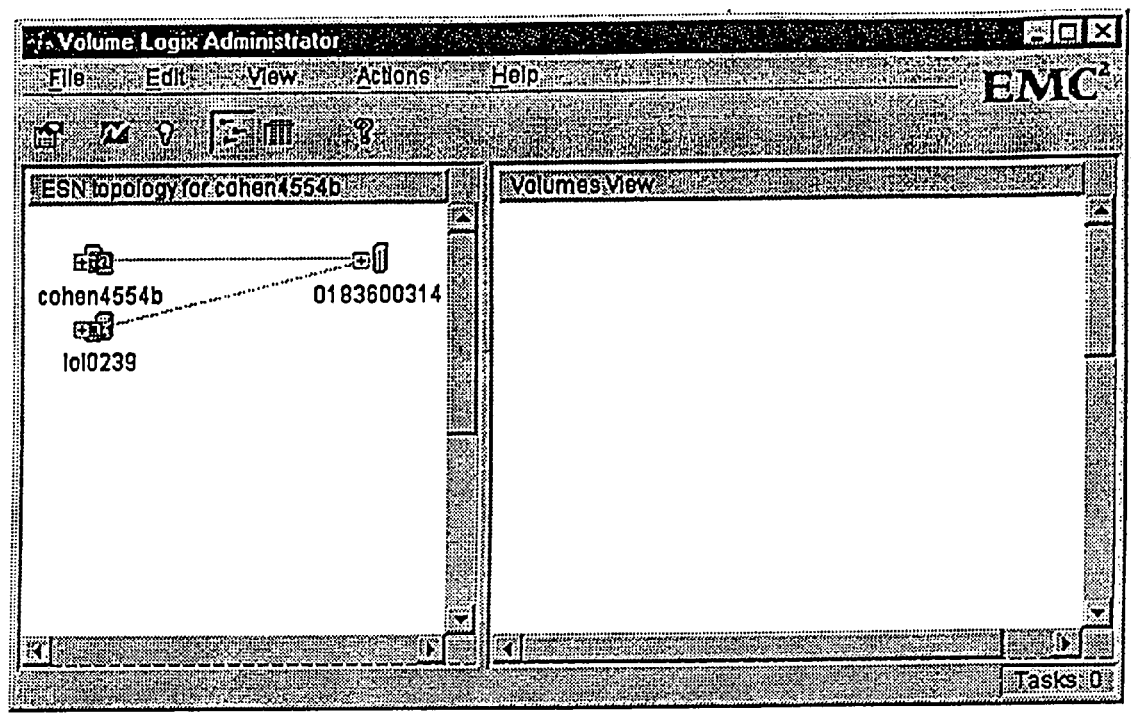
FIG. 18 illustrates a management window showing a first step in a configuration process, for configuring access to a storage system from different hosts in a storage network, using a graphical user interface.

An exemplary description of the manner in which access control can be configured for a relatively simple storage area network is now described with respect to FIGS. 18–22, and 14. FIG. 18 illustrates the storage network topology in which access rights to particular storage volumes will be provided for two different host processor systems, host processor cohen4554b and host processor lol0239. More particularly, FIG. 18 illustrates a management window 1800 that would be seen by a user after running a utility similar to that described in FIG. 13, such as the VCMFIND utility, on each of host processors cohen4554b and lol0239, and then executing the GUI on administrator host cohen4554b. In this example, host processor cohen4554b will be granted shared access to storage system 0183600314, storage volume 4, from HBA adapter0 on host processor cohen4554b. Host processor lol0239 will be granted access to storage system 0183600314, storage volumes 3 and 5–8, from HBA adapter1 on host processor lol0239, and will be granted shared access to storage volume 4, from HBA adapter2 on host processor lol0239. In FIG. 18, the user selects the storage system 0183600314 and expands the storage system icon to show all the storage adapter ports connected thereto. The result of these actions are shown in FIG. 19.

By expanding and selecting storage system 0183600314, the volumes view pane 1920 is filled in with all storage volumes residing on this storage system. As can be seen by the type of icon used to represent the storage volumes in the volumes view pane 1920 of FIG. 19, none of the volumes of storage system 0183600314 have been assigned to a host processor. Furthermore, by expanding the storage system icon, the storage adapter ports residing on the storage system 0183600314 are displayed. Gray path connection lines are drawn from each storage system port to each host on the storage network that can connect thereto. As shown in storage network topology pane 1910 of FIG. 19, the storage adapter ports residing on storage system 0183600314 include Fibre Channel adapter ports (Fa) Fa14a, Fa14b, Fa15a, Fa15b, Fa16a and Fa16b. The selection of storage system 0183600314, (for example, by clicking on the storage system icon using a mouse or other pointing device), results in the icon for storage system 0183600314 becoming highlighted. In addition, the selection and expansion of the icon for storage system 0183600314 results in grey path lines being drawn between each storage system port on the selected storage system and the selected storage system (not shown). By selecting a particular port that is attached to the storage system (e.g., port Fa15a), the selected port becomes highlighted and the gray path lines from the storage system to the selected port become darkened (not shown). After selecting a particular storage system, all volumes on that storage system are displayed in the volumes view pane of the management window.

To configure access to storage volume 4 on port Fa15a from HBA adapter0 of host processor cohen4554b, the user then selects host processor cohen4554b by selecting the appropriate icon. Upon selection, host processor cohen4554b becomes highlighted and the formerly gray line from host processor cohen4554b to storage port Fa15a becomes solid black. By selecting the expanded form of host processor cohen4554b, (for example, by clicking on the plus sign in the host processor icon), the HBAs that are connected to host processor cohen4554b are displayed. The results of the preceding actions are shown in the storage network topology pane 2010 of FIG. 20, in which host processor cohen4554b is connected by a solid black line to a HBA adapter0.

Figure 21:
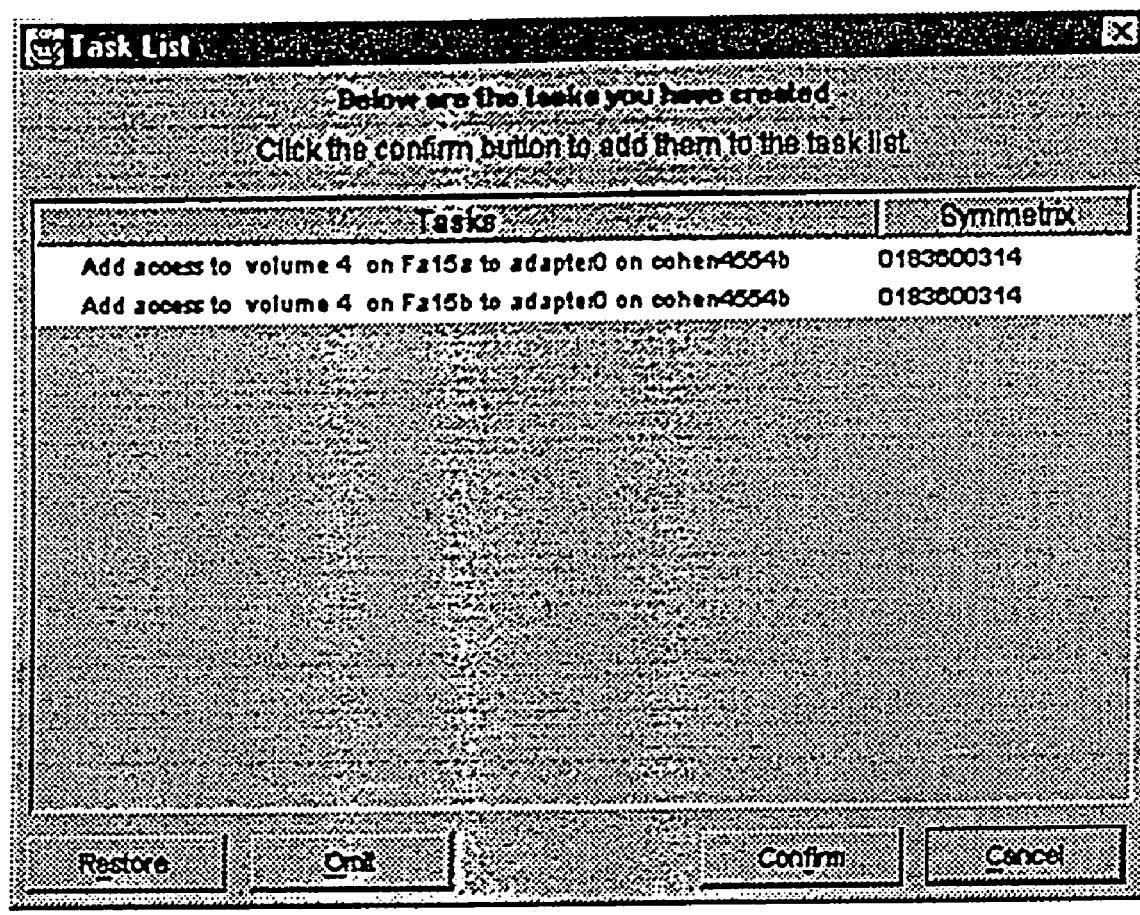
FIG. 21 illustrates a task list that can be displayed by a graphical user interface according to one embodiment of the present invention to confirm configuration of a specific port on a storage system from a specific port on a host system.

To select storage volume 4 for allocation to host processor cohen4554b/adapter 0, the user simply selects the storage volume 4 icon. This is shown in the volumes view pane 2020 of FIG. 20. After selecting a particular volume, the user may select the actions pull-down menu 2075 and select an option, such as add access. The result of these steps is to add access to storage volume 4 on storage system port Fa15a from HBA adapter0 on host processor cohen4554b. Similar steps may be performed to add access to storage volume 4 on storage system port Fa15b from HBA adapter0 on host processor cohen4554b. In one embodiment, after these steps are performed, a task list such as shown in FIG. 21 is displayed for the user. As shown in the task list of FIG. 21, access to volume 4 has been added from HBA adapter 0 on host processor cohen4554b to storage system adapter ports 15a and 15b. The user selects the confirm button shown at the bottom of the task list to confirm this task. It should be appreciated that the task list is not required. However, in one embodiment, by providing a user with the results of their assignments and requiring their confirmation, inadvertent changes can be reduced. Furthermore, it should be appreciated that the specific steps used to configure access for host processor cohen4554b and the order in which they are performed can vary, as the present invention is not so limited.

Figure 22:
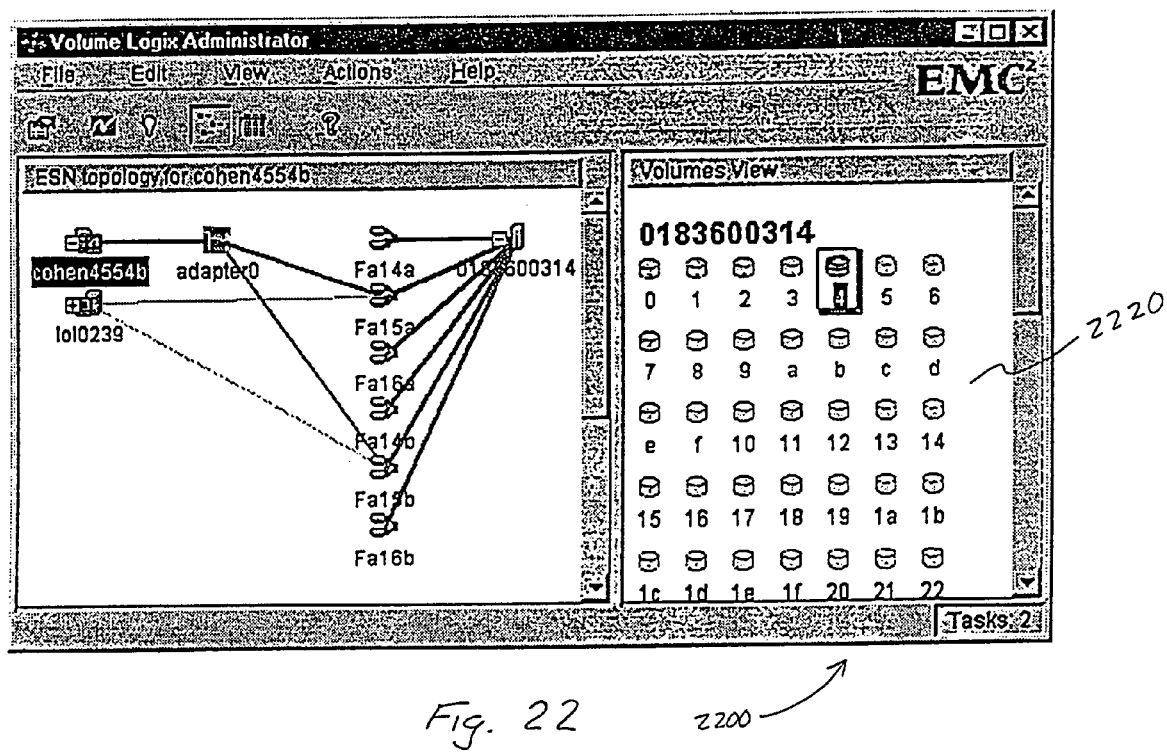
FIG. 22 illustrates a management window showing a fourth step in the configuration process of FIG. 18, for configuring access to a specific storage volume on a storage system using a specific port of a storage system and a specific port on a host system, using a graphical user interface.

FIG. 22 illustrates a graphical management window 2200 showing the assignment of storage volume 4 in volume view pane 2220 that a user would be provided with after performing the above steps. As noted previously, the selected storage volume in the volumes view pane 2220 may be enclosed by a border to indicate that this volume has been selected. Moreover, because this storage volume is now allocated to a particular host processor/HBA pair, storage volume 4 is represented by an assigned storage volume icon (i.e. assigned storage volume icon 1435 in FIG. 15). Furthermore, it should be noted that the paths shown in the storage network topology pane 2210 between host processor cohen4554b and HBA adapter0 and storage volume 4, via either of the storage system port adapters 15a and 15b, are shown in dark lines.

A similar procedure may be used to set up shared access to storage volume 4 from HBA adapter2 of host processor lol0239 and set up access to storage volumes 3, and 5–8 from HBA adapter1 of host processor lol0239. The resultant display after the management window has been refreshed is shown in FIG. 14, described previously above.

It should be appreciated that after the preceding steps, the assignments of storage volumes to each of host processors cohen4554b and lol0239 have not been made permanent in the configuration portion 1275 of the configuration database 1232 (FIG. 12). To make these assignments permanent in the configuration portion 1275 of the configuration database (i.e., so they will persist across power cycles of the storage system on which the configuration database resides), the user executes the run task command in the File menu bar. This extra step helps to prevent inadvertent changes from being made to the configuration database 1232. In one embodiment of the present invention, execution of the run task command is protected by a password so that tasks cannot be executed by an unauthorized user.

According to another embodiment of the present invention, a CLI based user interface is provided to manage network devices and manage and assign storage volumes to network device in a storage network. As in the GUI based user interface described above, the CLI based user interface communicates with a configuration database 1232 on a storage system 1220 to manage network devices and manage and assign storage volumes thereto. One exemplary implementation of a CLI based user interface, called FPATH, is described in great detail in the publication entitled, EMC Volume Logix Product Guide, as noted above. It should be appreciated that embodiments of the present invention directed to a CLI based user interface are not limited to the particular implementation of the FPATH CLI described therein, as the CLI based user interface of the present invention may be implemented in many different ways. In one embodiment of the present invention, the CLI based user interface is implemented in software and can be executed on a CPU 1240 of a host processor 1212, 1214. The CLI permits network devices and storage volumes in a storage system to be managed using a WWN or, alternatively, using an AWWN that can be assigned to a particular network device.

According to one embodiment, the CLI based user interface includes a set of commands having the format "COMMAND action {arguments}, where COMMAND is a name of the executable CLI, for example "FPATH", and where actions are subcommands that can be used to update the configuration database 1232 or display configuration information that is maintained in the configuration database 1232 of a storage system. Actions that may be performed on the configuration database 1232 of a storage system 1220 include initializing the configuration database 1232, adding or removing a network device such as a host, HBA or host/HBA pair to the configuration database 1232 so that network devices can access storage volumes on the storage system, adding or removing access to a particular storage port that a host/HBA pair can access on the storage system, and adding or removing access to a particular volume that a host/HBA pair can access on the storage system.

Other actions that may be performed using the CLI based user interface include backing up the configuration database 1232 maintained by the storage system 1220 to a specified file, restoring the configuration database 1232 from the contents of such a backup file, providing an alias for a particular host/HBA pair that can be used in managing and configuring network devices on the storage network, etc. Display actions available using the CLI can include displaying information relating to the manner in which network devices are related in the storage network. This information can include what devices are currently logged into a storage system, what access rights to storage volumes these network device have on the storage system, etc. This reporting information can be displayed on a display screen of a host processor, or saved to a file. It should be appreciated that the present invention is not limited to the particular set of actions described above, as other actions, or additional actions may alternatively be provided. Advantageously, the CLI based user interface may be used in conjunction with a utility such as that described above with respect to FIG. 13 to manage network devices using more meaningful identifiers than their WWN. The CLI based user interface can thus have similar functionality to that described above for the GUI user interface. Accordingly, as the implementation of a CLI would be readily understood from the description of the GUI based user interface discussed above, further details of the CLI based user interface are omitted herein.

As described above, embodiments of the present invention may be used to manage access by multiple devices (e.g., host processors, file servers, etc.) to data at a shared resource (e.g., a shared storage system) through use of a configuration database that is accessible to the shared resource. Based on information within the configuration database, access to one or more volumes of data stored on the shared resource is either permitted or denied.

Although the above described access management and control of a shared resource has many advantages over conventional approaches, Applicants have determined that certain network devices may have difficulties using such a resource management scheme. In particular, many host processors are incapable of accessing data at a shared resource when authorization to access that data (i.e., access control) is provided by the storage system and the authorization is granted after an initial discovery process performed by the host processor. Furthermore, certain host processors are incapable of discovering that they are privileged to access data at the shared resource when the data to which access is permitted is distributed over storage volumes that are located in a non-contiguous address space. A description of some of the difficulties that a network device may have in discovering and accessing data stored at a shared resource when access to that data is controlled by the shared resource, as well as several embodiments of the present invention for addressing these difficulties, is now described referring to FIGS. 23–25.

Figure 23:
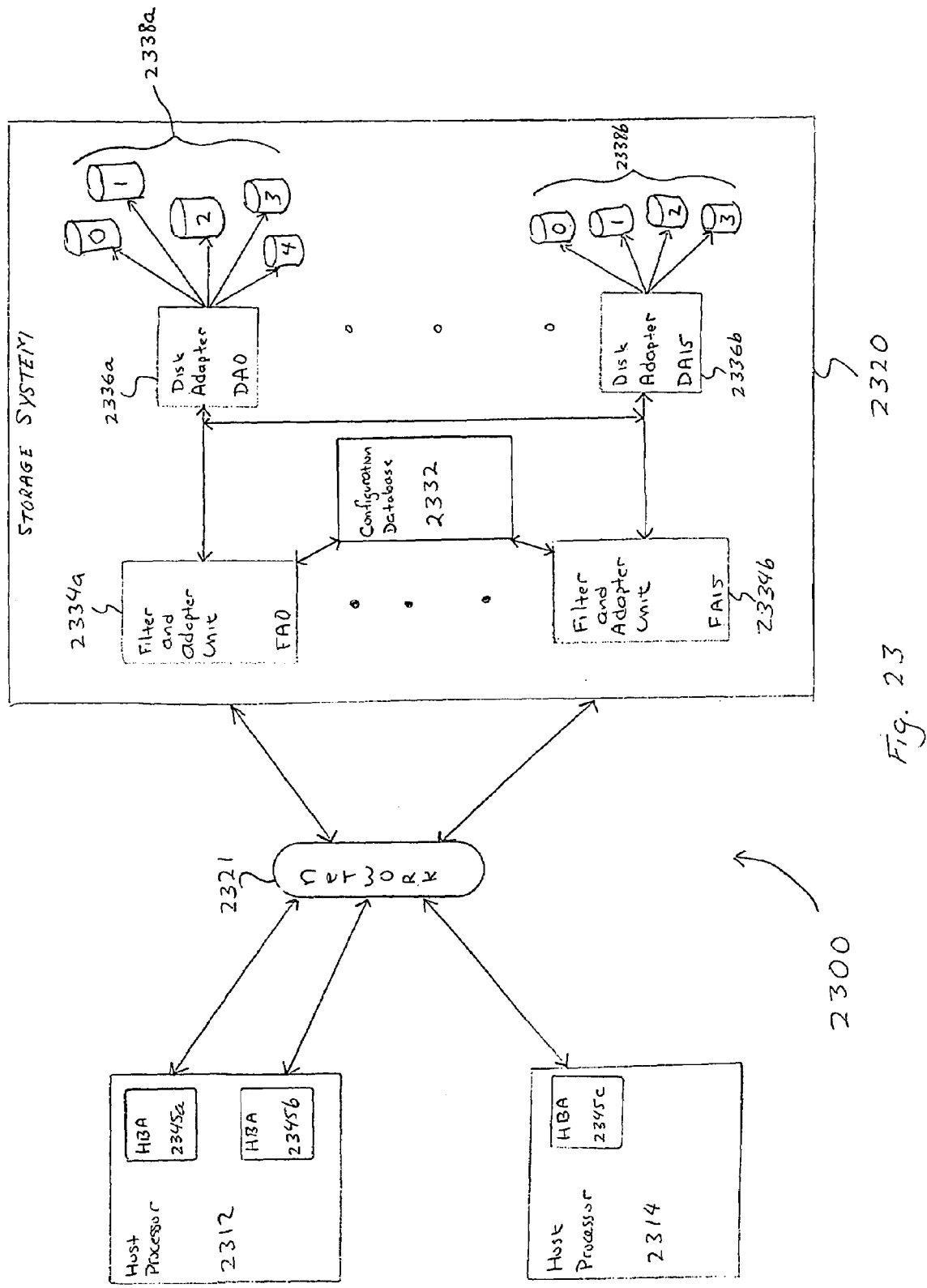
FIG. 23 is a block diagram of a storage network that includes a storage system with which various aspects of the present invention may be employed.

The storage network 2300 illustrated in FIG. 23, a number of host processors 2312, 2314, are coupled to a shared resource, e.g., storage system 2320, using a network 2321. Host processor 2312 includes two HBAs, HBA 2345a and HBA 2345b, and host processor 2314 includes one HBA, HBA 2345c. Storage system 2320 is similar to storage systems 20, 320, and 1220 described above with respect to FIGS. 3, 6 and 12, in that storage system 2320 includes a plurality of filter and adapter units 2334a, 2334b and a configuration database 2332 that is accessible to each of the filter and adapter units 2334a, 2334b and through which access to data stored on the storage system 2320 can be controlled and/or managed. Storage system 2320 also includes a plurality of disk adapters 2336a, 2336b, each of which is coupled to one or more of the filter and adapter units 2334a, 2334b and to one or more storage devices 2338a, 2338b. As shown in FIG. 23, the storage devices 2338a, 2338b may include a plurality of disk storage devices, although other types of storage devices (e.g., tape, optical, diskette, etc.) may alternatively or additionally be used. As in a conventional storage system, each of the individual storage devices 2338a, 2338b is typically assigned a unique storage device identifier, which along with an identifier of the disk adapter 2336a, 2336b by which the storage device is accessed, uniquely identifies each individual storage device on the storage system 2320.

As described previously, as each host processor or other network device enters the network, it queries the network to identify or discover other network devices that are coupled to the network. This may be performed, for example, by the host processor querying a centralized registry that identifies other network devices that are coupled to the network, by individually querying each network device that is coupled to the network, or a combination of both techniques.

Upon discovering that other network devices are coupled to the network, each HBA on the host processor then can identify one or more specific target devices on the network with which it can communicate, up to a maximum number of target devices that is supported (e.g., the maximum number of target devices supported by the HBA, the host processor, or the operating system of the host processor, whichever is controlling). For example, upon determining that a network storage system 2320 is coupled to the network 2321, HBA 2345a will identify one or a number of target devices (e.g., filter and adapter units 2334a through 2334b) with which it can communicate and assign each a unique target identifier, up to the maximum number (e.g., sixteen) of supported target devices. Each HBA (e.g., HBA 2345a and 2345b) on the host processor 2312 typically goes through a similar identification process. For example, the first target device identified by HBA 2345a (e.g., filter and adapter unit 2334a) will typically be assigned target identifier 0 on that HBA, with the next target device so identified being assigned target identifier 1, etc. HBA 2345b may go through a similar identification process, as well as any other HBAs that may be present on the host processor 2312.

When a target device is a port (e.g., a port of a filter and adapter unit) on a storage system, after the target device is identified, the HBA will then typically try to determine what other devices (e.g., LUNs) are available behind the identified target device. For example, after HBA 2345a identifies that it can communicate with filter and adapter unit 2334a, HBA 2345a may send a SCSI INQUIRY command to filter and adapter unit 2334a to determine if there is a LUN0 available that is associated with that target device. Depending on the response to this command, HBA 2345a may then send additional SCSI INQUIRY commands to filter and adapter unit 2334a to determine if other devices are available behind this target device, for example, LUN1, LUN2, etc., up to the maximum number of LUNs (e.g., 256) supported by the HBA. After identifying the target device and any other devices (e.g., LUNs) that are available behind that target device, the HBA proceeds to identify the next target device in a similar manner.

For purposes of illustration, it is now assumed that the filter table (e.g., filter table 76 in FIGS. 3 and 6, or filter table 1276 in FIG. 12) in configuration database 2332 of storage system 2320 has been configured, for example by a system administrator as described above with respect to FIGS. 12–22, to permit HBA 2345a on host processor 2312 access to data storage locations in logical volumes 0–2 on filter and adapter unit 2334a, and to permit HBA 2345c on host processor 2314 access to data storage locations in logical volumes 0 and 2–3 on filter and adapter unit 2334b. Each of these logical volumes corresponds to one or more physical storage devices on a respective disk adapter 2336a, 2336b. As used herein, a physical storage device "corresponds" to a logical volume if the physical storage device stores at least a portion of data belonging to the logical volume. For ease of explanation, it is assumed that each of logical volumes 0–4 on filter and adapter unit 2334a is respectively identified to HBA 2345a by filter and adapter unit 2334a as LUNs 0–4 and corresponds identically to a respective one of the physical storage devices 2338a that are coupled to disk adapter 2336a. It is also assumed that each of logical volumes 0–3 on filter and adapter unit 2334b is respectively identified to HBA 2345c by filter and adapter unit 2334b as LUNs 0–3 and corresponds identically to a respective one of the physical storage devices 2338b that are coupled to disk adapter 2336b. Of course it should be appreciated that the present invention is not so limited, as a single logical volume may span multiple physical storage devices, a number of logical volumes may share the same physical storage device, certain logical volumes may be accessible to more than one filter and adapter unit or disk adapter, etc.

In the present example, where HBA 2345a on host processor 2312 has been authorized to access data storage locations on logical volumes 0–2, respectively identified as LUNs 0–2 on filter and adapter unit 2334a, and storage system 2320 maintains a configuration database 2332 identifying which network devices are authorized to access which logical volumes, filter and adapter unit 2334a will respond to HBA 2345a's inquiry requests by passing the inquiry requests to the disk adapter (e.g., disk adapter 2336a) that services the storage devices corresponding to logical volumes 0–2. The response from disk adapter 2336a will be forwarded by filter and adapter unit 2334a to HBA 2345a indicating that LUNs 0–2 are available to HBA 2345a on host processor 2312. Although additional logical volumes are available to filter and adapter unit 2334a (e.g., LUN's 3 and 4), access to data storage locations on these logical volumes by HBA 2345a on host processor 2312 is not permitted (authorized) based upon the contents of the configuration database 2332 (e.g., filter tables 76 and 1276 in FIGS. 3 and 6, and 12, respectively). Thus, in response to a SCSI INQUIRY command from HBA 2345a asking whether LUN3 is available, this command will not be passed by filter and adapter unit 2334a to disk adapter 2336a for servicing, and thus, HBA 2345a will understand that there is no LUN3 available. Depending on the particulars of host processor 2312 (e.g., the type of host processor, the type of operating system used by the host processor, the particulars of the HBA used on the host processor, etc.), HBA 2345a may inquire as to the availability of other LUNs (e.g., LUN4), or may stop attempting to discover additional LUNs when it reaches the end of the contiguous logical volume (e.g., LUN) space.

Because access by HBA 2345a to data storage locations on logical volumes 3 and 4 (identified to HBA 2345a as LUN3 and LUN4 by filter and adapter unit 2334a) was not authorized prior to this initial discovery process, HBA 2345a will be unaware that other logical volumes (e.g., LUNs 3 and 4) exist behind filter and adapter unit 2334a. As a result, if authorization to access data storage locations on one or more of the additional logical volumes (e.g., LUN3 and/or LUN4) on filter and adapter unit 2334a is subsequently granted to HBA 2345a, for example through the use of the previously described user interface for a system administrator, then the discovery process performed by HBA 2345a would need to be repeated to see these volumes. On most host processors, this would require that the host processor be rebooted, a process which is both time consuming and inconvenient for system administrative personnel and users alike.

Now for example, assume that host processor 2314 is powered on and goes through a similar discovery process as host processor 2312. After discovering that storage system 2320 is present on network 2321, and that HBA 2345c can communicate with filter and adapter unit 2334b (i.e., has identified a target device), HBA 2345c subsequently sends a SCSI INQUIRY command to filter and adapter unit 2334b inquiring as to the availability of LUN0. Because access to data storage locations on LUN0 from HBA 2345c on host processor 2314 has been authorized in the configuration database 2332, filter and adapter unit 2334b will pass this command to disk adapter 2336b for servicing, with the result that HBA 2345c will be informed that LUN0 is available. HBA 2345c will then send another INQUIRY command to filter and adapter unit 2334b inquiring as to the availability of LUN1. Because access to data storage locations on LUN1 from HBA 2345c on host processor 2314 has not been authorized in the configuration database 2332, this command will not be passed by filter and adapter unit 2334b to disk adapter 2336b, and thus, HBA 2345c will understand that LUN1 is not available.

Once again, depending upon the particulars of the host processor (e.g., the type of host processor, the type of operating system used by the host processor, etc.) HBA 2345c may continue to inquire as to the availability of other logical volumes (e.g., LUNs) on filter and adapter unit 2334b. For example, where host processor 2314 is a computer system from Sun Microsystems running the Solaris operating system, HBA 2345c may inquire as to the availability of other logical volumes (e.g., LUN 2, LUN 3, LUN 4, etc.) up to the maximum number of LUNs supported by the host processor, the operating system of the host processor, or the HBA itself. HBA 2345c will be informed by the filter and adapter unit 2334b that LUN1 is not available, but that LUN2 and LUN3 (along with LUN0) are available. Again, because access to data storage locations on LUN1 was not authorized prior to the initial discovery process performed by HBA 2345c, HBA 2345c will be unaware of the existence of LUN1. As a result, HBA 2345c will be incapable of accessing any storage locations corresponding to LUN1 without performing another discovery process, should authorization to access LUN1 be subsequently granted.

Alternatively, other types of host processors are incapable of discovering additional logical volumes when those logical volumes are located in a non-contiguous logical volume (e.g., LUN) address space. For example, Applicants have determined that computer systems from Hewlett Packard running the HP-UX operating system are presently incapable of discovering logical volumes located in a non-contiguous LUN address space. Using the above example, where host processor 2314 is a computer system running the HP-UX operating system, after identifying that LUN0 is available to HBA 2345c on host processor 2314, HBA 2345c will then inquire as to the availability of LUN1. Because HBA 2345c has no privileges, HBA 2445c will not see LUN1. Upon determining that LUN1 is not available to it, HBA 2345c will assume that no further LUNs exist on that target (i.e., filter and adapter unit 2334b), and will proceed to identify any additional target devices (e.g., any other filter and adapter units on storage system 2320, or on other storage systems or network devices) with which it can communicate. As a result, host processor 2314 will never know that logical volumes 2 and 3 corresponding to LUNs 2 and 3 are accessible to filter and adapter unit 2334b and that authorization to access data storage locations on these volumes from HBA 2345c has been granted. It should be appreciated that unless authorization to access data storage locations on LUN1 is granted and the discovery process of HBA 2345c is reinitiated, then HBA 2345c would never be capable of accessing logical volumes 2 and 3 because it will never inquire as to their existence. It should also be appreciated that if LUN0 were not available to HBA 2345c, then HBA 2345c would be incapable of identifying any logical volumes (e.g., LUNs) available on that target, even if access to all other logical volumes on that target (e.g., LUNs 1–3) was authorized in the configuration database 2332.

According to one aspect of the present invention, a mechanism is provided for a shared resource (e.g., a storage system) that controls access by multiple network devices (e.g., host processors, file servers, etc.) to data at the shared resource and which overcomes the aforementioned difficulties. The mechanism may be used with any type of shared resource, such as a storage system. In one embodiment, the mechanism can be used with a data structure that identifies which of a plurality of network devices is authorized to access data on each of a plurality of logical devices (e.g., logical volumes of a storage system) at the shared resource. The data structure may be local to the shared resource, or may be separated therefrom.

According to one aspect of the present invention, in addition to configuration information identifying which of a plurality of network devices is authorized to access data on each of a plurality of logical volumes at the shared resource, a visibility identifier may also be provided that identifies whether certain types of non-media access, such as requests for information relating to a respective logical volume, by a respective one of the plurality of network devices is permitted, even though no data access to the respective logical volume by the respective one of the plurality of network devices is authorized. The term "non-media access" is used herein to refer to any commands requesting information relating to an identified logical volume that does not include accessing data stored by the network devices on a storage media of the storage device corresponding to the identified logical volume (e.g., not read commands, write commands, format commands, etc.). Such non-media access commands may include any commands that request information relating to a logical device (e.g., the type of device, its size, its formatted capacity, the manufacturer of the device, the product identifier of the device, its revision level, etc.) such as a SCSI INQUIRY command, a SCSI SENSE command, etc. Of course, the present invention is not limited to non-media access commands in the SCSI protocol, as other protocols have analogous non-media access commands.

In one embodiment, the visibility identifier identifies whether non-media access by a network device to each of a plurality of logical volumes at the shared resource is permitted, even though no data access to one or more of the plurality of logical volumes by the network device is authorized. In another embodiment, greater granularity is provided, such that the visibility identifier identifies whether non-media access by a network device to a particular logical volume of the plurality of logical volumes at the shared resource is permitted, even though no data access to the particular logical volume by the network device is authorized. These aspects of the present invention may be implemented in a number of different ways, as the present invention is not limited to any particular implementation. In one embodiment described in detail below, the volume visibility identifier may implemented using a configuration database, such as that described above with respect to FIGS. 3–23.

As described previously with respect to FIGS. 3 and 12, the information stored in configuration database 2332 can include a filter table 76, 1276 that may be used to manage and control access to data stored in the storage system 2320. According to one embodiment of the present invention, in addition to indicating which logical volumes an HBA is authorized to access, the filter table 76, 1276 may also include an identifier indicative of whether the HBA is permitted to see information relating to logical volumes other than those to which data access by the HBA is authorized. One exemplary implementation of a filter table that includes such a volume visibility identifier is now described with respect to FIG. 24.

As shown in FIG. 24, filter table 2476 includes a number of records 2476a–2476n, each corresponding to an HBA that is or may be coupled to any one of the ports of the storage system 2320. In a manner similar to that described with respect to FIG. 4, filter table 2476 may be generated based upon information stored in the configuration database 2332 (e.g., information stored in volume allocation portion 70 and mapping portion 72 of configuration database 32 in FIGS. 3 and 6). As discussed previously, each record 2476a–2476n may include the WWN associated with the HBA, a flag indicative of whether the logical storage volumes allocated in the entry are shared, and a LUN bitmap identifying those logical storage volumes on which the HBA can access data. In addition, each record 2476a–2476n in filter table 2476 may also include a volume visibility identifier indicative of whether the HBA is permitted to see information relating to logical storage volumes other than those on which data access by the HBA is authorized. In one implementation, the volume visibility identifier may include only a single bit, which when set, indicates that the identified HBA can see information relating to each of the logical storage volumes corresponding to the LUNs identified in the LUN bitmap, even those logical storage volumes to which data access by the identified HBA is not authorized by the bitmap (i.e., those logical storage volumes to which data access by the identified HBA is restricted). In one implementation, the volume visibility identifier is cleared to indicate that the identified HBA can only see information relating to the logical storage volumes identified in the LUN bitmap as being one to which data access is authorized for the HBA. It should be appreciated that the volume visibility identifier may alternatively be cleared to indicate that all logical storage volumes are visible to the identified HBA.

In one embodiment, the volume visibility identifier may be copied into a transient filter table (e.g., transient filter table 84 in FIGS. 3, 5, and 6) that is stored in a memory (e.g., memory 83 in FIG. 3) of a filter and adapter unit along with other filtering information from the filter table 2476. As described previously with respect to FIGS. 3 and 5, filtering information in the filter table 76 may be copied to the transient filter table 84 on a per port basis when an HBA initiates a connection with a storage system. The information that is maintained in the transient filter table 84 may then be used by the filter and adapter unit 34 to determine whether to forward requests from the HBA to the disk adapters 36a–36d (FIGS. 3 and 6) for servicing. In a similar manner, filtering information including the volume visibility identifier may be copied from filter table 2476 and stored in a transient filter table (not shown) of a filter and adapter unit (e.g., filter and adapter unit 2334a) on a per port basis. Based upon the state of the volume visibility bit in the transient filter table, the filter and adapter unit 2334a, 2334b can then determine whether the request should be forwarded to the disk adapters 2336a–2336b for servicing. The transient filter table 84 may be updated from the filtering information stored in the filter table 76 when changes that would affect the transient filter table 84 are made to the information stored in the filter table 76, such as through the use of a system administrator described previously above. Of course, it should be appreciated that alternative implementations are possible, such as maintaining only a single master filter table, such as filter table 76, for all ports of the storage system, maintaining a master filter table for each port of the storage system, or for a number of ports, etc. as the present invention is not limited to any particular implementation.

According to one embodiment of the present invention, when the volume visibility identifier is set in the transient filter table, those requests seeking non-media access to an identified logical storage volume (e.g., LUN), such as a SCSI INQUIRY command, are forwarded to the disk adapters for servicing, irrespective of whether data access to storage locations on the identified LUN by the HBA is authorized in the LUN bitmap (FIG. 4) of the transient filter table. Other requests requiring media access to data stored on a storage device corresponding to the identified logical volume (e.g., reads and writes to the identified LUN, formatting or initializing the identified LUN, etc.) are forwarded to the disk adapters in the manner described previously, such that those requests for accessing data storage locations on an authorized logical volume are forwarded to the disk adapters, while those requests for accessing data storage locations on an unauthorized logical volume are ignored. Alternatively, when the volume visibility identifier is cleared, all requests are forwarded to the disk adapters in the manner described previously with respect to FIGS. 3 and 5, such that a requesting device is not permitted to have non-media access to a logical volume for which it has no data access privileges.

Figure 25:
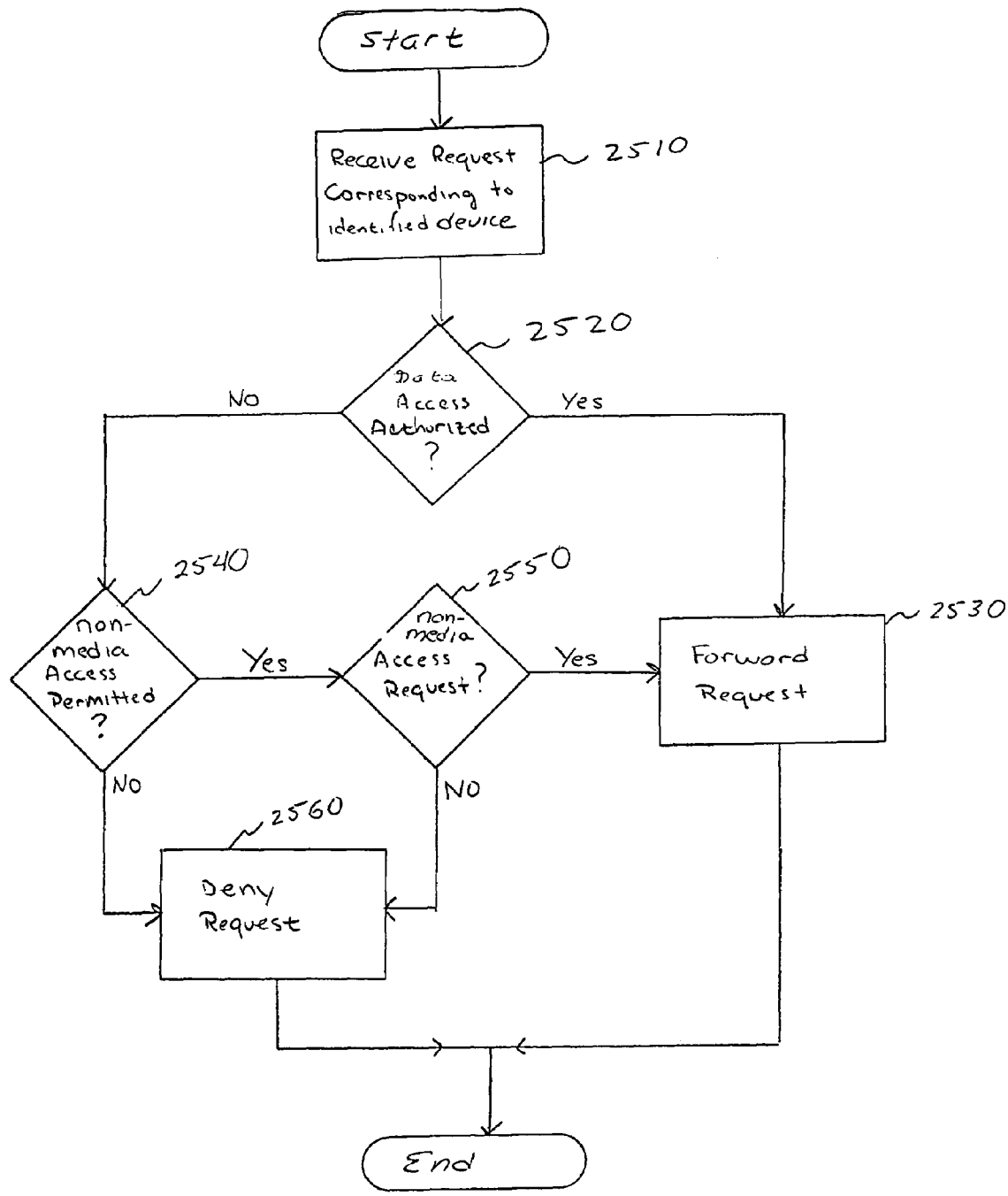
FIG. 25 is a flow diagram of an access control and management routine that uses volume visibility information stored in a configuration data structure to determine whether access to an identified device on a storage system is permitted according to one embodiment of the present invention.

FIG. 25 is a flow diagram illustrating one implementation of an access control and management routine in which a volume visibility identifier may be used to manage and control access in a storage system. The described access control and management routine may be used in association with any shared resource that manages and controls access to data stored therein. In one embodiment, the shared resource uses a data structure that identifies which of a plurality of network devices is authorized to access data on each of a plurality of logical devices at the shared resource. For example, where the shared resource is a storage system (e.g., storage system 2320), the data structure may be resident on the storage system itself or on another network device in the storage network 2300 (such as a host processor or another storage system), as long as the data structure is accessible to a filter (e.g., filter and adapter unit 2334a in FIG. 23) that is used to control access to the storage system 2320 based upon the contents of the data structure. Although embodiments of the present invention are described with reference to a storage system in which the filtering of access requests is performed by a filter (e.g., filter and adapter unit 2334a in FIG. 23) within the storage system itself (e.g., storage system 2320), it should be appreciated that the present invention is not so limited. In this regard, the filter unit and/or the data structure that is used by the filter unit to determine whether access requests are authorized may be separated from the storage system 2320, such that any access requests to the storage system are filtered prior to being provided to the storage system. Thus, the present invention encompasses implementations where the filtering of access requests is performed by a filter that is separate from the storage system (e.g., by a host processor or a dedicated controller that is coupled, via the network, to the storage system) as well as those in which the filter is implemented within the storage system (e.g., in a filter and adapter unit of the storage system).

According to one embodiment, the access control and management routine may be implemented in software (e.g., software executing on a processor 80 (FIG. 3) of a filter and adapter unit (e.g., filter and adapter unit 34 in FIG. 3) of the storage system 2320), in hardware, or in a combination of software and hardware. Depending on whether volume visibility is desired for each of the ports of the storage system 2320, the routine may be implemented by only a single filter and adapter unit (e.g., filter and adapter unit 2334a in FIG. 23), by a number of filter and adapter units, by each of the filter and adapter units of the storage system 2320, or by a filter that is implemented separately from the storage system 2320. Of course, it should be appreciated that the present invention is not limited in this regard, as numerous other implementations are possible.

At step 2510, the filter and adapter unit receives an access request directed to one of the ports of the storage system from one of the network devices (e.g., host processor 2312) in the storage network 2300 identifying a particular LUN on the storage system. The access control and management routine then proceeds to step 2520, wherein the routine determines whether data access to the identified LUN by the network device is authorized. As previously described in detail above with respect to FIGS. 3–5, this may be performed by examining an entry of the transient filter table (e.g., transient filter table 84 in FIGS. 3, 5, and 6) corresponding to the port to which the HBA sent the data access request. For example, where the LUN bitmap for the identified LUN indicates that data access from the particular HBA is authorized, the routine proceeds to step 2530, wherein the request is forwarded to the disk adapters (e.g., disk adapters 2336a, 2336b) for servicing. Alternatively, where the LUN bitmap for the identified LUN indicates that data access requests from the particular HBA are not authorized, the routine proceeds to step 2540.

At step 2540, the access control and management routine determines whether non-media access requests by the HBA that sent the request are permitted to the identified LUN. As noted above, this may be performed by examining a volume visibility identifier in an entry of the transient filter table (e.g., transient filter table 84 in FIGS. 3, 5, and 6) corresponding to the HBA that sent the request. Where the volume visibility identifier associated with the particular HBA indicates that non-media access requests are permitted (e.g., when the volume visibility bit corresponding to the HBA is set), the routine proceeds to step 2550. Alternatively, where the volume visibility identifier associated with the particular HBA indicates that non-media access requests are not permitted (e.g., when the volume visibility bit corresponding to the HBA is cleared), the routine proceeds to step 2550, wherein the request is denied. In one implementation, denied access requests are simply ignored by the filter and adapter unit, although the present invention is not limited to any particular manner of denying the request.

At step 2550, the access control and management routine determines whether the request is a non-media access request (i.e., requests general information relating to the identified LUN), or whether the request is a data access request requiring access to data locations on the identified LUN (e.g., is a read request, a write request, an initialization request, a format request, or any other type of data access request that reads data from or writes data to media storage locations that can typically be modified by a host processor). This identification of whether the request is a non-media access request may be determined from the syntax of the request and/or the type of request in any suitable manner. For example, in the SCSI protocol, an INQUIRY command may be used to query a storage device about a variety of information relating to the storage device, such as the device type, whether the device is available, its size, its formatted capacity, its product identifier, its revision level, etc.). Other protocols have similar commands. When it is determined that the request is one that seeks non-media access to the identified LUN, the routine proceeds to step 2530, wherein the request is forwarded to the disk adapters (e.g., disk adapters 2336a, 2336b) for servicing. Alternatively, when it is determined that the request is one that seeks data access to the identified LUN, the routine proceeds to step 2560, wherein the request is denied. After either of steps 2530 or 2560, the routine terminates.

Figure 26:
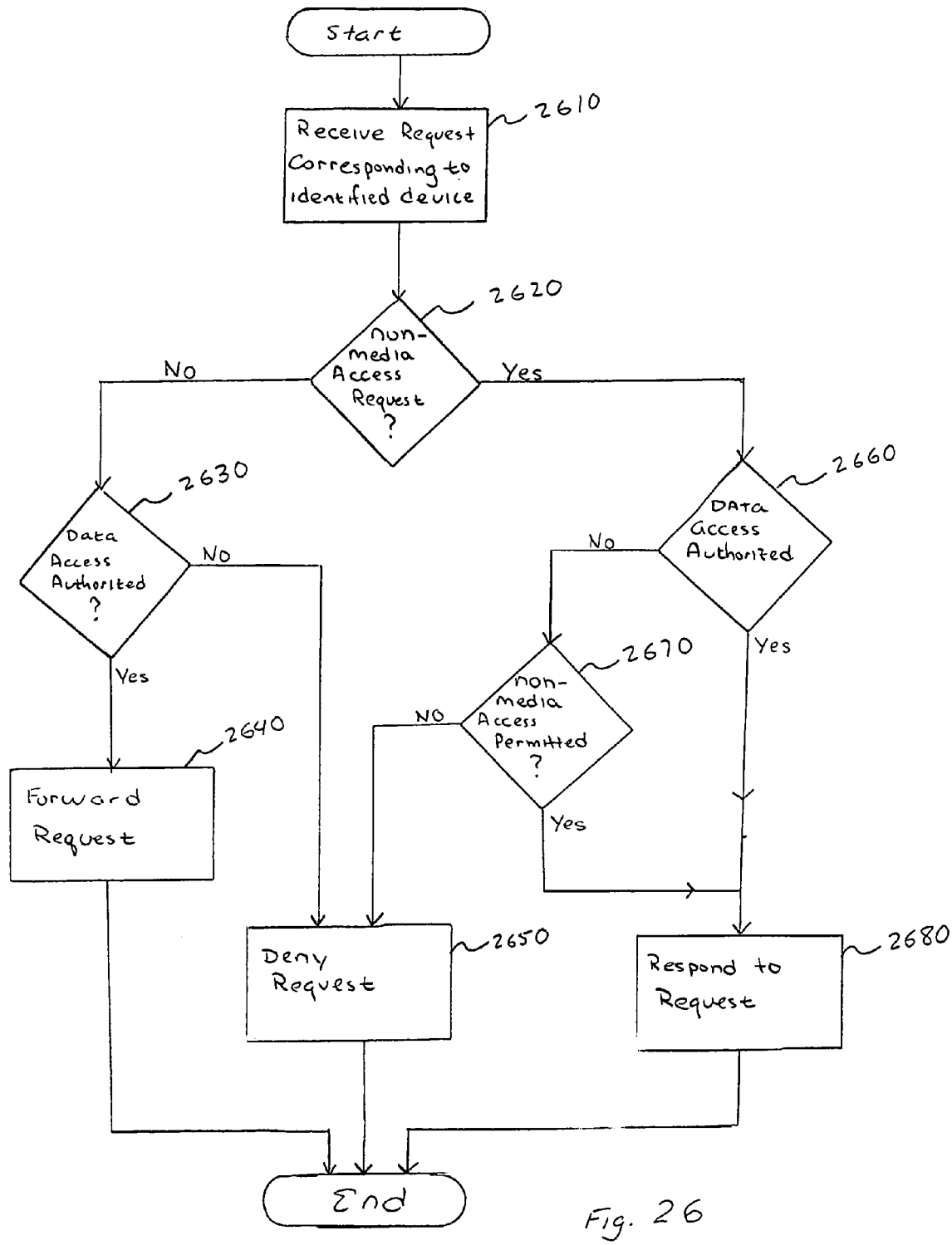
FIG. 26 is a flow diagram of an access control and management routine that uses volume visibility information stored in a configuration data structure to determine whether access to an identified device on a storage system is permitted according to another embodiment of the present invention.

Although one implementation of an access control and management routine has been described, it should be appreciated that other implementations are possible. For example, FIG. 26 is a flow diagram illustrating another implementation of an access control and management routine in which a volume visibility identifier may be used to manage and control access to a shared resource. Although the access control and management routine of FIG. 26 is now described with reference to a storage system that includes a filter (e.g., filter and adapter unit 2334a in FIG. 23) and a data structure (e.g., transient filter table 84 in FIGS. 3, 5, and 6) that reside on the storage system to manage and control access to logical volumes of data stored on the storage system, it should be appreciated that the present invention is not so limited. In this regard, the filter, the data structure, or both the filter and the data structure may be separated from the storage system, and may be implemented separately from one another and the storage system. Moreover, the access control and management routine of FIG. 26, like the routine of FIG. 25, may be used in association with any shared resource that manages and controls access to data stored therein, and is not limited to storage systems.

In contrast to the access control and management routine of FIG. 25, the routine of FIG. 26 does not forward all authorized access requests (i.e., authorized data access requests and authorized non-media access requests) to the disk adapters (e.g., disk adapters 2336a, 2336b) for servicing. Rather, the access control and management routine of FIG. 26 only forwards authorized data access requests to the disk adapters for servicing. Non-media access requests are handled directly by the filter (e.g., filter and adapter unit 2334a in FIG. 23), with non-media access requests from an authorized network device being responded to by the filter without forwarding the request on to a disk adapter, and with non-media access requests from unauthorized network devices being denied (e.g., ignored) by the filter.

It should be appreciated that the handling of non-media access requests by the filter can provide a network device with more complete information than the forwarding such non-media access requests to a particular physical device (e.g., a disk adapter). For example, where the shared resource performs a mapping of logical devices (e.g., LUNs) to physical devices on the shared resource (e.g., storage devices 2338a, 2338b), a logical device may not map identically to a particular physical device. Indeed, a single logical device may map to only a portion of a physical device, or may map to a number of physical devices. Because the filter has access to configuration information (e.g., volume allocation and mapping information stored in configuration database 32 in FIG. 3) identifying the manner in which logical devices (e.g., LUNs) are mapped to physical storage locations at the shared resource, the filter may be capable of responding to non-media access requests in a more comprehensive manner. Thus, in one embodiment, non-media access requests to an identified logical device are handled by the filter, with only authorized data access requests being forwarded for servicing. Other access requests, including authorized and unauthorized non-media access requests and unauthorized data access requests to an identified logical device are handled by the filter.

Like the access control and management routine of FIG. 25, the routine of FIG. 26 may be implemented in software (e.g., software executing on a processor 80 (FIG. 3) of a filter and adapter unit (e.g., filter and adapter unit 34 in FIG. 3) of the storage system 2320), in hardware, or in a combination of software and hardware. Depending on whether volume visibility is desired for each of the ports of the storage system 2320, the routine may be implemented by only a single filter and adapter unit (e.g., filter and adapter unit 2334a in FIG. 23), by a number of filter and adapter units, by each of the filter and adapter units of the storage system 2320, or by a filter that is implemented separately from the storage system 2320.

At step 2610, the filter and adapter unit receives an access request directed to one of the ports of the storage system from one of the network devices (e.g., host processor 2312) in the storage network 2300 identifying a particular LUN on the storage system. The access control and management routine then proceeds to step 2620, wherein the routine determines whether the request is a non-media access request (i.e., requests general information relating to the identified LUN), or whether the request is a data access request requiring access to data storage locations on the identified LUN (e.g., is a read request, a write request, an initialization request, a format request, or any other type of data access request that reads data from or writes data to media storage locations that can typically be modified by a host processor). As described previously with respect to FIG. 25, the identification of whether the request is a non-media access request may be determined from the syntax of the request and/or the type of request in any suitable manner. When it is determined that the access request is a data access request, the routine proceeds to step 2630.

At step 2630, the routine determines whether data access to the identified LUN by the network device is authorized. As described previously with respect to FIG. 25 above, this may be performed by examining an entry of the transient filter table (e.g., transient filter table 84 in FIGS. 3, 5, and 6) corresponding to the port to which the HBA sent the data access request. For example, where the LUN bitmap for the identified LUN indicates that data access from the particular HBA is authorized, the routine proceeds to step 2640, wherein the request is forwarded to the disk adapters (e.g., disk adapters 2336a, 2336b) for servicing. Alternatively, where the LUN bitmap for the identified LUN indicates that data access requests from the particular HBA are not authorized, the routine proceeds to step 2650, wherein the data access request is denied. After either of steps 2640 or 2650, the routine terminates.

Alternatively, when it is determined at step 2620 that the access request is a non-media access request, the access control and management routine proceeds to step 2660, wherein a determination is made as to whether data access to the identified LUN by the network device is authorized. This determination may be made in a manner similar to that described with respect to step 2630, for example. In one embodiment, when it is determined that data access to the identified LUN by the network device is authorized, the access control and management routine presumes that non-media access to the identified LUN is also authorized, and proceeds to step 2680. At step 2680, the filter (e.g., filter and adapter unit 2334a) responds to the non-media access request. For example, where the non-media access request is a SCSI INQUIRY request inquiring about the availability of an identified LUN, the filter can respond directly to the HBA that sent the request indicating that the identified LUN is available. It should be appreciated that where the identified LUN is mapped to several different physical storage devices, the response to non-media access commands by the filter may be more meaningful, as it reflects the logical structure of the storage system as perceived by the network device, rather than the underlying physical organization of the storage system, of which the network device may be unaware.

Alternatively, when it is determined at step 2660 that data access to the identified LUN by the network device is not authorized, the access control and management routine proceeds to step 2670. At step 2670, a determination is made as to whether non-media access requests by the HBA that sent the request are permitted to the identified LUN. As noted above with respect to FIG. 25, this may be performed by examining a volume visibility identifier in an entry of the transient filter table (e.g., transient filter table 84 in FIGS. 3, 5, and 6) corresponding to the HBA that sent the request. Where the volume visibility identifier associated with the particular HBA indicates that non-media access requests are permitted (e.g., when the volume visibility bit corresponding to the HBA is set), the routine proceeds to step 2680. Alternatively, where the volume visibility identifier associated with the particular HBA indicates that non-media access requests are not permitted (e.g., when the volume visibility bit corresponding to the HBA is cleared), the routine proceeds to step 2650, wherein the request is denied. After either of steps 2650 or 2680, the routine terminates.

Although several different implementations of an access control and management routine have thus been described, it should be appreciated that other implementations are possible. For example, in the access control and management routine of FIG. 26, the determination of whether data access to the identified LUN is authorized (e.g., steps 2630 and 2660) and/or the determination of whether non-media access to the identified LUN is authorized (e.g., step 2670) may be performed prior to the determination of whether the access request is a data access request or a non-media access request (e.g., step 2620). Other alternative implementations may also be used.

As should be appreciated from the foregoing, the volume visibility identifier may be used to overcome a number of the afore-mentioned difficulties. For example, the previously described user interface for a system administrator may be modified in a straight-forward manner to permit the configuration database associated with a share resource (e.g., a storage system) to be configured so that a host processor can discover all logical devices (e.g., LUNs) available behind a port of a shared resource, irrespective of whether access to storage locations on each of the logical devices behind the particular port has previously been authorized. For example, the File pull down menu 1460 (FIG. 14) may be modified to include a volume visibility option to permit all logical storage volumes on a selected port to be seen by a particular HBA. Alternatively, the Actions menu 1475 (FIG. 14) may be modified to support such functionality. In this manner, should authorization to access a logical volume that was previously unauthorized be subsequently granted, data stored on the newly authorized logical volume may be accessed without repeating the initial discovery process, thereby avoiding the need for an orderly shutdown and reboot of the host processor. Other information concerning logical volumes on which data access is authorized, as well as information concerning those logical volumes on which data access is not authorized (such as its size, its formatted capacity, etc.) may be displayed in the File pull down menu, or in other menus, as appropriate.

Moreover, where the host processor is one which is incapable of discovering logical devices (e.g., LUNs) that are located in a non-contiguous logical volume (e.g., LUN) address space, the volume visibility identifier corresponding to each HBA on that particular host processor may be set to permit those logical volumes separating logical volumes to which authorization has been granted to be discovered during the initial discovery process. It should be appreciated that because the volume visibility identifier is associated with a particular HBA, certain HBAs on a host processor may be permitted to see all logical devices behind a particular storage port, even if access to data storage locations on one or more of those logical devices is restricted, while other HBAs on that same host processor may not. It should also be appreciated that the default state of the volume visibility identifier may be either set or cleared, depending on the nature of the storage network, the type of host processor, etc. For example, because the WWN assigned to a particular device is unique to the manufacturer of that device, volume visibility identifiers associated with WWNs that correspond to manufacturers that are incapable of discovering discontiguous logical volumes may be set in a default state to enable them to see logical volumes even though they have no data access privileges, while the volume visibility identifiers associated with WWNs that correspond to other manufacturers may be cleared in the default state. The user interface for the system administrator can be used to modify these default settings, as appropriate.

Although the use of a single-bit volume visibility identifier has been described, it should be appreciated that the present invention is not limited to this particular implementation, as a number of alternative implementations are possible. For example, rather than granting non-media access to all logical devices (e.g., LUNs) behind a particular target for a particular HBA, or just those to which data access has been previously authorized, greater granularity may be provided.

According to another embodiment of the present invention, volume visibility may be controlled on a LUN by LUN basis, as well as a port by port basis. According to this embodiment, rather than the LUN bitmap of a filter table (e.g., the LUN bitmap of filter table 76 in FIGS. 3 and 4) including only a single bit for each LUN in the storage system, the LUN bitmap may include multiple bits. This use of multiple bits for each LUN in the LUN bitmap not only permits volume visibility to be controlled on a LUN by LUN basis, but it also increases the granularity by which access to the data stored on the particular LUN is provided. For example, by using a bitmask that includes two bits corresponding to each LUN in the storage system, up to four different levels of access may be provided corresponding to one of the four different bit combinations.

A first bit combination may indicate that the identified LUN may not be accessed in any manner (e.g., even for non-media access requests) by a particular HBA, a second bit combination may indicate that the identified LUN can be accessed for general informational purposes (e.g., may respond to non-media access requests) but is not authorized for data access, a third bit combination may indicate that the identified LUN can be accessed for general informational purposes and for read access, but may not be written to, and the fourth bit combination may indicate that the identified LUN can be accessed for general informational purposes, as well as for read and write access. When an HBA initiates a connection with a port on the storage system, this filtering information may be copied into a transient filter table of a filter and adapter unit (e.g., transient filter table 84 in FIGS. 4 and 6) in a manner similar to that described above with respect to FIG. 5, with each entry D1 through Dn including multiple bits. It should be appreciated that other levels of access different than those described immediately above may be provided (e.g., write access only) and that a different number of bits may be used. It should also be appreciated that a data structure implementing multi-bit authorization may be maintained and stored in the storage system, or may be maintained and stored separately therefrom, as the present invention is not limited to any particular implementation.

By controlling volume visibility in the above manner, a shared resource (e.g., a storage system) can be configured to individually control volume visibility and access authorization on a LUN by LUN basis for each LUN in the shared resource. As the access control and management routines described above with respect to FIGS. 25 and 26 may be adapted for use with multi-bit volume visibility information in a straight forward manner, a detailed description of such modifications is omitted herein.

Having described several embodiments of the invention in detail, various modifications and improvements will readily occur to those skilled in the art. Such modifications and improvements are intended to be within the scope of the invention. Accordingly, the foregoing description is by way of example only, and is not intended as limiting. The invention is limited only as defined by the following claims and the equivalents thereto.

What is claimed is:

1. A method for managing access to a storage system by a plurality of devices that are coupled to the storage system via a network, the method including acts of:
   (a) in response to a non-media access request by a first of the plurality of devices to a logical device at the storage system for which the first device has no data access privileges, determining, based, at least in part, on an identity of the first device, whether the first device is authorized to have non-media access to the logical device;
   (b) authorizing the non-media access request when it is determined in the act (a) that the first device is authorized to have non-media access to the logical device;
   wherein the act (a) includes an act of, in response to the non-media access request by the first device to a logical volume of data at the storage system for which the first device has no data access privileges, determining whether the first device is authorized to have non-media access to the logical volume;
   wherein the act (b) includes an act of authorizing the non-media access request when it is determined in the act (a) that the first device is authorized to have non-media access to the logical volume; and
   wherein the acts (a) and (b) are performed outside of the storage system.

2. The method of claim 1, further including an act of:
   (c) denying the non-media access request when it is determined in the act (a) that the first device is not authorized to have non-media access to the logical device.

3. The method of claim 2, wherein the act (c) includes an act of:
   ignoring the non-media access request.

4. The method of claim 2, wherein the act (b) includes an act of:
   forwarding the non-media access request to a physical device corresponding to the logical device.

5. The method of claim 1, wherein the non-media access request is an availability request to determine an availability of the logical device, and wherein the act (b) includes an act of:
forwarding the availability request to a physical device corresponding to the logical device.

6. The method of claim 1, further including acts of:
(c) in response to a data access request by the first device to the logical device, determining whether the first device has data access privileges to the logical device; and
(d) authorizing the data access request when it is determined in the act (c) that the first device has data access privileges to the logical device.

7. The method claim 6, further including an act of:
(e) denying the data access request when it is determined in the act (c) that the first device has no data access privileges to the logical device.

8. The method of claim 1, wherein the acts (a) and (b) are performed by a filter that controls access to a plurality of logical devices at the storage system, the method further including an act of:
(c) maintaining, in a data structure accessible to the filter, configuration information corresponding to the first device, the configuration information including;
(1) first configuration information identifying each of the plurality of logical devices to which data access by the first device is authorized; and
(2) whether non-media access is authorized to each of the plurality of logical devices for which the first configuration information identifies that no data access is authorized for the first device.

9. The method of claim 8, wherein the act (a) includes an act of:
examining the configuration information corresponding to the first device to determine whether the first device is authorized to have non-media access to the logical device.

10. The method of claim 1, wherein the acts (a) and (b) are performed by a filter that controls access to a plurality of logical devices at the storage system, the method further including an act of:
(c) maintaining, in a data structure accessible to the filter, configuration information corresponding to the first device, the configuration information identifying;
(1) each of the plurality of logical devices to which data access by the first device is authorized; and
(2) each of the plurality of logical devices to which non-media access by the first device is authorized.

11. The method of claim 1, further including an act of:
(c) determining whether an access request by the first device is one of a data access request and a non-media access request.

12. A method for managing access to a storage system by a plurality of devices that are coupled to the storage system via a network, the storage system including a plurality of logical volumes of data, the method including acts of:
(a) maintaining, in a data structure that is accessible to a filter that controls access to each of the plurality of logical volumes, configuration information identifying each logical volume of the plurality of logical volumes to which data access by a first device of the plurality of devices is authorized;
(b) in response to a non-media access request by the first device to a first logical volume for which the first device has no data access privileges, determining, based, at least in part, on an identity of the first device, whether the first device is authorized to have non-media access to the first logical volume; and
(c) authorizing the non-media access request when it is determined in the act (b) that the first device is authorized to have non-media access to the first logical volume;
wherein the filter is outside of the storage system, and wherein the acts (a), (b), and (c) are performed outside of the storage system.

13. The method of claim 12, further including an act of:
(d) denying the non-media access request when it is determined in the act (b) that the first device is not authorized to have non-media access to the first logical volume.

14. The method of claim 13, wherein the act (c) includes an act of:
forwarding the non-media access request to a physical device corresponding to the first logical volume.

15. The method of claim 12, wherein the act (c) includes an act of:
forwarding the non-media access request to a physical device corresponding to the first logical volume.

16. The method of claim 12, further including acts of:
(d) in response to a data access request by the first device to the first logical volume, determining whether the first device has data access privileges to the first logical volume; and
(e) authorizing the data access request when it is determined in the act (d) that the first device has data access privileges to the first logical volume.

17. The method claim 16, further including an act of:
(f) denying the data access request when it is determined in the act (d) that the first device has no data access privileges to the first logical volume.

18. The method of claim 12, further including an act of:
(d) determining whether an access request by the first device is one of a data access request and a non-media access request.

19. The method of claim 12, wherein the non-media access request is an availability request to determine an availability of the first logical volume, and wherein the act (c) includes an act of:
forwarding the availability request to a physical storage device corresponding to the first logical volume.

20. The method of claim 12, wherein the act (a) includes an act of:
maintaining, in the data structure that is accessible to the filter, configuration information that includes first configuration information identifying each logical volume of the plurality of logical volumes to which data access by the first device is authorized and second configuration information identifying whether non-media access is authorized to each of the plurality of logical volumes for which the first configuration information identifies that no data access is authorized for the first device.

21. The method of claim 20, wherein the act (b) includes an act of:
examining the second configuration information to determine whether the first device is authorized to have non-media access to the first logical volume.

22. The method of claim 12, wherein the act (a) includes an act of:
maintaining, in the data structure that is accessible to the filter, configuration information that identifies each logical volume of the plurality of logical volumes to which data access by the first device is authorized and each of the plurality of logical volumes to which non-media access by the first device is authorized.

23. An apparatus for use in a computer system including a plurality of devices, a storage system, and a network that couples the plurality of devices to the storage system, the apparatus comprising:
an input to be coupled to the network; and
at least one filter, coupled to the input, that is responsive to a non-media access request by a first of the plurality of devices to a logical device at the storage system for which the first device has no data access privileges, to determine, based, at least in part, on an identity of the first device, whether the first device is authorized to have non-media access to the logical device, and to authorize the non-media access request when it is determined that the first device is authorized to have non-media access to the logical device'
wherein the logical device is a logical volume of data stored at the storage system; and
wherein in response to the non media access request by the first device to the logical volume of data at the storage system for which the first device has no data access privileges, the at least one filter determines whether the first device is authorized to have non-media access to the logical volume, and authorizes the non media access request when it is determined that the first device is authorized to have non-media access to the logical volume; and
wherein the at least one filter and the input each is disposed outside of the storage system.

24. The apparatus of claim 23, wherein when it is determined that the first device is not authorized to have non-media access to the logical device, the at least one filter denies the non-media access request.

25. The apparatus of claim 24, wherein the storage system includes a plurality of storage devices coupled to the at least one filter, and wherein when it is determined that the first device is authorized to have non-media access to the logical device, the at least one filter forwards the non-media access request to a storage device corresponding to the logical device.

26. The apparatus of claim 23, wherein when it is determined that the first device is not authorized to have non-media access to the logical device, the at least one filter ignores the non-media access request.

27. The apparatus of claim 23, wherein:
the storage system includes a plurality of storage devices coupled to the at least one filter;
the non-media access request is an availability request to determine an availability of the logical device; and
when it is determined that the first device is authorized to have non-media access to the logical device, the at least one filter forwards the request to a storage device corresponding to the logical device.

28. The apparatus of claim 23, wherein in response to a data access request by the first device to the logical device, the at least one filter determines whether the first device has data access privileges to the logical device;
wherein the at least one filter authorizes the data access request when it is determined that the first device has data access privileges to the logical device; and
wherein the at least one filter denies the data access request when it is determined that the first device has no data access privileges to the logical device.

29. The apparatus of claim 23, wherein the apparatus further comprises:
a data structure, accessible to the at least one filter, that stores configuration information corresponding to the first device that includes first configuration information identifying each of a plurality of logical devices at the storage system to which data access by the first device is authorized, and second configuration information identifying whether non-media access is authorized to each of the plurality of logical devices for which the first configuration information identifies that no data access is authorized for the first device.

30. The apparatus of claim 29, wherein the at least one filter examines the second configuration information corresponding to the first device to determine whether the first device is authorized to have non-media access to the logical device.

31. The apparatus of claim 23, wherein the apparatus further comprises:
a data structure, accessible to the at least one filter, that stores configuration information corresponding to the first device that identifies each of a plurality of logical devices at the storage system to which data access by the first device is authorized and each of the plurality of logical devices to which non-media access by the first device is authorized.

32. The apparatus of claim 23, wherein in response to an access request by the first device to the logical device, the at least one filter examines the access request to determine whether the access request is one of a data access request and a non-media access request.

33. The apparatus of claim 23, in combination with the storage system, wherein the at least one filter and the input each is disposed within the storage system.

34. The apparatus of claim 23, further comprising:
a data structure, accessible to the at least one filter, that stores configuration information corresponding to the first device that includes first configuration information identifying each of a plurality of logical volumes of data stored at the storage system to which data access by the first device is authorized, and second configuration information identifying whether non-media access is authorized to each of the plurality of logical volumes for which the first configuration information identifies that no data access is authorized for the first device.

35. An apparatus for use in a computer system including a plurality of devices, a storage system, and a network that couples the plurality of devices to the storage system, the apparatus comprising:
an input to be coupled to the network;
a data structure that stores configuration information identifying each logical volume of data of a plurality of logical volumes of data stored on the storage system to which data access by a first device of the plurality of devices is authorized; and
at least one filter, coupled to the input, that is responsive to a non-media access request by the first device to a first logical volume of data of the plurality of logical volumes of data for which the first device has no data access privileges, to determine, based, at least in part, on an identity of the first device, whether the first device is authorized to have non-media access to the first logical volume of data, and to authorize the non-media access request when it is determined that the first device is authorized to have non-media access to the first logical volume of data;
wherein the at least one filter, the data structure, and the input each is disposed outside of the storage system.

36. The apparatus of claim 35, wherein when it is determined that the first device is not authorized to have non-media access to the first logical volume of data, the at least one filter denies the non-media access request.

37. The apparatus of claim 36, wherein the storage system includes a plurality of storage devices coupled to the at least one filter, and wherein when it is determined that the first device is authorized to have non-media access to the first logical volume of data, the at least one filter forwards the non-media access request to a storage device corresponding to the first logical volume of data.

38. The apparatus of claim 35, wherein when it is determined that the first device is not authorized to have non-media access to the first logical volume of data, the at least one filter ignores the non-media access request.

39. The apparatus of claim 35, wherein in response to a data access request by the first device to the first logical volume of data, the at least one filter determines, based upon the configuration information stored in the data structure, whether the first device has data access privileges to the first logical volume of data;
wherein the at least one filter authorizes the data access request when it is determined that the first device has data access privileges to the first logical volume of data; and
wherein the at least one filter denies the data access request when it is determined that the first device has no data access privileges to the first logical volume of data.

40. The apparatus of claim 35, wherein the configuration information stored in the data structure further identifies whether non-media access by the first device is authorized for each of the plurality of logical volumes of data stored on the storage system.

41. The apparatus of claim 35, wherein the configuration information stored in the data structure is first configuration information, the data structure further including second configuration information that identifies whether non-media access is authorized to each of the plurality of logical volumes of data for which the first configuration identifies that no data access is authorized for the first device.

42. The apparatus of claim 41, wherein the at least one filter examines the second configuration information to determine whether the first device is authorized to have non-media access to the logical device.

43. The apparatus of claim 35, wherein in response to an access request by the first device to the first logical volume of data, the at least one filter examines the access request to determine whether the access request is one of a data access request and a non-media access request.

44. An apparatus for use in a computer system including a plurality of devices, a storage system, and a network that couples the plurality of devices to the storage system, the apparatus comprising:
an input to be coupled to the network;
a data structure that stores configuration information identifying each logical volume of data of a plurality of logical volumes of data stored on the storage system to which data access by a first device of the plurality of devices is authorized; and
at least one filter, coupled to the input, that is responsive to a non-media access request by the first device to a first logical volume of data of the plurality of logical volumes of data for which the first device has no data access privileges, to determine, based, at least in part, on an identity of the first device, whether the first device is authorized to have non-media access to the first logical volume of data, and to authorize the non-media access request when it is determined that the first device is authorized to have non-media access to the first logical volume of data;
wherein the at least one filter and the input each is disposed within the storage system, and wherein the data structure is disposed outside of the storage system.

45. The apparatus of claim 44, wherein when it is determined that the first device is not authorized to have non-media access to the first logical volume of data, the at least one filter denies the non-media access request.

46. The apparatus of claim 45, wherein the storage system includes a plurality of storage devices coupled to the at least one filter, and wherein when it is determined that the first device is authorized to have non-media access to the first logical volume of data, the at least one filter forwards the non-media access request to a storage device corresponding to the first logical volume of data.

47. The apparatus of claim 44, wherein when it is determined that the first device is not authorized to have non-media access to the first logical volume of data, the at least one filter ignores the non-media access request.

48. The apparatus of claim 44, wherein in response to a data access request by the first device to the first logical volume of data, the at least one filter determines, based upon the configuration information stored in the data structure, whether the first device has data access privileges to the first logical volume of data;
wherein the at least one filter authorizes the data access request when it is determined that the first device has data access privileges to the first logical volume of data; and
wherein the at least one filter denies the data access request when it is determined that the first device has no data access privileges to the first logical volume of data.

49. The apparatus of claim 44, wherein the configuration information stored in the data structure further identifies whether non-media access by the first device is authorized for each of the plurality of logical volumes of data stored on the storage system.

50. The apparatus of claim 44, wherein the configuration information stored in the data structure is first configuration information, the data structure further including second configuration information that identifies whether non-media access is authorized to each of the plurality of logical volumes of data for which the first configuration identifies that no data access is authorized for the first device.

51. The apparatus of claim 50, wherein the at least one filter examines the second configuration information to determine whether the first device is authorized to have non-media access to the logical device.

52. The apparatus of claim 44, wherein in response to an access request by the first device to the first logical volume of data, the at least one filter examines the access request to determine whether the access request is one of a data access request and a non-media access request.

* * * * *